United States Patent
Henry et al.

(10) Patent No.: US 12,103,734 B2
(45) Date of Patent: Oct. 1, 2024

(54) GLASS ARTICLES WITH MIXED POLYMER AND METAL OXIDE COATINGS

(71) Applicant: CORNING INCORPORATED, Corning, NY (US)

(72) Inventors: David Henry, Fontaine le Port (FR); Valerie Claudine Lacarriere, Larchant (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 18/450,532

(22) Filed: Aug. 16, 2023

(65) Prior Publication Data

US 2023/0391505 A1  Dec. 7, 2023

Related U.S. Application Data

(60) Division of application No. 17/345,251, filed on Jun. 11, 2021, now Pat. No. 11,772,846, which is a
(Continued)

(51) Int. Cl.
*B65D 23/08* (2006.01)
*A61J 1/14* (2023.01)
(Continued)

(52) U.S. Cl.
CPC ........ *B65D 23/0814* (2013.01); *A61J 1/1468* (2015.05); *B65D 1/09* (2013.01);
(Continued)

(58) Field of Classification Search
CPC .......... C08K 2003/2244; C03C 17/003; C03C 2217/22; C03C 2217/43; C03C 2217/44;
(Continued)

(56) References Cited

U.S. PATENT DOCUMENTS

| | | | |
|---|---|---|---|
| 2,691,548 | A | 10/1954 | Feucht et al. |
| 3,287,311 | A | 11/1966 | Edwards |

(Continued)

FOREIGN PATENT DOCUMENTS

| | | |
|---|---|---|
| CN | 2483332 Y | 3/2002 |
| CN | 101479355 A | 7/2009 |

(Continued)

OTHER PUBLICATIONS

Indian Office Action dated Sep. 21, 2023, pertaining to IN Patent Application No. 201918033671, 6 pgs.
(Continued)

Primary Examiner — Michael C Romanowski
(74) Attorney, Agent, or Firm — Dinsmore & Shohl LLP

(57) ABSTRACT

According to one or more embodiments, a pharmaceutical package may include a glass container and a coating. The glass container may include a first surface and a second surface opposite the first surface. The first surface may be an outer surface of the glass container. The coating may be positioned over at least a portion of the first surface of the glass container. The coating may include one or more polyimide compositions and one or more metal oxide compositions. The one or more polyimide compositions and the one or more metal oxide compositions may be mixed in the coating.

5 Claims, 24 Drawing Sheets

| ABBREVIATION | COMMERCIAL NAME | CHEMICAL STRUCTURE |
|---|---|---|
| 6FDA-mPDA/pDA | AVIMID N | |
| 6FDA-ODA | PYRALIN DI 2566 DUPONT | |
| 6FDA-4,4'-6FDA | SIXEF 44 | |
| 6FDA-3,3'-6FDA | SIXEF 33 | |
| 6FDA-DURENE | SIXEF DURENE | |
| 6FDA-4-BDAF | LARC-CP 1 NeXolve | |

Related U.S. Application Data continuation of application No. 15/337,695, filed on Oct. 28, 2016, now abandoned.

(60) Provisional application No. 62/248,827, filed on Oct. 30, 2015.

(51) Int. Cl.
  *B65D 1/09* (2006.01)
  *C03C 17/00* (2006.01)
  *C03C 17/25* (2006.01)
  *C03C 17/32* (2006.01)
  *C08G 73/10* (2006.01)
  *C08K 3/22* (2006.01)
  *C09D 179/08* (2006.01)

(52) U.S. Cl.
  CPC .......... *C03C 17/005* (2013.01); *C03C 17/009* (2013.01); *C03C 17/256* (2013.01); *C03C 17/32* (2013.01); *C09D 179/08* (2013.01); C03C 2217/212 (2013.01); C03C 2217/214 (2013.01); C03C 2217/22 (2013.01); C03C 2218/111 (2013.01); *C08G 73/1039* (2013.01); *C08G 73/105* (2013.01); *C08G 73/1071* (2013.01); C08K 2003/2227 (2013.01); C08K 2003/2241 (2013.01); C08K 2003/2244 (2013.01)

(58) Field of Classification Search
  CPC .......... C03C 2217/445; C03C 2217/73; C03C 2217/74; C03C 2217/76; C03C 2217/78; C03C 17/006–009; C03C 17/32; B65D 23/087; B65D 23/0814; C08G 73/1039; C09D 179/08
  USPC ................ 427/105; 428/34.1–36.92
  See application file for complete search history.

(56) References Cited

U.S. PATENT DOCUMENTS

| | | | |
|---|---|---|---|
| 3,441,432 A | 4/1969 | Levene | |
| 3,577,256 A | 5/1971 | Benford, Jr. et al. | |
| 3,607,186 A | 9/1971 | Bognar | |
| 3,674,690 A | 7/1972 | Clow et al. | |
| 3,772,061 A | 11/1973 | McCoy et al. | |
| 3,801,361 A | 4/1974 | Kitaj | |
| 3,811,921 A | 5/1974 | Crawford et al. | |
| 3,844,754 A | 10/1974 | Grubb et al. | |
| 3,878,960 A | 4/1975 | Jonsson | |
| 3,900,329 A | 8/1975 | Grubb et al. | |
| 3,989,864 A | 11/1976 | Hey et al. | |
| 4,030,904 A | 6/1977 | Battye et al. | |
| 4,056,208 A | 11/1977 | Prejean | |
| 4,056,651 A | 11/1977 | Scola | |
| 4,065,317 A | 12/1977 | Baak et al. | |
| 4,065,589 A | 12/1977 | Lenard et al. | |
| 4,086,373 A | 4/1978 | Tobias et al. | |
| 4,093,759 A | 6/1978 | Otsuki et al. | |
| 4,130,677 A | 12/1978 | Huntsberger | |
| 4,214,886 A | 7/1980 | Shay et al. | |
| 4,215,165 A | 7/1980 | Gras et al. | |
| 4,238,041 A | 12/1980 | Johnson et al. | |
| 4,264,658 A | 4/1981 | Tobias et al. | |
| 4,280,944 A | 7/1981 | Saito et al. | |
| 4,431,692 A | 2/1984 | Hofamann et al. | |
| 4,558,110 A | 12/1985 | Lee | |
| 4,595,548 A | 6/1986 | St. Clair et al. | |
| 4,603,061 A | 7/1986 | St. Clair et al. | |
| 4,620,985 A | 11/1986 | Goodburn et al. | |
| 4,636,411 A | 1/1987 | Dubois et al. | |
| 4,654,235 A | 3/1987 | Effenberger et al. | |
| 4,680,373 A | 7/1987 | Gallagher et al. | |
| 4,696,994 A | 9/1987 | Nakajima et al. | |
| 4,748,228 A | 5/1988 | Shoji et al. | |
| 4,749,614 A | 6/1988 | Andrews et al. | |
| 4,767,414 A | 8/1988 | Williams et al. | |
| 4,842,889 A | 6/1989 | Hu et al. | |
| 4,860,906 A | 8/1989 | Pellegrini et al. | |
| 4,880,895 A | 11/1989 | Higashi et al. | |
| 4,902,106 A | 2/1990 | Dijon et al. | |
| 4,923,960 A | 5/1990 | Chen, Sr. et al. | |
| 4,931,539 A | 6/1990 | Hayes | |
| 4,961,996 A | 10/1990 | Carre et al. | |
| 4,988,288 A | 1/1991 | Melgaard | |
| 5,002,359 A | 3/1991 | Sayegh | |
| 5,036,145 A | 7/1991 | Echterling et al. | |
| 5,037,701 A | 8/1991 | Carre et al. | |
| 5,049,421 A | 9/1991 | Kosh | |
| 5,114,757 A | 5/1992 | Linde et al. | |
| 5,120,341 A | 6/1992 | Nozawa et al. | |
| 5,124,618 A | 6/1992 | Ohtaka et al. | |
| 5,137,751 A | 8/1992 | Burgess et al. | |
| 5,206,337 A | 4/1993 | Takeda et al. | |
| 5,232,783 A | 8/1993 | Pawar et al. | |
| 5,251,071 A | 10/1993 | Kusukawa et al. | |
| 5,252,703 A | 10/1993 | Nakajima et al. | |
| 5,281,690 A | 1/1994 | Flaim et al. | |
| 5,306,537 A | 4/1994 | Gustafson et al. | |
| 5,310,862 A | 5/1994 | Nomura et al. | |
| 5,336,925 A | 8/1994 | Moss et al. | |
| 5,403,700 A | 4/1995 | Heller et al. | |
| 5,476,692 A | 12/1995 | Ellis et al. | |
| 5,482,768 A | 1/1996 | Kawasato et al. | |
| 5,488,092 A | 1/1996 | Kausch et al. | |
| 5,504,830 A | 4/1996 | Ngo et al. | |
| 5,594,231 A | 1/1997 | Pellicori et al. | |
| 5,601,905 A | 2/1997 | Natanabe et al. | |
| 5,627,569 A | 5/1997 | Matsuzaki et al. | |
| 5,633,079 A | 5/1997 | Shoshi et al. | |
| 5,736,476 A | 4/1998 | Watzke et al. | |
| 5,756,144 A | 5/1998 | Wolff et al. | |
| 5,849,369 A | 12/1998 | Ogawa | |
| 5,851,200 A | 12/1998 | Higashikawa et al. | |
| 5,908,542 A | 6/1999 | Lee et al. | |
| 5,916,632 A | 6/1999 | Mishina et al. | |
| 5,938,919 A | 8/1999 | Najafabadi | |
| 6,013,333 A | 1/2000 | Carson et al. | |
| 6,046,758 A | 4/2000 | Brown et al. | |
| 6,048,911 A | 4/2000 | Shustack et al. | |
| 6,084,034 A | 7/2000 | Miyama et al. | |
| 6,096,432 A | 8/2000 | Sakaguchi et al. | |
| 6,156,435 A | 12/2000 | Gleason et al. | |
| 6,214,429 B1 | 4/2001 | Zou et al. | |
| 6,232,428 B1 | 5/2001 | Deets et al. | |
| 6,277,950 B1 | 8/2001 | Yang et al. | |
| 6,346,315 B1 | 2/2002 | Sawatsky | |
| 6,358,519 B1 | 3/2002 | Waterman | |
| 6,362,121 B1 * | 3/2002 | Chopin | C09D 1/00 252/588 |
| 6,444,783 B1 | 9/2002 | Dodd et al. | |
| 6,472,068 B1 | 10/2002 | Glass et al. | |
| 6,482,509 B2 | 11/2002 | Buch-Rasmussen et al. | |
| 6,561,275 B2 | 5/2003 | Glass et al. | |
| 6,586,039 B2 | 7/2003 | Heinz et al. | |
| 6,599,594 B1 | 7/2003 | Walther et al. | |
| 6,627,377 B1 | 9/2003 | Itatani et al. | |
| 6,737,105 B2 | 5/2004 | Richard | |
| 6,797,396 B1 | 9/2004 | Liu et al. | |
| 6,818,576 B2 | 11/2004 | Ikenishi et al. | |
| 6,852,393 B2 | 2/2005 | Gandon | |
| 6,866,158 B1 | 3/2005 | Sommer et al. | |
| 6,921,788 B1 | 7/2005 | Izawa et al. | |
| 6,939,819 B2 | 9/2005 | Usui et al. | |
| 6,989,181 B2 | 1/2006 | Brandt | |
| 7,087,307 B2 | 8/2006 | Nagashima et al. | |
| 7,215,473 B2 | 5/2007 | Fleming | |
| 7,236,296 B2 | 6/2007 | Liu et al. | |
| 7,315,125 B2 | 1/2008 | Kass | |
| 7,470,999 B2 | 12/2008 | Saito et al. | |
| 7,569,653 B2 | 8/2009 | Landon | |
| 7,639,042 B2 | 11/2009 | Poe et al. | |

(56) References Cited

U.S. PATENT DOCUMENTS

| | | | |
|---|---|---|---|
| 7,785,517 B2 * | 8/2010 | Poe | C08G 73/10 |
| | | | 425/383 |
| 7,845,346 B2 | 12/2010 | Langford et al. | |
| 7,871,554 B2 | 1/2011 | Oishi et al. | |
| 7,985,188 B2 | 7/2011 | Fell et al. | |
| 8,048,938 B2 | 11/2011 | Poe et al. | |
| 8,053,492 B2 | 11/2011 | Poe et al. | |
| 8,110,652 B2 | 2/2012 | Bito et al. | |
| 8,273,801 B2 | 9/2012 | Baikerikar et al. | |
| 8,309,627 B2 | 11/2012 | Poe et al. | |
| 8,323,889 B2 | 12/2012 | Arkenau-Maric et al. | |
| 8,324,304 B2 | 12/2012 | Burch et al. | |
| 8,518,545 B2 | 8/2013 | Akiba et al. | |
| 8,940,396 B1 * | 1/2015 | Sharma | B05D 3/0254 |
| | | | 427/249.1 |
| 9,783,449 B2 * | 10/2017 | Murashige | B32B 17/06 |
| 9,918,898 B2 | 3/2018 | Fadeev et al. | |
| 10,034,816 B2 | 7/2018 | Fadeev et al. | |
| 10,737,973 B2 | 8/2020 | Bayne et al. | |
| 2002/0037943 A1 | 3/2002 | Madsen | |
| 2002/0069616 A1 | 6/2002 | Odell et al. | |
| 2002/0081401 A1 | 6/2002 | Hessok et al. | |
| 2002/0155216 A1 | 10/2002 | Reitz et al. | |
| 2002/0182410 A1 | 12/2002 | Szum et al. | |
| 2003/0072932 A1 | 4/2003 | Gandon | |
| 2004/0048997 A1 | 3/2004 | Sugo | |
| 2004/0096588 A1 | 5/2004 | Brandt | |
| 2004/0129026 A1 | 7/2004 | Bartsch | |
| 2004/0199138 A1 | 10/2004 | McBay et al. | |
| 2005/0048297 A1 | 3/2005 | Fukuda et al. | |
| 2005/0170722 A1 | 8/2005 | Keese | |
| 2006/0099360 A1 | 5/2006 | Farha | |
| 2006/0233675 A1 | 10/2006 | Stein | |
| 2007/0082135 A1 | 4/2007 | Lee | |
| 2007/0116907 A1 | 5/2007 | Landon | |
| 2007/0157919 A1 | 7/2007 | Marandon | |
| 2007/0178256 A1 | 8/2007 | Landon | |
| 2007/0187280 A1 * | 8/2007 | Haines | A61L 27/34 |
| | | | 206/528 |
| 2007/0224427 A1 | 9/2007 | Kunita et al. | |
| 2007/0225823 A1 | 9/2007 | Hawkins et al. | |
| 2007/0289492 A1 | 12/2007 | Wynne et al. | |
| 2007/0293388 A1 | 12/2007 | Zuyev et al. | |
| 2008/0008838 A1 * | 1/2008 | Arpac | C08G 18/5015 |
| | | | 106/287.15 |
| 2008/0069970 A1 | 3/2008 | Wu | |
| 2008/0071228 A1 | 3/2008 | Wu et al. | |
| 2008/0114096 A1 | 5/2008 | Qu et al. | |
| 2008/0199618 A1 | 8/2008 | Wen et al. | |
| 2008/0214777 A1 | 9/2008 | Poe | |
| 2008/0281260 A1 | 11/2008 | William et al. | |
| 2008/0292496 A1 | 11/2008 | Madsen | |
| 2009/0048537 A1 | 2/2009 | Lydon et al. | |
| 2009/0092759 A1 | 4/2009 | Chen et al. | |
| 2009/0155506 A1 | 6/2009 | Martin et al. | |
| 2009/0155570 A1 | 6/2009 | Bonnel et al. | |
| 2009/0162530 A1 | 6/2009 | Nesbitt | |
| 2009/0162664 A1 | 6/2009 | Ou | |
| 2009/0176108 A1 | 7/2009 | Toyama et al. | |
| 2009/0197048 A1 | 8/2009 | Amin et al. | |
| 2009/0197088 A1 | 8/2009 | Murata | |
| 2009/0197390 A1 | 8/2009 | Rothwell et al. | |
| 2009/0208175 A1 | 8/2009 | Hongo et al. | |
| 2009/0208657 A1 | 8/2009 | Siebenlisl et al. | |
| 2009/0239759 A1 | 9/2009 | Balch | |
| 2009/0247699 A1 | 10/2009 | Buehler et al. | |
| 2009/0269597 A1 | 10/2009 | Bito et al. | |
| 2009/0275462 A1 | 11/2009 | Murata | |
| 2009/0297857 A1 | 12/2009 | Pascal et al. | |
| 2009/0325776 A1 | 12/2009 | Murata | |
| 2010/0101628 A1 | 4/2010 | Poe et al. | |
| 2010/0264645 A1 | 10/2010 | Jones et al. | |
| 2010/0273019 A1 | 10/2010 | Kitaike et al. | |
| 2010/0317506 A1 | 12/2010 | Fechner et al. | |
| 2011/0014475 A1 | 1/2011 | Murata | |
| 2011/0062619 A1 | 3/2011 | Laine et al. | |
| 2011/0065576 A1 | 3/2011 | Campbell et al. | |
| 2011/0091732 A1 | 4/2011 | Lu et al. | |
| 2011/0159318 A1 | 6/2011 | Endo et al. | |
| 2011/0177252 A1 | 7/2011 | Kanagasabapathy et al. | |
| 2011/0189486 A1 | 8/2011 | Wendell, Jr. | |
| 2011/0274916 A1 | 11/2011 | Murata | |
| 2011/0311796 A1 * | 12/2011 | Jung | G02B 1/14 |
| | | | 428/220 |
| 2011/0313363 A1 | 12/2011 | D'Souza et al. | |
| 2012/0016076 A1 | 1/2012 | Kim et al. | |
| 2012/0052293 A1 | 3/2012 | Poe et al. | |
| 2012/0097159 A1 | 4/2012 | Iyer et al. | |
| 2012/0107174 A1 | 5/2012 | Zambaux | |
| 2012/0142829 A1 | 6/2012 | Ichinose | |
| 2012/0172519 A1 | 7/2012 | Dorr et al. | |
| 2013/0186141 A1 * | 7/2013 | Henry | C03C 21/00 |
| | | | 65/30.14 |
| 2013/0287755 A1 | 10/2013 | Greene et al. | |
| 2013/0299380 A1 | 11/2013 | Zambaux et al. | |
| 2014/0001076 A1 * | 1/2014 | Fadeev | C03C 17/32 |
| | | | 206/524.3 |
| 2014/0031499 A1 * | 1/2014 | Cho | C08G 73/1067 |
| | | | 525/431 |
| 2015/0132563 A1 * | 5/2015 | O'Malley | C23C 18/1245 |
| | | | 427/372.2 |
| 2015/0203631 A1 | 7/2015 | Miyazaki et al. | |
| 2016/0024272 A1 * | 1/2016 | Chae | C08K 3/22 |
| | | | 524/600 |
| 2019/0210768 A1 | 7/2019 | Adib et al. | |

FOREIGN PATENT DOCUMENTS

| | | |
|---|---|---|
| CN | 201390409 Y | 1/2010 |
| CN | 201404453 Y | 2/2010 |
| CN | 101717189 A | 6/2010 |
| CN | 101831175 A | 9/2010 |
| CN | 201694531 U | 1/2011 |
| CN | 102066462 A | 5/2011 |
| CN | 202006114 U | 10/2011 |
| DE | 1167706 B | 4/1964 |
| DE | 1954314 A1 | 5/1971 |
| DE | 4128634 A1 | 3/1993 |
| DE | 4130414 A1 | 4/1993 |
| DE | 29702816 U1 | 4/1997 |
| EP | 0176062 A2 | 4/1986 |
| EP | 0330456 A1 | 8/1989 |
| EP | 1464631 A2 | 6/2004 |
| EP | 2031124 A1 | 3/2009 |
| EP | 524802 B2 | 10/2009 |
| EP | 2540682 A1 | 1/2013 |
| FR | 93015 E | 1/1969 |
| FR | 2033431 A5 | 12/1970 |
| GB | 702292 A | 1/1954 |
| GB | 720778 A | 12/1954 |
| GB | 966731 A | 8/1964 |
| GB | 1267855 A | 3/1972 |
| GB | 1529386 A | 10/1978 |
| IN | 231117 B | 3/2009 |
| JP | S5663845 A | 5/1981 |
| JP | 56155044 A | 12/1981 |
| JP | 60254022 A | 12/1985 |
| JP | S6147932 A | 3/1986 |
| JP | 62047623 A | 3/1987 |
| JP | 62140257 A | 6/1987 |
| JP | S62172081 A | 7/1987 |
| JP | 63236731 A | 10/1988 |
| JP | S6479269 A | 3/1989 |
| JP | H01201047 A | 8/1989 |
| JP | 1279058 A | 11/1989 |
| JP | H02225344 A | 9/1990 |
| JP | H05213631 A | 8/1993 |
| JP | 7223845 A | 8/1995 |
| JP | 11171593 A | 6/1999 |
| JP | 11314931 A | 11/1999 |
| JP | 2000007372 A | 1/2000 |
| JP | 2000219621 A | 8/2000 |
| JP | 2001033348 A | 2/2001 |

(56) References Cited

FOREIGN PATENT DOCUMENTS

| | | | |
|---|---|---|---|
| JP | 2001072441 A | 3/2001 | |
| JP | 2001180969 A | 7/2001 | |
| JP | 2001192239 A | 7/2001 | |
| JP | 2001229526 A | 8/2001 | |
| JP | 2001236634 A | 8/2001 | |
| JP | 2002003241 A | 1/2002 | |
| JP | 2002249340 A | 9/2002 | |
| JP | 2003053259 A | 2/2003 | |
| JP | 2006100379 A | 4/2006 | |
| JP | 2006291049 A | 10/2006 | |
| JP | 2007204728 A | 8/2007 | |
| JP | 2008195602 A | 8/2008 | |
| JP | 2009108181 A | 5/2009 | |
| JP | 2009207618 A | 9/2009 | |
| JP | 2010059038 A | 3/2010 | |
| JP | 4483331 B2 | 6/2010 | |
| KR | 1006303090000 | 9/2006 | |
| RO | 83460 A2 | 3/1984 | |
| RU | 2071492 C1 | 1/1997 | |
| RU | 2514939 C2 | 5/2014 | |
| SU | 504719 A1 | 2/1976 | |
| SU | 990700 A1 | 1/1983 | |
| TW | 201034993 A | 10/2010 | |
| TW | 201223895 A | 6/2012 | |
| WO | 90/05031 A1 | 5/1990 | |
| WO | 95/10487 A1 | 4/1995 | |
| WO | 97/25932 A1 | 7/1997 | |
| WO | 01/17569 A2 | 3/2001 | |
| WO | 2008050500 A1 | 5/2008 | |
| WO | 2009002660 A2 | 12/2008 | |
| WO | 2009028862 A1 | 3/2009 | |
| WO | 2009095569 A1 | 8/2009 | |
| WO | 2010115728 A2 | 10/2010 | |
| WO | 2011001501 A1 | 1/2011 | |
| WO | 2011069338 A1 | 6/2011 | |
| WO | 2011073106 A1 | 6/2011 | |
| WO | 2011080543 A1 | 7/2011 | |
| WO | 2011103798 A1 | 9/2011 | |
| WO | 2012047950 A1 | 4/2012 | |
| WO | 2013063290 A1 | 5/2013 | |
| WO | 2013185018 A1 | 12/2013 | |

OTHER PUBLICATIONS

ASTM, "Standard Specification for Glasses in Laboratory Apparatus," Designation E438-92 {Reapproved 2006). Retrieved from the Internet: <URL: http://enterprise2.astm.org/DOWNLOAD/E438-92R06.1656713-1.pdf>. p. 1.
International Search Report & Written Opinion mailed Feb. 26, 2014 for International Patent Application No. PCT/US2013/071437 filed Nov. 22, 2013. pp. 1-12.
International Search Report & Written Opinion mailed Feb. 26, 2014 for International Patent Application No. PCTJUS2013/071447 filed Nov. 22, 2013. pp. 1-13.
International Search Report & Written Opinion mailed Feb. 26, 2014 for International Patent Application No. PCT/US2013/071460 filed Nov. 22, 2013. pp. 1-12.
International Search Report & Written Opinion mailed Feb. 26, 2014 for International Patent Application No. PCTJUS2013/071473 filed Nov. 22, 2013. pp. 1-13.
Non-Final Office Action dated Mar. 20, 2014 relating to U.S. Appl. No. 14/057,697, filed Oct. 18, 2013. pp. 1-14.
Non-Final Office Action dated Aug. 13, 2014 relating to U.S. Appl. No. 13/780,740, filed Feb. 28, 2013. pp. 1-43.
Non-Final Office Action dated Sep. 9, 2014 relating to U.S. Appl. No. 14/057,697, filed Oct. 18, 2013. pp. 1-15.
U.S. Pharmacopeia Convention Medicines Compendium, "<660> Containers-Glass" [online], (2014). Retrieved from he Internet: <URL: https://mc.usp.org/general-chapters>. pp. 1-5.
European Pharmacopeia, 5th edition, 3.2 Containers, [online]. Retrieved from the Internet: <URL: http://Pharmacyebooks.com/2009/09/european-pharmacopoeia-5-0--Online.html>. 4 Pages, (2005).

Non-Final Office Action dated May 30, 2019, for U.S. Appl. No. 15/337,695, filed Oct. 28, 2016. pp. 1-13.
Ciullo, P.A., Industrial Minerals and Their Uses—A Handbook and Formulary. William Andrew Publishing/Noyes, 1996). ISBN: 0-8155-1408-5. Online version available at: <URL: http://app.knovel.com/hotlink/toc/id:kpIMTUAHFB/ndustrial-minerals-their/industrial-minerals-their>. pp. 1-7.
Final Office Action dated Jul. 16, 2014 relating to U.S. Appl. No. 14/052,048, filed Oct. 11, 2013. pp. 1-9.
Plueddemann, Edwin, "Silane Coupling Agents," Springer Science+Business Media, LLC (1982). ISBN: 978-1-4899-0344-0. pp. 1-18.
Non-Final Office Action dated Nov. 14, 2014 relating to U.S. Appl. No. 14/075,605, filed Nov. 8, 2013. pp. 1-9.
Notice of Allowance dated Jan. 7, 2015 relating to U.S. Appl. No. 14/052,048, filed Oct. 11, 2013. pp. 1-10.
Non-Final Office Action dated Jan. 29, 2015 relating to U.S. Appl. No. 13/780,740, filed Feb. 28, 2013. pp. 1-79.
Hawley's Condensed Chemical Dictionary Melting Points, 2007. pp. 1-5.
Non-Final Office Action dated Mar. 4, 2015 relating to U.S. Appl. No. 14/057,697, filed Oct. 18, 2013. pp. 1-12.
Final Office Action dated May 6, 2015 relating to U.S. Appl. No. 13/780,740, filed Feb. 28, 2013. pp. 1-36.
English Machine Translation of CN 101831175 A (Sep. 15, 2010); pp. 1-13.
Pappalardo, L. T., "Dsc Evaluation of Epoxy and Polyimide-Impregnated Laminates (Prepregs)"; Journal of Applied Polymer Science, vol. 21, 809-820, John Wiley & Sons, Inc. (1977).
Keramid and Kerimide 601, Scifinder American Chemical Society (ACS) (2015); pp. 1-5.
Polyimide—Hawley's Condensed Chemical Dictionary—Wiley Online (2007); 1 Page.
Tyzor (Du Pont)—Hawley's Condensed Chemical Dictionary—Wiley Online (2007). 1 Page.
McKeen, L., "Fatigue and Tribological Properties of Plastics and Elastomers," 2d Ed 7 Polyimides, (2010); 25 Pages.
English Translation of Japanese 1st Office Action dated Mar. 6, 2019 for JP Patent Application No. 2018-006413. pp. 1-11.
Non-Final Office Action dated Jun. 8, 2021, for U.S. Appl. No. 15/280,101 filed Sep. 29, 2016. pp. 1-22.
Japanese 1st Office Action dated Jun. 30, 2021, for JP Patent Application No. 2020-82562. pp. 1-12.
Non-Final Office Action dated Jul. 15, 2021, for U.S. Appl. No. 16/355,797, filed Mar. 17, 2019. pp. 1-13.
Non-Final Office Action dated Sep. 1, 2020 for U.S. Appl. No. 15/337,695, filed Oct. 28, 2016. pp. 1-25.
Final Office Action dated Mar. 12, 2021, for U.S. Appl. No. 15/337,695, filed Oct. 28, 2016. pp. 1-23.
Extended European Search Report dated Sep. 8, 2021, for EP Patent Application No. 21187669.3. pp. 1-11.
Shallenberger J_ R. et al: Adsorption of polyamides and polyamide-silane mixtures at glass surfaces, Surface and Interface Analysis, vol. 35, No. 8, Aug. 1, 2003 {Aug. 1, 2003), pp. 667-672, XP055081787, SSN: 0142-2421, DOI: 10.1002/sia.1589.
Nohl C. J_ et al: Modification of the surface properties of polyimide films using polyhedral oligomeric silsesquioxanE:leposition and oxygen plasma exposure, Applied Surface Science, Elsevier, Amsterdam, NL, vol. 255, No. 18, Jun. 30, 2009 (Jun. 30, 2009), pp. 8135-8144, XP026221236, ISSN: 0169-4332, DOI: 10.1016/J_APSUSC.2009.05.030.
Non-Final Office Action dated Apr. 7, 2023, pertaining to U.S. Appl. No. 16/925,297, 138 pgs.
Notice of Allowance dated Apr. 7, 2023, pertaining to U.S. Appl. No. 17/213,859, 40 pgs.
Notice of Allowance dated Mar. 28, 2023, pertaining to U.S. Appl. No. 16/024,825, 15 pgs.
Taiwan Office Action dated Oct. 21, 2021 in related Taiwan Patent Application No. 110124379, 3 pages.
European Search Report dated Jan. 24, 2023, pertaining to EP Patent Application No. 20177871.9, 6 pgs.
Andreica V. et al., "High acid resistance packaging glass—consists of silica based mix with alkaline earth oxide(s) in specific proportions", WPI/Thomson, vol. 1984, No. 34, Mar. 30, 1984, XP002690017.

(56) References Cited

OTHER PUBLICATIONS

Shallenberger J. R. et al: Adsorption of polyamides and polyamide-silane mixtures at glass surfaces, Surface and Interface Analysis, vol. 35, No. 8, Aug. 1, 2003 (Aug. 1, 2003), pp. 667-672, XP055081787, ISSN: 0142-2421, DOI: 10.1002/sia.1589.
Wohl C. J. et al: Modification of the surface properties of polyimide films using polyhedral oligomeric silsesquioxane deposition and oxygen plasma exposure, Applied Surface Science, Elsevier, Amsterdam, NL, vol. 255, No. 18, Jun. 30, 2009 (Jun. 30, 2009), pp. 8135-8144, XP026221236, ISSN: 0169-4332, DOI: 10.1016/J.APSUSC.2009.05.030.
Anderson, et al., "Polyimide-Substrate Bonding Studies Using y-APS Coupling Agent", IEEE Transactions on Components, Hybrids, and Manufacturing Technology, vol. CHMT-9, No. 4, p. 364-369, Dec. 1986.
Benitez, et al., "SiOx—SiNx functional coatings by PECVD of organosilicon monomers other than silane", Annual Technical Conference Proceedings-Society of Vacuum Coaters (2002), 45th, 280-285; ISSN: 0731-1699.
Cho, et al. "Adhesion behavior of PDMS-containing polyimide to glass", Journal of Adhesion Science and Technology 12:3, pp. 253-269, Taylor & Francis (1998), DOI: 10.1163/156856198X00867.
Dow Corning, "A Guide to Silane Solutions: Fiberglass and Composites", Silicones Simplified [online]. Dow Corning Corporation, 2009. Retrieved from the Internet: <URL: https://www.xiameter.com/en/ExploreSilicones/Documents/95-728-01 %20Fiberglass%20and%20Composites.pdf>.
Dow Corning, Resins and Intermediates Selection Guide; Paints & Inks Solutions, p. 1-8, 2010.
DuPont Teflon PFA TE-7224 Aqueous Fluoropolymers made with Echelon Dispersion Technology [online]. Dupont, 2006. Retrieved from the Internet: <URL: http://www2.dupont.com/Teflon_Industrial/en_US/assets/downloads/k15758.pdf>.
Francen, et al., "Fluorochemical glass treatments", The Glass Industry (1965), 46(10), 594-7; 628-9; SSN: 0017-1026.
G. L. Witucki, "A Silane Primer: Chemistry and Applications of Alkoxy Silanes", Journal of Coatings Technology, vol. 65) pp. 57-60, Federation of Societies for Coatings Technology, Blue Bell, Pennsylvania {Jul. 1993).
Gelest, Inc., MSDS, Material Safety Data Sheet, Aminopropylsilsesquioxane Oligomer, 22-25%—NSA-9911 [online]. Gelest, Inc. Morrisville, PA, 2008. Retrieved from the Internet: <URL: http://shop.gelest.com/Droduct.aspx?catnum=WSA-9911&Index=0& TotalCount=1 >.
Iacocca, et al., "Factors Affecting the Chemical Durability of Glass Used in the Pharmaceutical Industry", MPS DharmSciTech, vol. 11, No. 3, pp. 1340-1349, Sep. 2010.
Jin, et al., "Preparation and characterization of poly{phthalazinone ether ketone)/SiO2 hybrid composite thin films with low friction coefficient", Journal of Sol-Gel Science and Technology, Springer Science+Business Media, LLC (2008), 16(2), 208-216; ISSN: 0928-0707.
Jin, et al., "Preparation and investigation of the Iribological behavior of poly(phlhalazinone ether kelone)/silica thin films", Chinese Journal of Materials Research. vol. 22, No. 1, pp. 26-30. Feb. 25, 2008. ISSN: 1005-3093. Published by: Chinese Academy of Sciences, No. 1, Beijing, China.
Thermal Stability of the Silica-Aminopropylsilane-Polyimide Interface, Linde, et al. Journal of Polymer Science, Polymer Chemistry Edition, vol. 22, 3043-3062, John Wiley & Sons, Inc. (1984).
Metwalli et al., Journal of Colloid and Interface Science 298 (2006) 825-831.
Poe, et al., "Zero CTE polyimides for athermal optical membranes", Proceedings of SPIE, vol. 7061, Issue: Novel Optical Systems Design and Optimization XI, pp. 706114/1-706114/9, Journal, 2008, Publisher: Society of Photo—Optical Instrumentation Engineers, ISSN: 0277-786X.

Schmid, et al. "Recommendations on Delaminalion Risk Mitigation & Prediction for Type I Pharmaceutical Containers Made of Tubing Glass", Nuova Ompi: Glass Division, p. 40-42., 2012, Frederick Furness Publishing.
Schmid, et al., "Glass Delaminalion: Facts—Prevention—Recommendations", Stevanato Group Market Update, News Issue 5, May 2011, p. 1-4.
Smay, G. L., "The characteristics of high-temperature resistant organic polymers and the feasibility of their use as glass coaling materials", Journal of Materials Science, 20 (4), pp. 1494-1500, Chapman & Hall Ind. (1985), SSN: 0022-2461.
Wahab, et al., "Silica- and Silsesquioxane-Conlaining Polymer Nanohybrids", Macromolecules Containing Metal and Metal-Like Elements, vol. 4: Group IVA Polymers, Chapter 6, 2005 John Wiley & Sons, Inc.
"Spectroscopic Ellipsometry Methods for Thin Absorbing Coatings", by Hilfiker et al. from Society of Vacuum Coaters 505/856-7188, pp. 511-516, 51st Annual Technical Conference Proceedings, Chicago, IL, Apr. 19-24, 2008.
Non-Final Office Action dated Jul. 30, 2013 relating to U.S. Appl. No. 13/780,740, filed Feb. 28, J013. pp. 1-34.
Pantano, Carlo G.,"The Role of Coatings and Other Surface Treatments in the Strength of Glass", [online], Department of Materials Science and Engineering Materials Research Institute, The Pennsylvania State University, University Park, PA. 2009. Retrieved from the Internet: <URL: hllp://www.gmic.org/Slrength%20In%20Glass/Panlano1/o20Pac%20Rim.pdf>. pp. 1-55.
Dean et al., "Pharmaceutical Packaging Technology", CRC Press. Nov. 2000. p. 149.
2 ~aiwan 1st Office Action & Search Report dated Jul. 30, 2018 for TW Patent Application No. 107102807. pp. 1-2.
Non-Final Office Action dated Feb. 6, 2019 for U.S. Appl. No. 15/280,101 filed Sep. 29, 2016. pp. 1-14.
English Translation of Japanese Decision on Rejection issued Nov. 14, 2018, for JP Patent Application No. 2015-545049. pp. 1-5.
English Translation of Japanese 1st Office Action dated Feb. 13, 2019 for JP Patent Application No. 2018-019178 pp. 1-5.
The United States Pharmacopeial Convention; USP 39, <788> Particulate Matter in Injections/ Physical Tests; official from Dec. 1, 2016, pp. 608-611.
Non-Final Office Action dated Mar. 4, 2020 for U.S. Appl. No. 15/280,101, filed Sep. 29, 2016. pp. 1-17.
English Translation of Russian 1st Office Action and Search Report dated Feb. 11, 2020, for RU Patent Application No. 2018111021. pp. 1-15.
Final Office Action dated May 12, 2020, for U.S. Appl. No. 15/687,059. pp. 1-18.
Non-Final Office Action dated Jun. 11, 2020, for U.S. Appl. No. 16/870,657, filed May 8, 2020. pp. 1-31.
Lyophilization: Growing with Biotechnology, Genetic Engineering & Biotechnology News, Sep. 15, 2005, vol. 11 J5, No. 16, acquired from https://www.genengnews.com/magazine/35/lyophilization-growing-with-biotechnology/ {Year: 2005). pp. 1-7.
International Search Report & Written Opinion mailed Oct. 28, 2013, relating to PCT/US2013/028187 filed Feb. 28, 2013. pp. 1-13.
International Search Report & Written Opinion mailed Oct. 28, 2013 relating to PCT/US2013/048589 filed Jun. 28, 2013. pp. 1-15.
International Search Report & Written Opinion mailed Jan. 16, 2014 relating to PCT/US2013/066370 filed Oct. 23, 2013. pp. 1-12.
Huang, et al., "Cubic silsesquioxane-polyimide nanocomposites with improved thermomechanical and dielectric properties", Acta Materialia, Elsevier, vol. 53, No. 8, pp. 2395-2404, May 1, 2005; ISSN: 1359-6454.
Final Office Action dated Jan. 28, 2014 relating to U.S. Appl. No. 13/780,740, filed Feb. 28, 2013. pp. 1-37.
Non-Final Office Action dated Mar. 10, 2014 relating to U.S. Appl. No. 14/052,048, filed Oct. 11, 2013. pp. 1-11.

* cited by examiner

| ABBREVIATION | COMMERCIAL NAME | CHEMICAL STRUCTURE |
|---|---|---|
| 6FDA-mPDA/pDA | AVIMID N | |
| 6FDA-ODA | PYRALIN DI 2566 DUPONT | |
| 6FDA-4,4'-6FDA | SIXEF 44 | |
| 6FDA-3,3'-6FDA | SIXEF 33 | |
| 6FDA-DURENE | SIXEF DURENE | |
| 6FDA-4-BDAF | LARC-CP 1 NeXolve | |

FIG. 5

GLASS ARTICLES WITH MIXED POLYMER AND METAL OXIDE COATINGS

CROSS REFERENCE TO RELATED APPLICATIONS

The present application is a divisional application of and claims priority to U.S. patent application Ser. No. 17/345,251, filed Jun. 11, 2021, which is a continuation application of and claims priority to U.S. patent application Ser. No. 15/337,695, filed Oct. 28, 2016, which claims priority to U.S. Provisional Patent Application Ser. No. 62/248,827 filed Oct. 30, 2015 and entitled "Glass Articles With Mixed Polymer And Metal Oxide Low-Friction Coatings", the entirety of which is incorporated by reference herein.

BACKGROUND

Field

The present specification generally relates to coatings and, more specifically, to coatings applied to glass containers such as pharmaceutical packages.

Technical Background

Historically, glass has been used as the preferred material for packaging pharmaceuticals because of its hermeticity, optical clarity, and excellent chemical durability relative to other materials. Specifically, the glass used in pharmaceutical packaging must have adequate chemical durability so as not to affect the stability of the pharmaceutical compositions contained therein. Glasses having suitable chemical durability include those glass compositions within the ASTM standard 'Type 1B' which have a proven history of chemical durability.

However, use of glass for such applications is limited by the mechanical performance of the glass. In the pharmaceutical industry, glass breakage is a safety concern for the end user, as the broken package and/or the contents of the package may injure the end user. Further, non-catastrophic breakage (i.e., when the glass cracks but does not break) may cause the contents to lose their sterility which, in turn, may result in costly product recalls.

Specifically, the high processing speeds utilized in the manufacture and filling of glass pharmaceutical packages may result in mechanical damage on the surface of the package, such as abrasions, as the packages come into contact with processing equipment, handling equipment, and/or other packages. This mechanical damage significantly decreases the strength of the glass pharmaceutical package resulting in an increased likelihood that cracks will develop in the glass, potentially compromising the sterility of the pharmaceutical contained in the package or causing the complete failure of the package.

One approach to improving the mechanical durability of the glass package is to thermally and/or chemically temper the glass package. Thermal tempering strengthens glass by inducing a surface compressive stress during rapid cooling after forming. This technique works well for glass articles with flat geometries (such as windows), glass articles with thicknesses greater than about 2 mm, and glass compositions with high thermal expansion. However, pharmaceutical glass packages typically have complex geometries (vial, tubular, ampoule, etc.), thin walls (sometimes between about 1-1.5 mm), and are produced from low expansion glasses, making glass pharmaceutical packages unsuitable for strengthening by conventional thermal tempering. Chemical tempering also strengthens glass by the introduction of surface compressive stress. The stress is introduced by submerging the article in a molten salt bath. As ions from the glass are replaced by larger ions from the molten salt, a compressive stress is induced in the surface of the glass. The advantage of chemical tempering is that it can be used on complex geometries, thin samples, and is relatively insensitive to the thermal expansion characteristics of the glass substrate.

However, while the aforementioned tempering techniques improve the ability of the strengthened glass to withstand blunt impacts, these techniques are less effective in improving the resistance of the glass to abrasions, such as scratches, which may occur during manufacturing, shipping and handling.

Accordingly, a need exists for alternative glass articles which have improved resistance to mechanical damage.

SUMMARY

According to one embodiment, a pharmaceutical package may comprise a glass container and a coating. The glass container may comprise a first surface and a second surface opposite the first surface. The first surface may be an outer surface of the glass container. The coating may be positioned over at least a portion of the first surface of the glass container. The coating may comprise one or more polyimide compositions and one or more metal oxide compositions. The one or more polyimide compositions and the one or more metal oxide compositions may be mixed in the coating.

In another embodiment, a pharmaceutical package may be produced by a method comprising depositing a coating mixture onto a first surface of an outer surface of a glass container, and heating the coating mixture to form a coating on the outer surface of the glass container. The coating mixture may comprise one or more metal oxide precursors. The coating mixture may also comprise one or more polymer compositions, one or more polymer precursors, or both. The coating may comprise one or more polymer compositions and one or more metal oxide compositions.

In yet another embodiment, a pharmaceutical package may comprise a glass container and a coating. The glass container may comprise a first surface and a second surface opposite the first surface. The first surface may be an outer surface of the glass container. The coating may be positioned over at least a portion of the first surface of the glass container. The coating may comprise one or more polymer compositions, and one or more metal oxide compositions. The one or more polymer compositions and the one or more metal oxide compositions may be mixed in the coating. The weight ratio of the one or more metal oxide compositions to the one or more polymer compositions may be from about 20/80 to about 95/5. The combination of polymers and metal oxides in the coating may comprise at least about 95 wt. % of the coating.

Additional features and advantages of the coatings that may be used for coating glass article, coated glass articles, and methods and processes for manufacturing the same will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an over-view or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 5 depicts chemical structures for some suitable fluorinated polyimides that may be incorporated in a coating, according to one or more embodiments shown and described herein;

DETAILED DESCRIPTION

Reference will now be made in detail to various embodiments of coatings, glass articles with coatings, and methods for producing the same, examples of which are schematically depicted in the figures. Such coated glass articles may be glass containers suitable for use in various packaging applications including, without limitation, as pharmaceutical packages. It should be understood that coated glass articles may refer to coated pharmaceutical packages as described in this disclosure. In embodiments, the coatings and/or the coated pharmaceutical packages are thermally stable when, after initial coating application and curing, they are exposed to high temperatures such as those utilized during a depyrogenation process. For example, the coated glass articles described herein may sufficiently retain their low coefficient of friction following a thermal treatment and may not substantially yellow in color following such a thermal treatment. These pharmaceutical packages may or may not contain a pharmaceutical composition. In embodiments, the coatings may comprise a mixed layer comprising one or more polymers, such as polyimides, and one or more metal oxides, such as titania, zirconia, or alumina. In one or more embodiments, the coatings may be low-friction coatings.

Various embodiments of the coatings, glass articles with coatings, and methods for forming the same will be described in further detail herein with specific reference to the appended drawings. While embodiments of the coatings described herein are applied to the outer surface of a glass container, it should be understood that the coatings described may be used as a coating on a wide variety of materials, including non-glass materials and on substrates other than containers including, without limitation, glass display panels and the like.

Generally, a coating may be applied to a surface of a glass article, such as a container that may be used as a pharmaceutical package. The coating may provide advantageous properties to the coated glass article such as a reduced coefficient of friction and increased damage resistance. The reduced coefficient of friction may impart improved strength and durability to the glass article by mitigating frictive damage to the glass. Further, the coating may maintain the aforementioned improved strength and durability characteristics following exposure to elevated temperatures and other conditions, such as those experienced during packaging and pre-packaging steps utilized in packaging pharmaceuticals, such as, for example, depyrogenation, lyophilization, autoclaving and the like. Accordingly, the coatings and glass articles with the coating may be thermally stable.

Figure 1:
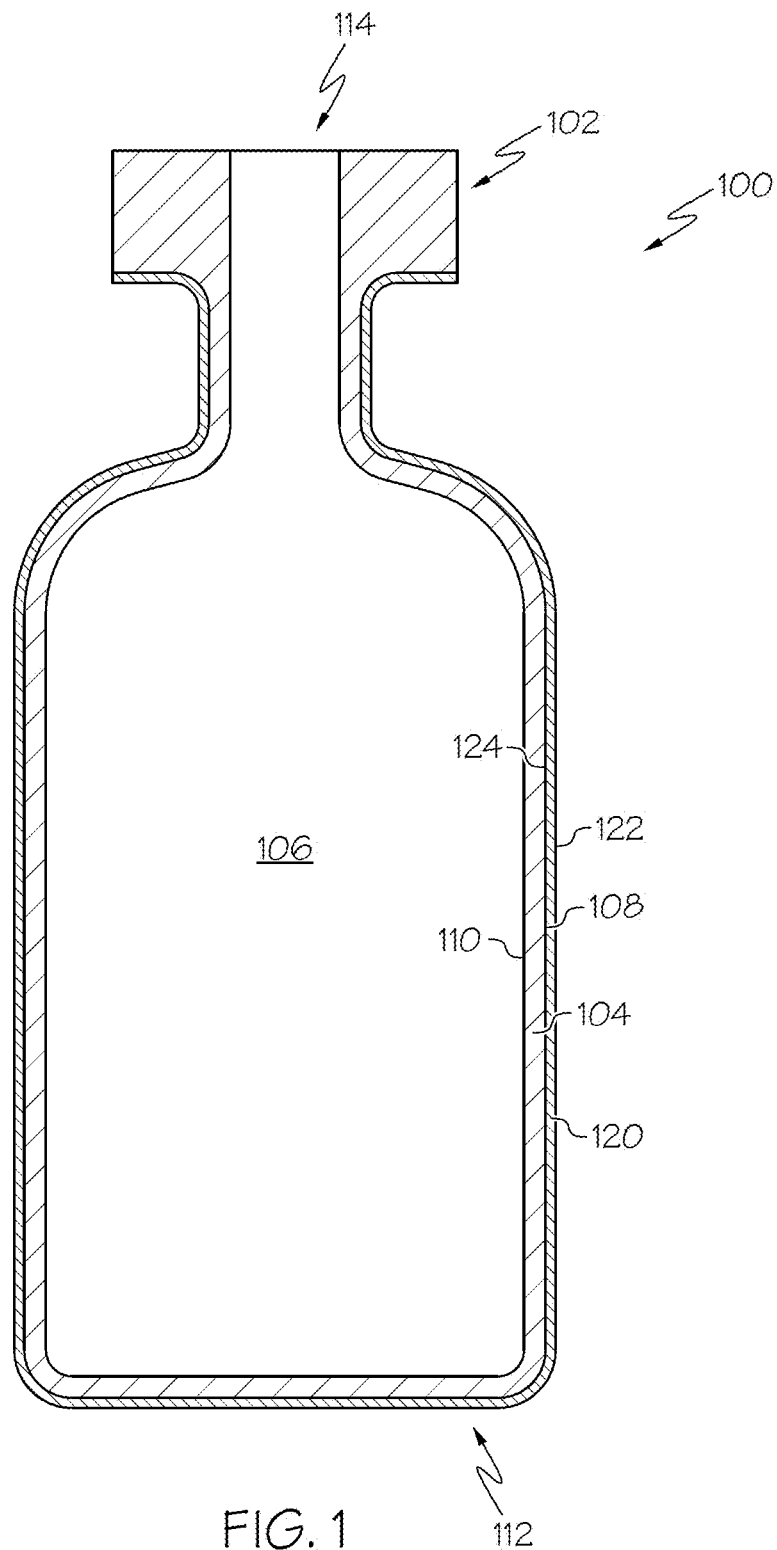
FIG. 1 schematically depicts a cross sectional view of a glass container with a coating, according to one or more embodiments shown and described herein.

FIG. 1 schematically depicts a cross section of a coated glass article, specifically a coated glass container 100. The coated glass container 100 comprises a glass body 102 and a coating 120. The glass body 102 has a glass container wall 104 extending between an exterior surface 108 (i.e., a first surface) and an interior surface 110 (i.e., a second surface). The interior surface 110 of the glass container wall 104 defines an interior volume 106 of the coated glass container 100. A coating 120 is positioned on at least a portion of the exterior surface 108 of the glass body 102. As used herein, a coating may be "positioned on" a substrate while not in direct contact with the substrate, such as if an intermediate layer is present between the substrate and a coating positioned over that substrate. In some embodiments, the coating 120 may be positioned on substantially the entire exterior surface 108 of the glass body 102. In some embodiments, such as depicted in FIG. 1, the coating 120 may be bonded to the glass body 102 at the exterior surface 108. The coating 120 has an outer surface 122 and a glass body contacting surface 124 at the interface of the glass body 102 and the coating 120.

In one embodiment, the coated glass container 100 is a pharmaceutical package. For example, the glass body 102 may be in the shape of a vial, ampoule, ampul, bottle, flask, phial, beaker, bucket, carafe, vat, syringe body, or the like. The coated glass container 100 may be used for containing any composition, and in one embodiment, may be used for containing a pharmaceutical composition. A pharmaceutical composition may include any chemical substance intended for use in the medical diagnosis, cure, treatment, or prevention of disease. Examples of pharmaceutical compositions include, but are not limited to, medicines, drugs, medications, medicaments, remedies, and the like. The pharmaceutical composition may be in the form of a liquid, solid, gel, suspension, powder, or the like.

Figure 2:
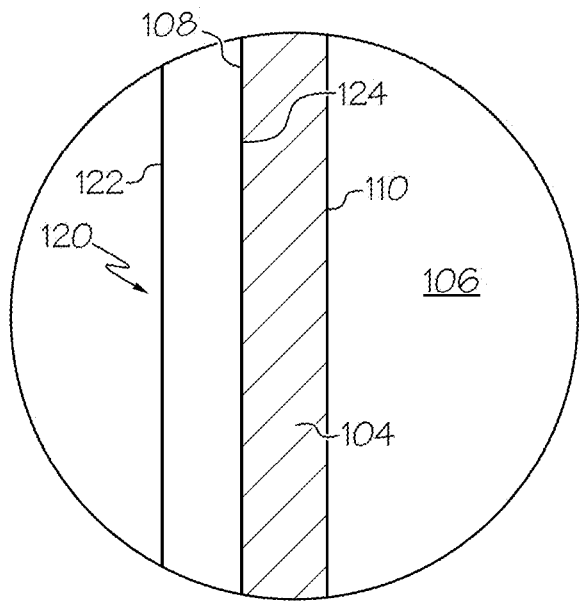
FIG. 2 schematically depicts an enlarged cross sectional view of the glass container of FIG. 1 with a mono-layer coating, according to one or more embodiments shown and described herein.

Now referring to FIGS. 1 and 2, in one embodiment, the coating 120 comprises a single-layered structure sometimes referred to herein as a "mono-layer" structure. For example, the coating 120 may have a substantially homogenous composition of a one or more polymers mixed with one or more metal oxides. In other embodiments, the mixture may be mixed but not fully homogenous. For example, in one or more embodiments, one or more chemical constituents of the mixture may congregate at an interface of the coating 120 (e.g., the interface with the glass body 102 or the outer surface 122). In such an embodiment, the local concentration of a chemical constituent may differ over different areas of the coating 120. However, it should be understood that the term "mixed" as used herein refers to layers that have at least some dispersion of at least two chemical components, and includes layers that are not fully homogenous. Generally, a mixed layer is deposited as a mixture of two or more chemical constituents contained in a coating mixture.

As noted herein, the coating 120 includes a mixed composition which includes at least a metal oxide and a polymer. In general, the polymer is a thermally stable polymer that will not degrade significantly or at all when exposed to temperatures suitable for depyrogenation, such as at least about 250° C., at least about 260° C., at least about 280° C., or even at least about 300° C. for about 30 minutes. In some embodiments, the metal oxide may include one or more of $TiO_2$ (titania), $ZrO_2$ (zirconia), $Al_2O_3$ (alumina), or combinations thereof. The coating 120 may be applied to a glass body 102 in a coating mixture comprising one or more metal oxide precursors, and one or more polymers or polymer precursors. The "coating mixture" refers to the liquid solution which contains the metal oxide precursor and polymer (or polymer precursor) which is applied to the glass body 102. Usually, the coating mixture will include one or more organic solvents along with the metal oxide precursor and polymer (or polymer precursor). As used herein, a "precursor" refers to a chemical constituent that contains material which will become a constituent in the coating 120 following application to and curing of the coated glass container 100. That is, at least some of the atoms of the precursor will become the atoms of the formed coating. For example, a metal oxide precursor may include the chemical components of the metal oxide (i.e., a metal and oxygen atoms) along with organic moieties that may evolve from the mixture during curing. A polymer precursor may include non-completely or non polymerized chemical constituents that partially or fully polymerize or otherwise react upon curing. For example a polyamic acid is considered a polymer precursor, as it imidizes to form a polyimide during curing. As used herein, a "non-completely polymerized" precursor material may exist in a polymeric state, but may require further treatment to form particular polymeric bonding, such as imidization. It should be understood that in various embodiments, more than one metal oxide precursor may be included in the coating mixture. Also, in various embodiments, more than one polymer, polymer precursor, or both, may be included in the coating mixture. Furthermore, it should be understood that various metal oxide precursor materials may be present in the coating mixture as oligomers or hydrolysates. It should be understood that for all metal oxide precursor materials disclosed herein, their oligomers and hydrolysate forms are contemplated as suitable metal oxide precursors.

In one or more embodiments, the metal oxide of the coating 120 may comprise titania, zirconium, alumina, or combinations thereof. However, other metal oxides are contemplated herein. The metal oxide constituent of the coating 120 may be formed from a metal oxide precursor. The metal oxide precursor may have a generalized formula of MeX$_n$, where Me represents a metal element such as Ti, Al, or Zr, and each X represents a hydroxyl group, a hydrolyzable group, or chelating group, and where each X may be the same or different. In embodiments, n may be 3 or 4, or other values depending upon the metal element utilized. Example metal oxide precursors include titanates, zirconates, aluminates, zirconium aluminates, hydrolysates or oligomers thereof, and mixtures thereof.

In another embodiment, the metal oxide may be titania formed from a titanium-containing metal oxide precursor, where the metal oxide precursor may be a tetra-ortho-titanate, which may be represented generally by the chemical structure Ti(OR)$_4$. Examples of tetra-ortho-titanates include tetraethyl orthotitanate; tetramethyl orthotitanate; tetraisopropyl orthotitanate (commercially available as TYZOR TPT from Dorf Ketal (formerly DuPont)); tetra-pentyl orthotitanate; tetraoctyl orthotitanate, tetradodecyl orthotitanate; tetra-2-ethylhexyl orthotitanate; tetrabenzyl orthotitanate; tetracyclohexyl orthotitanate; tetraphenyl orthotitanate; tetraethoxyethyl orthotitanate; tetra-n-butyl titanate (commercially available as TYZOR TnBT from Dorf Ketal); tetrakis(2-ethylhexyl)titanate (commercially available as TYZOR TOT from Dorf Ketal); and tetra-beta-naphthyl ortho-titanate.

In another embodiment, the metal oxide may be titania formed from a titanium-containing metal oxide precursor, where the metal oxide precursor may be a hexa-coordinate chelated titanate. Hexa-coordinate chelated titanates may be represented by the generalized chemical structure of Chemical Structure #1, below. Hexa-coordinate chelated titanates may be advantageous for their relative chemical stability as compared with tetra-ortho-titanates. For example, tetra-ortho-titanates may be susceptible to hydrolysis. Examples of hexa-coordinate chelated titanates include titanium acetylacetonates (commercially available as TYZOR AA, TYZOR AA-65, TYZOR AA-75, and TYZOR AA-105, each from Dorf Ketal); diisopropoxytitanium bis(acetylac-etonate) (commercially available as TYZOR-GBA from Dorf Ketal); titanium acetylacetonate bis(pentane-2, 4-dionato-O, O')bis(alkanolato)titanium (commercially available as TYZOR GBO from Dorf Ketal); diisopropoxy-bis ethylacetoacetato titanate (commercially available as TYZOR DC from Dorf Ketal); and Titanium(IV) (triethanolaminato) isopropoxide (commercially available as TYZOR TE from Dorf Ketal).

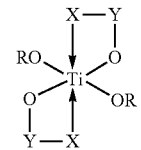

Chemical Structure #1—Generalized Titanate Chelate Structure

In another embodiment, the metal oxide may be titania formed from a titanium-containing metal oxide precursor, where the metal oxide precursor may be a polymeric titanate. The polymeric titanate may have a generalized chemical structure of RO[Ti(OR)$_2$ O$^-$]$_x$R, where R represents hydrocarbon radicals chosen from alkyl, aryl, aralkyl and cycloalkyl radicals, and x is an integer greater than 1 (such as an 4, 5, 6, 7, or 8). The average molecular weight of a polymeric titanate may be from about 1 kDa to about 1.5 kDa, and other molecular weights are contemplated. In one embodiment, a stabilized polymeric titanate can be prepared by combining a chelating agent such as, for example, ethyl acetoacetate, to a tetra-coordinate titanium compound, such as polymeric titanium dioxide.

In another embodiment, the metal oxide may be zirconia formed from a zirconium-containing metal oxide precursor. Examples of zirconium-containing metal oxide precursors include zirconium acetyl acetonate; zirconium-tert-butoxide; zirconium hexafluoroacetylacetonate; zirconium naphthenate; zirconium propoxide; zirconium isopropoxide; zircon aluminates; zirconate organometallics (such as, for example, tetra (2,2 diallyloxymethyl)butyl, di(ditridecyl) phosphito zirconate (commercially available as KZ 55 from Kenrich Petrochemicals, Inc.); neopentyl(diallyl) oxy,trineodecanoyl zirconate; neopentyl(diallyl) oxy,tri(dodecyl)benzene-sulfony zirconate; neopentyl(diallyl)oxy,tri(dioctyl) phosphato zirconate; neopentyl(diallyl)oxy,tri(dioctyl)-pyrophosphato zirconate; neopentyl(diallyl)oxy,tri(N-ethylenediamino)ethyl zirconate; neopentyl(diallyl)oxy,tri (m-amino)phenyl zirconate; neopentyl(diallyl)oxy, trimethacryl zirconate; neopentyl(diallyl)oxy,triacryl zirconate; dineopentyl(diallyl)oxy,diparamino benzoyl zirconate; dineopentyl(diallyl)oxy, di(3-mercapto)propionic zirconate), hydrolysates thereof, and combinations thereof.

In another embodiment, the metal oxide may be alumina formed from an aluminum-containing metal oxide precursor. For example, at least one metal oxide precursor may be a tetra-coordinate aluminate such as, but not limited to, aluminum di(isopropoxide)-acetoacetate ester chelate.

As described hereinabove, in one or more embodiments, the coating 120 also includes a polymer component in addition to the metal oxide. In one or more embodiments, the polymer of the coating may be any polymer or combination of polymers that do not substantially degrade at elevated temperatures such as at least about 250° C., at least about 260° C., at least about 280° C., or even at least about 300° C. As used herein, a polymer does not "substantially degrade" if it has not lost at least about 5% of its mass. For example, a TGA test can be utilized to determine whether a polymer substantially degrades at a given temperature. It should be understood that the polymers should not substantially degrade in heat treatments following the initial curing, and curing treatments do not constitute heat treatments utilized for verifying thermal stability of a coating or material of a coating, such as a polyimide. For example, polymers that may be included in the coating 120 may include polyimides, fluoropolymers, fluorinated polyimides, and/or polyamide-imides.

In one embodiment, the polymer may be a polyimide which is present in the coating mixture as a partially or fully imidized polyimide in an organic solution. For example, some fluorinated organic soluble polyimides may be used which may be present in the coating mixture in an imidized state. The polyimides may be stable in solvents such as, but not limited to, N,N-Dimethylacetamide (DMAc), N,N-Dimethylformamide (DMF), and 1-Methyl-2-pyrrolidinone (NMP) solvents, or mixtures thereof.

In another embodiment, the polymer may be formed from a polymer precursor. For example some polyimides may not be structurally stable in solution in polyimide form, and are instead present in solution as polyamic acids, which may be non-cylized polyimide precursors which may be formed from, for example, diamine monomers and dianhydride monomers. Generally, polyamic acids must be cured to become imidized chemical species. Such curing may comprise heating the polyamic acid at 300° C. for about 30 minutes or less, or at a temperature higher than 300° C., such as at least 320° C., 340° C., 360° C., 380° C., or 400° C. It is contemplated that higher curing temperatures may be paired with shorter curing times. It is believed, without being bound by theory, that the curing step imidizes a polyamic acid by reaction of carboxylic acid moieties and amide moieties to form a polyimide.

Examples of suitable fluorinated polyimides include the copolymers 2,2-bis(3,4-dicarboxyphenyl) hexafluoropropane dianhydride-co-1,4-phenylenediamine, 2,2-bis(3,4-dicarboxyphenyl) hexafluoropropane dianhydride-co-1,3-phenylenediamine; (abbreviated as 6FDA-mPDA/pPDA, commercially available as Avimid N from Cytec); 2,2-bis (3,4-dicarboxyphenyl) hexafluoropropane dianhydride-co-4, 4'-oxydianiline (abbreviated as 6FDA-ODA, commercially available as Pyralin DI 2566 from DuPont); 2,2-bis(3,4-dicarboxyphenyl) hexafluoropropane dianhydride-co-1,4-phenylenediamine, 2,2-bis(3,4-dicarboxyphenyl) hexafluoropropane dianhydride-co-4,4'-(2,2,2-trifluoro(1-trifluoromethyl)ethylidene)bisbenzeneamine (abbreviated as 6FDA-4,4'-6F (commercially available as Sixef 44 from Hoechst Celanese); 2,2-bis(3,4-dicarboxyphenyl) hexafluoropropane dianhydride-co-1,4-phenylenediamine, 2,2-bis(3, 4-dicarboxyphenyl) hexafluoropropane dianhydride-co-3,3'-(2,2,2-trifluoro(1-trifluoromethyl)ethylidene) bisbenzeneamine (abbreviated as 6FDA-3,3'-6F, commercially available as Sixef 33 from Hoechst Celanese); 2,2-bis(3,4-dicarboxyphenyl) hexafluoropropane dianhydride-co-2,3,5,6-tetramethylphenylene diamine (abbreviated as 6FDA-Durene, commercially available as Sixef Durene from Hoechst Celanese); and 2,2-bis(3,4-dicarboxyphenyl) hexafluoropropane dianhydride-co-2,2-bis[4-(4-aminophenoxy) phenyl]hexafluoropropane (abbreviated 6FDA-4-BDAF, commercially available as LARC-CP1 from NeXolve). Chemical Structures for these fluorinated polyimides are provided in FIG. 5.

In another embodiment, halogenated polyimide siloxanes may be utilized as the polymer component in the coating 120. Such halogenated polyimide siloxanes may be halogenated, such as fluorinated, and may comprise siloxane moieties. Examples of suitable halogenated polyimide siloxanes can be found in European Patent Application 15290254.0, entitled "Halogenated Polyimide Siloxane Chemical Compositions and Glass Articles with Halogenated Polyimide Siloxane Low-Friction Coatings," which is incorporated by reference herein in its entirety. These halogenated polyimide siloxanes may be advantageous because they may be soluble in a partially or fully imidized form in a non-toxic and low boiling point solvent such as acetates or ketones (e.g., low boiling point solvents may include ethyl acetate, propyleneglycol methyl ether acetate, toluene, acetone, 2-butanone, and mixtures thereof).

The coating may be applied by contacting the coating mixture with the glass body 102. The coating mixture contains the at least one metal oxide precursor and the at least one polymer (or polymer precursor, e.g. a polyamic acid). The coating mixture may further comprise a solvent, such as an organic solvent. In embodiments, the non-solvents portion of the metal oxide precursor and polymer (or polymer precursor) may comprise from about 0.5 wt. % to about 10 wt. %, such as about 1 wt. %, about 2 wt. %, or about 3 wt. % of the coating mixture. The solids weight percent may be changed to enable coatings having different thicknesses. For example, higher weight percent coating mixtures may deposit thicker layers of coating 120. It has been found that, in one or more embodiments, relatively low solids weight percent coating mixtures are suitable for coating embodiments containing relatively higher amounts of polymer, and that relatively high solids weight percent coating mixtures are suitable for coating embodiments containing relatively higher amounts of metal oxide precursor.

Referring again to FIGS. 1 and 2, the coating 120 may be applied in a single deposition step where the coating 120 comprises a single layer. Deposition may be by a submersion process, or alternatively, the coating 120 may be applied by a spray or other suitable means, and optionally dried. A description of suitable deposition methods for the coatings 120 described herein may be found in U.S. patent application Ser. No. 13/780,740 entitled "Glass Articles with Low-Friction Coatings," which is incorporated by reference in its entirety herein. In additional embodiments, multiple depositions may be utilized. For example, multiple coating precursor depositions may be performed and then cured, or curing may follow each deposition step, such that a second coating of precursor is applied onto a cured layer.

Following deposition of the coating mixture, at least a portion of the organic solvent of the coating mixture is liberated, either by passive drying or by active drying step(s) such as controlled air flow or increased temperatures. The coated glass containers 100 may then be cured by exposure to heat. As described herein, "curing" refers to any process (usually by heating) which changes the material on the coating from the precursor material to an intermediate or final material. For example, some embodiments utilize a curing by heating which liberates constituents from the metal oxide precursor and forms the metal oxide. Curing, as described herein, need not involve cross-linking of polymers, or the polymerization of polymers. For example, a precursor composition that includes a polyimide and a metal oxide precursor may be cured under heat to liberate some mass from the metal oxide precursor to form the metal oxide. Such curing may comprise heating the coated vial at 300° C. for about minutes or less, or at a temperature higher than 300° C., such as at least 320° C., 340° C., 360° C., 380° C., or 400° C. Curing conditions may depend on the type of precursor materials utilized. Without being bound by theory, it is believed that the curing step liberates organic constituents of the metal oxide precursor, forming a metal oxide such as titania, alumina, or zirconia. Additionally, the curing step may partially or fully polymerize a polymer precursor, such as imidize a polyamic acid. Also, the curing step liberates any remaining solvents of the coating mixture. Without being bound by theory, it is believed that the metal oxide precursor blended with a suitable polymer is converted into the metal oxide in-situ by curing the coating without any need for a prehydrolysis reaction.

The coating 120 applied to the glass body 102 may have a thickness of less than or equal to about 100 μm, less than or equal to about 10 μm, less than or equal to about 8 μm, less than or equal to about 6 μm, less than or equal to about 4 μm, less than or equal to about 3 μm, less than or equal to about 2 μm, or even less than or equal to about 1 μm. In some embodiments, the thickness of the coating 120 may be less than or equal to about 800 nm, less than or equal to about 600 nm, less than or equal to about 400 nm 300 nm, less than or equal to about 200 nm, or even less than or equal to about 100 nm thick. In other embodiments, the coating 120 may be less than about 90 nm thick, less than about 80 nm thick, less than about nm thick, less than about 60 nm thick, less than about 50 nm, or even less than about 25 nm thick. In embodiments, the coating 120 may have a thickness of at least about 10 nm, at least about 15 nm, at least about 20 nm, at least about 25 nm, at least about 30 nm, at least about 35 nm, at least about 40 nm, or even at least about 45 nm. Exemplary embodiments may have a thickness of from about 20 nm to about 50 nm, from about 25 nm to about 45 nm, or from about 30 nm to about 40 nm. Without being bound by theory, it is believed that relatively thin coatings (i.e., less than 20 nm) may not adequately protect the glass, resulting in checking on the glass surface during vial-to-vial contact. In addition such relatively thin coatings may not survive a depyrogenation process. On the other hand, relatively thick coatings (i.e., greater than nm) may be more easily damaged and wear tracks in the coating may appear from vial-on-vial contacting. It should be noted that in the case of the relatively thick coatings, the wear tracks are believed to be deformations in the coating, and not in the glass. As described herein, wear tracks are visible tracks caused by abrasion on a coating, leaving a track or scuff. In some embodiments, wear tracks may signify glass checking and/or relatively high coefficient of friction (e.g., 0.7 or greater).

In some embodiments, the coating 120 may not be of uniform thickness over the entirety of the glass body 102. For example, the coated glass container 100 may have a thicker coating 120 in some areas, due to the process of contacting the glass body 102 with one or more coating solutions that form the coating 120. In some embodiments, the coating 120 may have a non-uniform thickness. For example, the coating thickness may be varied over different regions of a coated glass container 100, which may promote protection in a selected region.

In some embodiments, a combination of polymers, such as polyimides, and metal oxides in the coating may comprise at least about 50 wt %, at least about 60 wt. %, at least about wt. %, at least about 80 wt. %, at least about 90 wt. %, at least about 95 wt. %, at least about 96 wt. %, at least about 97 wt. %, at least about 98 wt. %, at least about 99 wt. %, at least about 99.5 wt. %, at least about 99.8 wt. %, or even at least about 99.9 wt. % of the coating. In some embodiments, where other constituents are not present, the combination coating 120 may consist of a combination of metal oxides and polymers.

In one or more embodiments, the total amount of the one or more metal oxide compositions in the coating may be from about 20 wt. % to about 95 wt. % following curing. For example, total amount of the one or more metal oxide compositions in the coating may be from about 20 wt. % to about 30 wt. %, from about 20 wt. % to about 40 wt. %, from about 20 wt. % to about 50 wt. %, from about 20 wt. % to about 60 wt. %, from about 20 wt. % to about 70 wt. %, from about 20 wt. % to about 80 wt. %, from about 20 wt. % to about 90 wt. %, from about wt. % to about 95 wt. %, from about 40 wt. % to about 95 wt. %, from about 50 wt. % to about wt. %, from about 60 wt. % to about 95 wt. %, from about 70 wt. % to about 95 wt. %, from about 80 wt. % to about 95 wt. %, or from about 90 wt. % to about 95 wt. %.

In one embodiment, the total amount of the one or more polymer compositions in the coating may be from about 5 wt. % to about 80 wt. % following curing. For example, total amount of the one or more polymer compositions in the coating may be from about 5 wt. % to about 20 wt. %, from about 5 wt. % to about 30 wt. %, from about 5 wt. % to about 40 wt. %, from about 5 wt. % to about 50 wt. %, from about 5 wt. % to about 60 wt. %, from about 5 wt. % to about 70 wt. %, from about 10 wt. % to about 80 wt. %, from about 20 wt. % to about 80 wt. %, from about 30 wt. % to about 80 wt. %, from about 40 wt. % to about 80 wt. %, from about 50 wt. % to about 80 wt. %, from about 60 wt. % to about 80 wt. %, from about 70 wt. % to about 80 wt. %.

In one or more embodiments, the weight ratio of the one or more metal oxide compositions to the one or more polymer compositions may be at least about 20/80, at least about 25/75, at least about 30/70, at least about 35/65, at least about 40/60, at least about 45/55, at least about 50/50, at least about 55/45, at least about 60/40, at least about 65/35, at least about 70/30, at least about 75/25, at least about 80/20, at least about 85/15, or even at least about 90/10. The weight ratio of the one or more metal oxide compositions to the one or more polymer compositions may be from about 20/80 to about 95/5. For example, the weight ratio of the one or more metal oxide compositions to the one or more polymer compositions may be from about 25/75 to about 95/5, from about 30/70 to about 95/5, from about 35/65 to about from about 40/60 to about 95/5, from about 45/55 to about 95/5, from about 50/50 to about 95/5, from about 55/45 to about 95/5, from about 60/40 to about 95/5, from about 65/35 to about 95/5, from about 70/30 to about 95/5, from about 75/25 to about 95/5, from about to about 95/5, from about 85/15 to about 95/5, from about 90/10 to about 95/5, from about 20/80 to about 90/10, from about 20/80 to about 85/15, from about 20/80 to about 80/20, from about 20/80 to about 75/25, from about 20/80 to about 70/30, from about 20/80 to about from about 20/80 to about 60/40, from about 20/80 to about 55/45, from about 20/80 to about 50/50, from about 20/80 to about 45/55, from about 20/80 to about 40/60, from about to about 35/65, from about 20/80 to about 30/70, from about 20/80 to about 25/75.

It should be understood that as used herein, a ratio of "one or more" components of a first type to "one or more" components of a second type (e.g., polymers and metal oxides) refers to the ratio of total amount of the first type of component to the total amount of the second type of component. For example, if two different metal oxides and two different polymers were included in the coating, weight ratio of the one or more metal oxide compositions to the one or more polymer compositions would be equal to the combined weight of the two metal oxides divided by the combined weight of the two polymers. The ratio may be applicable to the precursor components as applied to the glass container (pre-curing) or in the coating of the post-cured article.

The glass containers of the pharmaceutical packages, to which the coating 120 may be applied, may be formed from a variety of different glass compositions. The specific composition of the glass article may be selected according to the specific application such that the glass has a desired set of physical properties. According to one or more embodiments, the glass may be a composition which is known to exhibit chemical durability and low thermal expansion, such as alkali borosilicate glasses. According to another embodiment, may be formed from a Type I, Class B glass according to ASTM Standard E438-92.

The glass containers may be formed from a glass composition which has a coefficient of thermal expansion in the range from about $25 \times 10^{-7}/°$ C. to $80 \times 10^{-7}/°$ C. For example, in some embodiments described herein, the glass body 102 is formed from alkali aluminosilicate glass compositions which are amenable to strengthening by ion exchange. Such compositions generally include a combination of $SiO_2$, $Al_2O_3$, at least one alkaline earth oxide, and one or more alkali oxides, such as $Na_2O$ and/or $K_2O$. In some of these embodiments, the glass composition may be free from boron and compounds containing boron. In some other embodiments the glass compositions may further comprise minor amounts of one or more additional oxides such as, for example, $SnO_2$, $ZrO_2$, $ZnO$, $TiO_2$, $As_2O_3$, or the like. These components may be added as fining agents and/or to further enhance the chemical durability of the glass composition. In another embodiment, the glass surface may comprise a metal oxide coating comprising $SnO_2$, $ZrO_2$, $ZnO$, $TiO_2$, $As_2O_3$, or the like.

In some embodiments described herein, the glass body 102 is strengthened such as by ion-exchange strengthening, herein referred to as "ion-exchanged glass". For example, the glass body 102 may have a compressive stress of greater than or equal to about 300 MPa or even greater than or equal to about 350 MPa. In some embodiments, the compressive stress may be in a range from about 300 MPa to about 900 MPa. However, it should be understood that, in some embodiments, the compressive stress in the glass may be less than 300 MPa or greater than 900 MPa. In some embodiments, the glass body 102 may have a depth of layer greater than or equal to 20 μm. In some of these embodiments, the depth of layer may be greater than 50 μm or even greater than or equal to 75 μm. In still other embodiments, the depth of the layer may be up to or greater than 100 μm. The ion-exchange strengthening may be performed in a molten salt bath maintained at temperatures from about 350° C. to about 500° C. To achieve the desired compressive stress, the glass container (uncoated) may be immersed in the salt bath for less than about 30 hours or even less than about 20 hours. For example, in one embodiment the glass container is immersed in a 100% $KNO_3$ salt bath at 450° C. for about 8 hours.

In one particularly exemplary embodiment, the glass body 102 may be formed from an ion exchangeable glass composition described in pending U.S. patent application Ser. No. 13/660,894 filed Oct. 25, 2012 and entitled "Glass Compositions with Improved Chemical and Mechanical Durability" assigned to Corning, Incorporated.

However it should be understood that the coated glass containers 100 described herein may be formed from other glass compositions including, without limitation, ion-exchangeable glass compositions and non-ion exchangeable glass compositions. For example, in some embodiments the glass container may be formed from Type 1B glass compositions such as, for example, Schott Type 1B borosilicate glass.

In some embodiments described herein, the glass article may be formed from a glass composition which meets the criteria for pharmaceutical glasses described by regulatory agencies such as the USP (United States Pharmacopoeia), the EP (European Pharmacopeia), and the JP (Japanese Pharmacopeia) based on their hydrolytic resistance. Per USP 660 and EP 7, borosilicate glasses meet the Type I criteria and are routinely used for parenteral packaging. Examples of borosilicate glass include, but are not limited to, Corning® Pyrex® 7740, 7800 and Wheaton 180, 200, and 400, Schott Duran, Schott Fiolax, KIMAX® N-51A, Gerrescheimer GX-51 Flint and others. Soda-lime glass meets the Type III criteria and is acceptable in packaging of dry powders which are subsequently dissolved to make solutions or buffers. Type III glasses are also suitable for packaging liquid formulations that prove to be insensitive to alkali. Examples of Type III soda lime glass include Wheaton 800 and 900. De-alkalized soda-lime glasses have higher levels of sodium hydroxide and calcium oxide and meet the Type II criteria. These glasses are less resistant to leaching than Type I glasses but more resistant than Type III glasses. Type II glasses can be used for products that remain below a pH of 7 for their shelf life. Examples include ammonium sulfate treated soda lime glasses. These pharmaceutical glasses have varied chemical compositions and have a coefficient of linear thermal expansion (CTE) in the range of $20$-$85 \times 10^{-7}/°$ C.

When the coated glass articles described herein are glass containers, the glass body 102 of the coated glass containers 100 may take on a variety of different forms. For example, the glass bodies described herein may be used to form coated glass containers 100 such as vials, ampoules, cartridges, syringe bodies and/or any other glass container for storing pharmaceutical compositions. Moreover, the ability to chemically strengthen the glass containers prior to coating can be utilized to further improve the mechanical durability of the glass containers. Accordingly, it should be understood that, in at least one embodiment, the glass containers may be ion exchange strengthened prior to application of the coating. Alternatively, other strengthening methods such as heat tempering, flame polishing, and laminating, as described in U.S. Pat. No. 7,201,965, could be used to strengthen the glass before coating.

Various properties of the coated glass containers (i.e., coefficient of friction, horizontal compression strength, 4-point bend strength) may be measured when the coated glass containers are in an as-coated condition (i.e., following application of the coating without any additional treatments other than curing if applicable) or following one or more processing treatments, such as those similar or identical to treatments performed on a pharmaceutical filling line, including, without limitation, washing, lyophilization, depyrogenation, autoclaving, or the like.

Depyrogenation is a process wherein pyrogens are removed from a substance. Depyrogenation of glass articles, such as pharmaceutical packages, can be performed by a thermal treatment applied to a sample in which the sample is heated to an elevated temperature for a period of time. For example, depyrogenation may include heating a glass container to a temperature of between about 250° C. and about 380° C. for a time period from about 30 seconds to about 72 hours, including, without limitation, 20 minutes, 30 minutes 40 minutes, 1 hour, 2 hours, 4 hours, 8 hours, 12 hours, 24 hours, 48 hours, and 72 hours. Following the thermal treatment, the glass container is cooled to room temperature. One conventional depyrogenation condition commonly employed in the pharmaceutical industry is thermal treatment at a temperature of about 250° C. for about 30 minutes. However, it is contemplated that the time of thermal treatment may be reduced if higher temperatures are utilized. The coated glass containers, as described herein, may be exposed to elevated temperatures for a period of time. The elevated temperatures and time periods of heating described herein may or may not be sufficient to depyrogenate a glass container. However, it should be understood that some of the temperatures and times of heating described herein are sufficient to depyrogenate a coated glass container, such as the coated glass containers described herein. For example, as described herein, the coated glass containers may be exposed to temperatures of about 250° C., about 260° C. about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. It is recognized that depyrogenation processes may have times other than 30 minutes, and 30 minutes is used throughout this disclosure with a depyrogenation temperature for comparative purposes such as, for example, coefficient of friction testing following exposure to a defined depyrogenation condition.

As used herein, lyophilization conditions (i.e., freeze drying) refer to a process in which a sample is filled with a liquid that contains protein and then frozen at low temperatures, such as −100° C., followed by water sublimation for a time such as 20 hours at a temperatures such as −15° C. under vacuum.

As used herein, autoclave conditions refer to steam purging a sample for a time period such as 10 minutes at 100° C., followed by a 20 minute dwelling period wherein the sample is exposed to a 121° C. environment, followed by 30 minutes of heat treatment at 121° C.

The coefficient of friction (μ) of the portion of the coated glass container with the coating may have a lower coefficient of friction than a surface of an uncoated glass container formed from a same glass composition. A coefficient of friction (μ) is a quantitative measurement of the friction between two surfaces and is a function of the mechanical and chemical properties of the first and second surfaces, including surface roughness, as well as environmental conditions such as, but not limited to, temperature and humidity. As used herein, a coefficient of friction measurement for coated glass container 100 is reported as the coefficient of friction between the outer surface of a first glass container (having an outer diameter of between about 16.00 mm and about 17.00 mm) and the outer surface of second glass container which is substantially identical to the first glass container, wherein the first and second glass containers have the same body and the same coating composition (when applied) and have been exposed to the same environments prior to fabrication, during fabrication, and after fabrication. Unless otherwise denoted herein, the coefficient of friction refers to the maximum coefficient of friction measured with a normal load of 30 N measured on a vial-on-vial testing jig, as described herein. However, it should be understood that a coated glass container which exhibits a maximum coefficient of friction at a specific applied load will also exhibit the same or better (i.e., lower) maximum coefficient of friction at a lesser load. For example, if a coated glass container exhibits a maximum coefficient of friction of 0.5 or lower under an applied load of 50 N, the coated glass container will also exhibit a maximum coefficient of friction of 0.5 or lower under an applied load of 25 N. To measure a maximum coefficient of friction, local maxima at or near the beginning of the test are excluded, as such maxima at or near the beginning of the test represent static coefficient of friction. As described in the embodiments herein, the coefficient of friction was measured where the speed of the containers relative to one another was about 0.67 mm/s.

Figure 3:
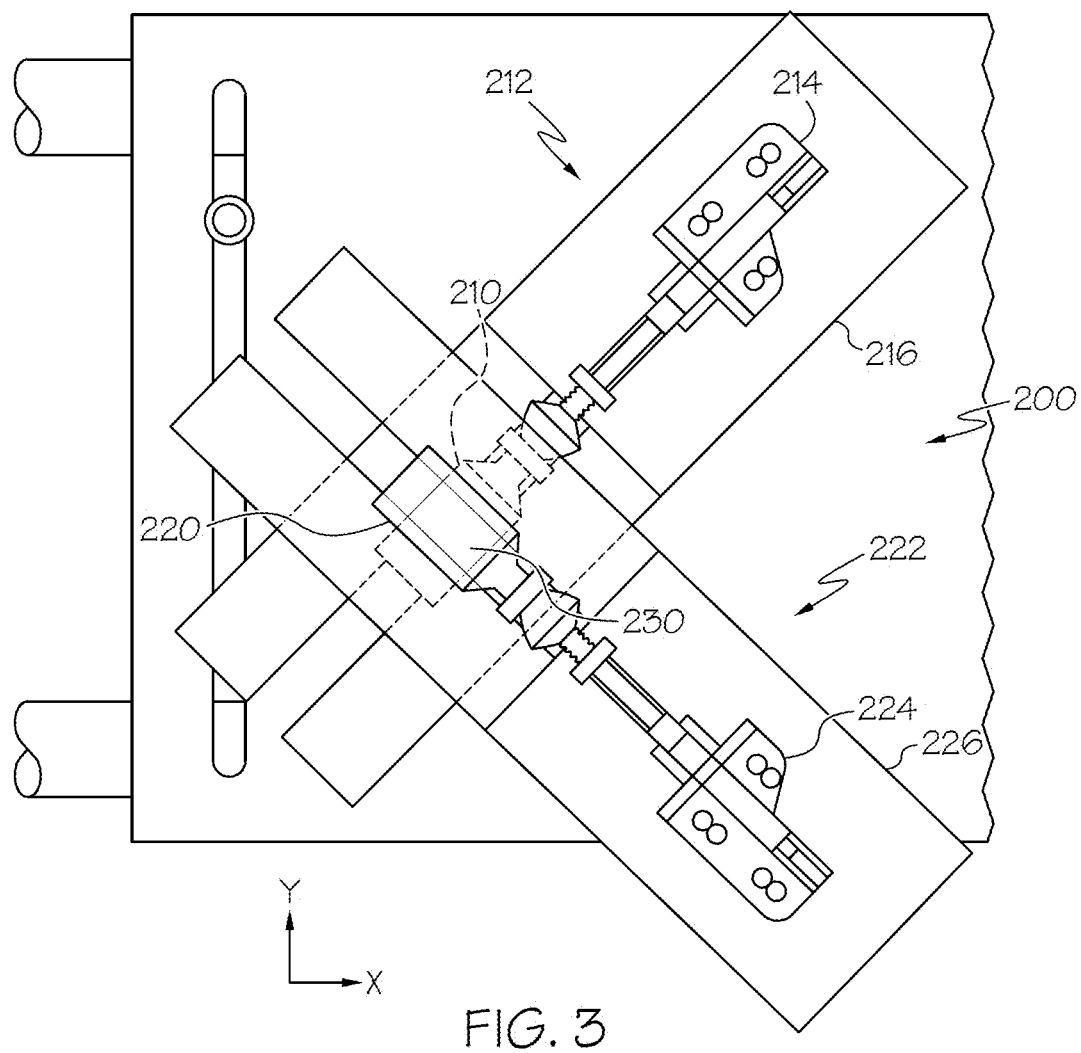
FIG. 3 schematically depicts a testing jig for determining the coefficient of friction between two surfaces, according to one or more embodiments shown and described herein.

In the embodiments described herein, the coefficient of friction of the glass containers (both coated and uncoated) is measured with a vial-on-vial testing jig. The testing jig 200 is schematically depicted in FIG. 3. The same apparatus may also be used to measure the frictive force between two glass containers positioned in the jig. The vial-on-vial testing jig 200 comprises a first clamp 212 and a second clamp 222 arranged in a cross configuration (i.e., perpendicular to one another). The first clamp 212 comprises a first securing arm 214 attached to a first base 216. The first securing arm 214 attaches to the first glass container 210 and holds the first glass container 210 stationary relative to the first clamp 212. Similarly, the second clamp 222 comprises a second securing arm 224 attached to a second base 226. The second securing arm 224 attaches to the second glass container 220 and holds it stationary relative to the second clamp 222. The first glass container 210 is positioned on the first clamp 212 and the second glass container 220 is positioned of the second clamp 222 such that the long axis of the first glass container 210 and the long axis of the second glass container 220 are positioned at about a 90° angle relative to one another and on a horizontal plane defined by the x-y axis.

A first glass container 210 is positioned in contact with the second glass container 220 at a contact point 230. A normal force is applied in a direction orthogonal to the horizontal plane defined by the x-y axis. The normal force may be applied by a static weight or other force applied to the second clamp 222 upon a stationary first clamp 212. For example, a weight may be positioned on the second base 226 and the first base 216 may be placed on a stable surface, thus inducing a measurable force between the first glass container 210 and the second glass container 220 at the contact point 230. Alternatively, the force may be applied with a mechanical apparatus, such as a UMT (universal mechanical tester) machine.

The first clamp 212 or second clamp 222 may be moved relative to the other in a direction which is at a 45° angle with the long axis of the first glass container 210 and the second glass container 220. For example, the first clamp 212 may be held stationary and the second clamp 222 may be moved such that the second glass container 220 moves across the first glass container 210 in the direction of the x-axis. A similar setup is described by R. L. De Rosa et al., in "Scratch Resistant Polyimide Coatings for Alumino Silicate Glass surfaces" in The Journal of Adhesion, 78: 113-127, 2002. To measure the coefficient of friction, the force required to move the second clamp 222 and the normal force applied to first and second glass containers 210, 220 are measured with load cells and the coefficient of friction is calculated as the quotient of the frictive force and the normal force. The jig is operated in an environment of ° C. and 50% relative humidity.

In the embodiments described herein, the portion of the coated glass container with the coating has a coefficient of friction of less than or equal to about 0.7 relative to a like-coated glass container, as determined with the vial-on-vial jig described above. In other embodiments, the coefficient of friction may be less than or equal to about 0.6, or even less than or equal to about 0.5. In some embodiments, the portion of the coated glass container with the coating has a coefficient of friction of less than or equal to about 0.4 or even less than or equal to about Coated glass containers with coefficients of friction less than or equal to about 0.7 generally exhibit improved resistance to frictive damage and, as a result, have improved mechanical properties. For example, conventional glass containers (without a coating) may have a coefficient of friction of greater than 0.7.

In some embodiments described herein, the coefficient of friction of the portion of the coated glass container with the coating is at least 20% less than a coefficient of friction of a surface of an uncoated glass container formed from a same glass composition. For example, the coefficient of friction of the portion of the coated glass container with the coating may be at least 20% less, at least 25% less, at least 30% less, at least 40% less, or even at least 50% less than a coefficient of friction of a surface of an uncoated glass container formed from a same glass composition.

In some embodiments, the portion of the coated glass container with the coating may have a coefficient of friction of less than or equal to about 0.7 after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In other embodiments, the portion of the coated glass container with the coating may have a coefficient of friction of less than or equal to about 0.7, (i.e., less than or equal to about 0.6, less than or equal to about 0.5, less than or equal to about 0.4, or even less than or equal to about 0.3) after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the coefficient of friction of the portion of the coated glass container with the coating may not increase by more than about 30% after exposure to a temperature of about 250° C. (or about 260° C.) for 30 minutes. In other embodiments, coefficient of friction of the portion of the coated glass container with the coating may not increase by more than about 30% (i.e., about 25%, about 20%, about 15%, or even about 10%) after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In other embodiments, coefficient of friction of the portion of the coated glass container with the coating may not increase by more than about 0.5 (i.e., about 0.45, about about 0.35, about 0.3, about 0.25, about 0.2, about 0.15, about 0.1, or even about 0.05) after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the coefficient of friction of the portion of the coated glass container with the coating may not increase at all after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes.

In some embodiments, the portion of the coated glass container with the coating may have a coefficient of friction of less than or equal to about 0.7 after being submerged in a water bath at a temperature of about 70° C. for 10 minutes. In other embodiments, the portion of the coated glass container with the coating may have a coefficient of friction of less than or equal to about 0.7, (i.e., less than or equal to about 0.6, less than or equal to about 0.5, less than or equal to about 0.4, or even less than or equal to about 0.3) after being submerged in a water bath at a temperature of about 70° C. for 5 minutes, 10 minutes, 20 minutes, 30 minutes, 40 minutes, 50 minutes, or even 1 hour. In some embodiments, the coefficient of friction of the portion of the coated glass container with the coating may not increase by more than about 30% after being submerged in a water bath at a temperature of about 70° C. for 10 minutes. In other embodiments, coefficient of friction of the portion of the coated glass container with the coating may not increase by more than about 30% (i.e., about 25%, about 20%, about 15%, or event about 10%) after being submerged in a water bath at a temperature of about 70° C. for 5 minutes, minutes, 20 minutes, 30 minutes, 40 minutes, 50 minutes, or even 1 hour. In some embodiments, the coefficient of friction of the portion of the coated glass container with the coating may not increase at all after being submerged in a water bath at a temperature of about ° C. for 5 minutes, 10 minutes, 20 minutes, 30 minutes, 40 minutes, 50 minutes, or even 1 hour.

In some embodiments, the portion of the coated glass container with the coating may have a coefficient of friction of less than or equal to about 0.7 after exposure to lyophilization conditions. In other embodiments, the portion of the coated glass container with the coating may have a coefficient of friction of less than or equal to about 0.7, (i.e., less than or equal to about 0.6, less than or equal to about 0.5, less than or equal to about 0.4, or even less than or equal to about 0.3) after exposure to lyophilization conditions. In some embodiments, the coefficient of friction of the portion of the coated glass container with the coating may not increase by more than about 30% after exposure to lyophilization conditions. In other embodiments, coefficient of friction of the portion of the coated glass container with the coating may not increase by more than about 30% (i.e., about 25%, about 20%, about 15%, or event about 10%) after exposure to lyophilization conditions. In some embodiments, the coefficient of friction of the portion of the coated glass container with the coating may not increase at all after exposure to lyophilization conditions.

In some embodiments, the portion of the coated glass container with the coating may have a coefficient of friction of less than or equal to about 0.7 after exposure to autoclave conditions. In other embodiments, the portion of the coated glass container with the coating may have a coefficient of friction of less than or equal to about 0.7, (i.e., less than or equal to about 0.6, less than or equal to about 0.5, less than or equal to about 0.4, or even less than or equal to about 0.3) after exposure to autoclave conditions. In some embodiments, the coefficient of friction of the portion of the coated glass container with the coating may not increase by more than about 30% after exposure to autoclave conditions. In other embodiments, coefficient of friction of the portion of the coated glass container with the coating may not increase by more than about 30% (i.e., about 25%, about 20%, about 15%, or event about 10%) after exposure to autoclave conditions. In some embodiments, the coefficient of friction of the portion of the coated glass container with the coating may not increase at all after exposure to autoclave conditions.

The coated glass containers described herein have a horizontal compression strength. The horizontal compression strength, as described herein, is measured by positioning the coated glass container 100 horizontally between two parallel platens which are oriented in parallel to the long axis of the glass container. A mechanical load is then applied to the coated glass container 100 with the platens in the direction perpendicular to the long axis of the glass container. Prior to being placed in the platens, the glass containers are wrapped in 2 inch tape, and the overhang is cut off or folded around the bottom of the container. The container is then positioned within an index card that is stapled around the specimen. The load rate for vial compression is 0.5 in/min, meaning that the platens move towards each other at a rate of 0.5 in/min. The horizontal compression strength is measured at 25° C.±2° C. and 50%±5% relative humidity. It is desirable, in some embodiments, to perform the horizontal compression test within 1 hour (and not more than 24 hours) following depyrogenation to simulate pharmaceutical filling line conditions. The horizontal compression strength is a measurement of load at failure, and measurement of the horizontal compression strength can be given as a failure probability at a selected normal compression load. As used herein, failure occurs when the glass container ruptures under a horizontal compression in least 50% of samples. Thus, the horizontal compression is provided for a group of samples. In some embodiments, a coated glass container may have a horizontal compression strength at least 10%, 20%, or 30% greater than an uncoated vial.

Referring now to FIGS. 1 and 3, the horizontal compression strength measurement may also be performed on an abraded glass container. Specifically, operation of the testing jig 200 may create damage on the coated glass container outer surface 122, such as a surface scratch or abrasion that weakens the strength of the coated glass container 100. The glass container is then subjected to the horizontal compression procedure described above, wherein the container is placed between two platens with the scratch pointing outward parallel to the platens. The scratch can be characterized by the selected normal pressure applied by a vial-on-vial jig and the scratch length. Unless identified otherwise, scratches for abraded glass containers for the horizontal compression procedure are characterized by a scratch length of 20 mm created by a normal load of 30 N. It may be desired to have the scratch at a 90° angle relative to the platens, ±5°.

The coated glass containers can be evaluated for horizontal compression strength following a heat treatment. The heat treatment may be exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the horizontal compression strength of the coated glass container is not reduced by more than about 20%, 30%, or even 40% after being exposed to a heat treatment, such as those described above, and then being abraded, as described above. In one embodiment, the horizontal compression strength of the coated glass container is not reduced by more than about 20% after being exposed to a heat treatment of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes, and then being abraded.

The coated glass articles described herein may be thermally stable after heating to a temperature of at least 250° C. (or 260° C., or 280° C., or 300° C.) for a time period of 30 minutes. The phrase "thermally stable," as used herein, means that the coating applied to the glass article remains substantially intact on the surface of the glass article after exposure to the elevated temperatures such that, after exposure, the mechanical properties of the coated glass article, specifically the coefficient of friction and the horizontal compression strength, are only minimally affected, if at all. This indicates that the coating remains adhered to the surface of the glass following elevated temperature exposure and continues to protect the glass article from mechanical insults such as abrasions, impacts and the like.

In the embodiments described herein, a coated glass article is considered to be thermally stable if the coated glass article meets both a coefficient of friction standard and a horizontal compression strength standard after heating to the specified temperature and remaining at that temperature for the specified time. To determine if the coefficient of friction standard is met, the coefficient of friction of a first coated glass article is determined in as-received condition (i.e., prior to any thermal exposure) using the testing jig depicted in FIG. 3 and a 30 N applied load. A second coated glass article (i.e., a glass article having the same glass composition and the same coating composition as the first coated glass article) is thermally exposed under the prescribed conditions and cooled to room temperature. Thereafter, the coefficient of friction of the second glass article is determined using the testing jig depicted in FIG. 3 to abrade the coated glass article with a 30 N applied load resulting in an abrasion (i.e., a "scratch") having a length of approximately 20 mm. If the coefficient of friction of the second coated glass article is less than 0.7 and the surface of the glass of the second glass article in the abraded area does not have any observable damage, then the coefficient of friction standard is met for purposes of determining the thermal stability of the coating. The term "observable damage," as used herein means that the surface of the glass in the abraded area of the glass article contains less than six glass checks per 0.5 cm of length of the abraded area when observed with a Nomarski or differential interference contrast (DIC) spectroscopy microscope at a magnification of 100× with LED or halogen light sources. A standard definition of a glass check or glass checking is described in G. D. Quinn, "NIST Recommended Practice Guide: Fractography of Ceramics and Glasses," NIST special publication 960-17 (2006).

To determine if the horizontal compression strength standard is met, a first coated glass article is abraded in the testing jig depicted in FIG. 3 under a 30 N load to form a 20 mm scratch. The first coated glass article is then subjected to a horizontal compression test, as described herein, and the retained strength of the first coated glass article is determined. A second coated glass article (i.e., a glass article having the same glass composition and the same coating composition as the first coated glass article) is thermally exposed under the prescribed conditions and cooled to room temperature. Thereafter, the second coated glass article is abraded in the testing jig depicted in FIG. 3 under a 30 N load. The second coated glass article is then subjected to a horizontal compression test, as described herein, and the retained strength of the second coated glass article is determined. If the retained strength of the second coated glass article does not decrease by more than about 20% relative to the first coated glass article (i.e., the load to failure does not decrease by more than 20%) then the horizontal compression strength standard is met for purposes of determining the thermal stability of the coating.

The coated glass containers are considered to be thermally stable if the coefficient of friction standard and the horizontal compression strength standard are met after exposing the coated glass containers to a temperature of at least about 250° C. (or 260° C. or 280° C.) for a time period of at least about 30 minutes (i.e., the coated glass containers are thermally stable at a temperature of at least about 250° C. (or 260° C. or 280° C.) for a time period of about 30 minutes). The thermal stability may also be assessed at temperatures from about 250° C. (or 260° C. or 280° C.) up to about 400° C. For example, in some embodiments, the coated glass containers will be considered to be thermally stable if the standards are met at a temperature of at least about 270° C. or even about 280° C. for a time period of about 30 minutes. In still other embodiments, the coated glass containers will be considered to be thermally stable if the standards are met at a temperature of at least about 290° C. or even about 300° C. for a time period of about 30 minutes. In further embodiments, the coated glass containers will be considered to be thermally stable if the standards are met at a temperature of at least about 310° C. or even about 320° C. for a time period of about 30 minutes. In still other embodiments, the coated glass containers will be considered to be thermally stable if the standards are met at a temperature of at least about 330° C. or even about 340° C. for a time period of about 30 minutes. In yet other embodiments, the coated glass containers will be considered to be thermally stable if the standards are met at a temperature of at least about 350° C. or even about 360° C. for a time period of about 30 minutes. In some other embodiments, the coated glass containers will be considered to be thermally stable if the standards are met at a temperature of at least about 370° C. or even about 380° C. for a time period of about 30 minutes. In still other embodiments, the coated glass containers will be considered to be thermally stable if the standards are met at a temperature of at least about 390° C. or even about 400° C. for a time period of about 30 minutes.

The coated glass containers disclosed herein may also be thermally stable over a range of temperatures, meaning that the coated glass containers are thermally stable by meeting the coefficient of friction standard and horizontal compression strength standard at each temperature in the range. For example, in the embodiments described herein, the coated glass containers may be thermally stable from at least about 250° C. (or 260° C. or 280° C.) to a temperature of less than or equal to about 400° C. In some embodiments, the coated glass containers may be thermally stable in a range from at least about 250° C. (or 260° C. or 280° C.) to about 350° C. In some other embodiments, the coated glass containers may be thermally stable from at least about 280° C. to a temperature of less than or equal to about 350° C. In still other embodiments, the coated glass containers may be thermally stable from at least about 290° C. to about 340° C. In another embodiment, the coated glass container may be thermally stable at a range of temperatures of about 300° C. to about 380° C. In another embodiment, the coated glass container may be thermally stable at a range of temperatures from about 320° C. to about 360° C.

The coated glass containers described herein have a four point bend strength. To measure the four point bend strength of a glass container, a glass tube that is the precursor to the coated glass container 100 is utilized for the measurement. The glass tube has a diameter that is the same as the glass container but does not include a glass container base or a glass container mouth (i.e., prior to forming the tube into a glass container). The glass tube is then subjected to a four point bend stress test to induce mechanical failure. The test is performed at 50% relative humidity with outer contact members spaced apart by 9" and inner contact members spaced apart by 3" at a loading rate of 10 mm/min.

The four point bend stress measurement may also be performed on a coated and abraded tube. Operation of the testing jig 200 may create an abrasion on the tube surface such as a surface scratch that weakens the strength of the tube, as described in the measurement of the horizontal compression strength of an abraded vial. The glass tube is then subjected to a four point bend stress test to induce mechanical failure. The test is performed at 25° C. and at 50% relative humidity using outer probes spaced apart by 9" and inner contact members spaced apart by 3" at a loading rate of 10 mm/min, while the tube is positioned such that the scratch is put under tension during the test.

In some embodiments, the four point bend strength of a glass tube with a coating after abrasion shows on average at least 10%, 20%, or even 50% higher mechanical strength than that for an uncoated glass tube abraded under the same conditions.

In some embodiments, after the coated glass container 100 is abraded by an identical glass container with a 30 N normal force, the coefficient of friction of the abraded area of the coated glass container 100 does not increase by more than about 20% following another abrasion by an identical glass container with a 30 N normal force at the same spot, or does not increase at all. In other embodiments, after the coated glass container 100 is abraded by an identical glass container with a 30 N normal force, the coefficient of friction of the abraded area of the coated glass container 100 does not increase by more than about 15% or even 10% following another abrasion by an identical glass container with a 30 N normal force at the same spot, or does not increase at all. However, it is not necessary that all embodiments of the coated glass container 100 display such properties.

The transparency and color of the coated container may be assessed by measuring the light transmission of the container within a range of wavelengths between 400-700 nm using a spectrophotometer. The measurements are performed such that a light beam is directed normal to the container wall such that the beam passes through the coating twice, first when entering the container and then when exiting it. In some embodiments, the light transmission through the coated glass container may be greater than or equal to about 55% of a light transmission through an uncoated glass container (passing through two walls of the container) for wavelengths from about 400 nm to about 700 nm. As described herein, a light transmission can be measured before a thermal treatment or after a thermal treatment, such as the heat treatments described herein. For example, for each wavelength of from about 400 nm to about 700 nm, the light transmission may be greater than or equal to about 55% of a light transmission through an uncoated glass container. In other embodiments, the light transmission through the coated glass container is greater than or equal to about 55%, about 60%, about 65%, about 70%, about 75%, about 80%, or even about 90% of a light transmission through an uncoated glass container for wavelengths from about 400 nm to about 700 nm.

As described herein, a light transmission can be measured before an environmental treatment, such as a thermal treatment described herein, or after an environmental treatment. For example, following a heat treatment of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes, or after exposure to lyophilization conditions, or after exposure to autoclave conditions, the light transmission through the coated glass container is greater than or equal to about 55%, about 60%, about 65%, about 70%, about 75%, about 80%, or even about 90% of a light transmission through an uncoated glass container for wavelengths from about 400 nm to about 700 nm.

Figure 13:
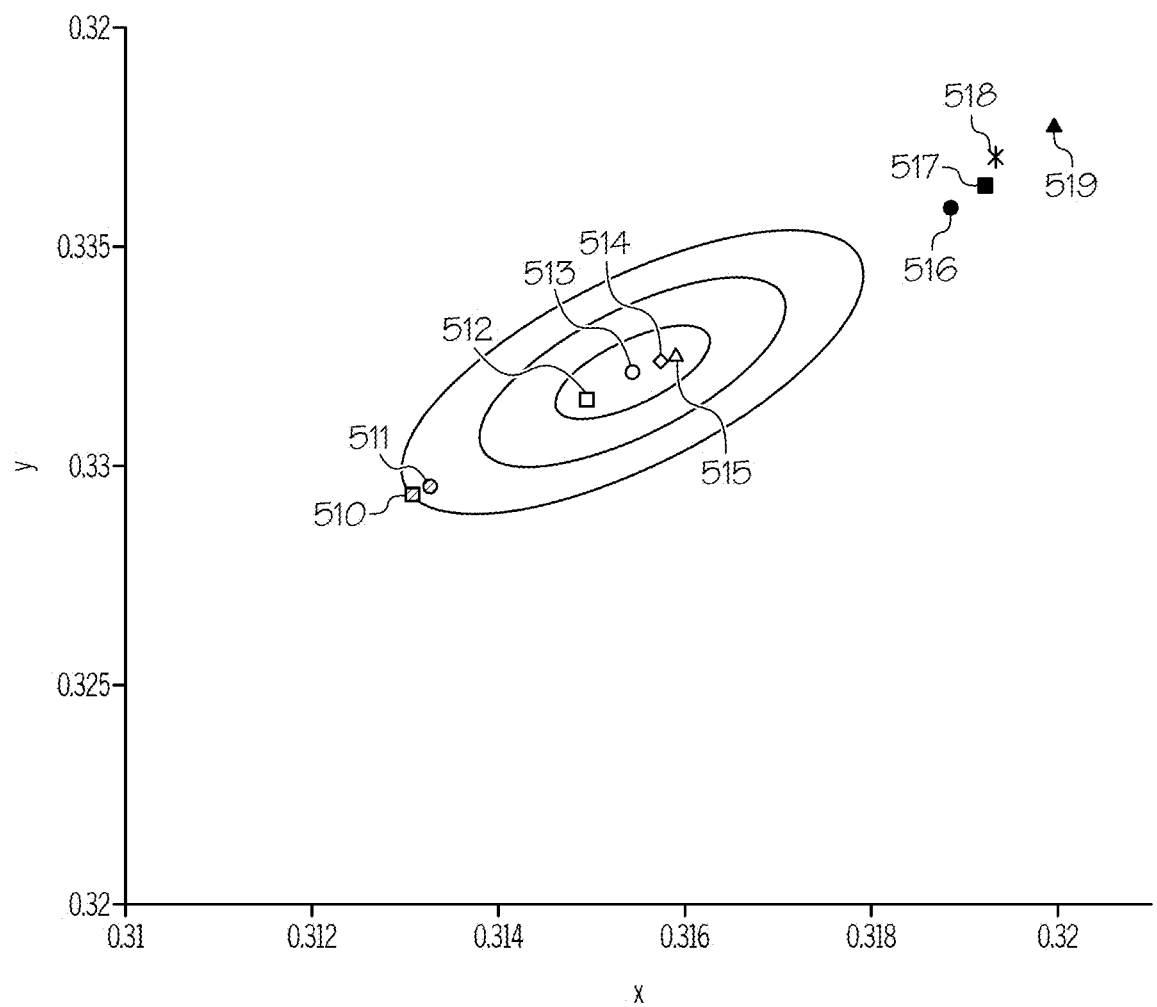
FIG. 13 depicts optical data for sample coated vials of Example 1 and Comparative Example 3, according to one or more embodiments shown and described herein.

The yellowing caused by exposure to heat treatments can be measured by x and y coordinates according to the CEI 1931 color space, such as shown in FIG. 13, discussed with the Examples provided herein. Change in x and y coordinates following depyrogenation conditions may evidence yellowing of the coated glass article.

In some embodiments, the coated glass container 100 may be perceived as colorless and transparent to the naked human eye when viewed at any angle. In some other embodiments, the coating 120 may have a perceptible tint, such as when the coating 120 comprises a polymer which is colored.

In some embodiments, the coated glass container 100 may have a coating 120 that is capable of receiving an adhesive label. That is, the coated glass container 100 may receive an adhesive label on the coated surface such that the adhesive label is securely attached. However, the ability of attachment of an adhesive label is not a requirement for all embodiments of the coated glass containers 100 described herein.

EXAMPLES

The various embodiments of glass containers with coatings will be further clarified by the following examples. The examples are illustrative in nature, and should not be understood to limit the subject matter of the present disclosure.

Example 1

Glass vials were coated on their exterior surface with a coating mixture comprising diisopropoxide bis acetylacetonate and 6FDA-4-BDAF polyimide to form a solid coating comprising $TiO_2$ and polyimide. The weight ratio of titanium diisopropoxide bis acetylacetonate to 6FDA-4-BDAF polyimide was varied in different samples.

First, glass vials were formed from the glass composition of "Composition E" in Table 1 of U.S. patent application Ser. No. 13/660,394 entitled "Glass Compositions with Improved Chemical and Mechanical Durability." The glass vials were subsequently ion-exchange strengthened prior to application of a coating, as is described in U.S. patent application Ser. No. 13/660,394. The vials had an outer diameter of about 16.00 mm.

To prepare the coating mixture, portions of TYZOR AA (titanium diisopropoxide bis acetylacetonate 75 wt. % solution in IPA, commercially available from SIGMA ALDRICH as ref 325252) and LARC-CP1 (6FDA-4-BDAF polyimide commercially available from NEXOLVE as ref. LARC-CP1) were weighed in a plastic container and a solution was formed by the addition of propylene glycol methyl ether acetate up to 100 mL (commercially available as DOWANOL™ PMA solvent from SIGMA ALDRICH as ref. 484431). The container was closed and put under agitation until complete dissolution of 6FDA-4-BDAF polyimide.

The vials to be coated were washed with de-ionized water, blown dry with nitrogen, and finally cleaned by exposure to oxygen plasma for 15 seconds prior to coating. Then, the vials were dip-coated with the solution of TYZOR AA and LARC-CP1 polyimide mixture described above. The withdrawing speed was fixed at 60 cm/min to attain a dry coating thickness of from about 30 nm to 40 nm. Thereafter, the coated vials were cured by placing them into a preheated furnace at 360° C. for 15 minutes.

The ratio of TYZOR AA and LARC-CP1 polyimide included in the coating mixture was varied for samples. The weight percent of the solids (the TYZOR AA and LARC-CP1 polyimide) in the coating mixture was 1 wt. %, 2 wt. %, or 3 wt. %, where samples with lower ratios of TYZOR AA to LARC-CP1 had 1 wt. % coating mixtures and greater ratios of TYZOR AA to LARC-CP1 had 3 wt. % coating mixtures. For example, to form a 90/10 weight ratio of TYZOR AA to LARC-CP1 polyimide with a 2 wt. % coating mixture, 2.4 g of TYZOR AA and 0.2 g of LARC-CP1 polyimide were combined, and then propylene glycol methyl ether acetate was added to make the solution 100 mL. It should be noted that in this example 2.4 g of TYZOR AA was added because it contains a 75 wt. % solution of titanium diisopropoxide bis acetylacetonate in IPA (making the actual solids component of TYZOR AA 1.8 g). Therefore, the total weight addition of solids (non-solvents) was 2.0 g. For a 98/2 sample with 3 wt % solids, 3.92 g of TYZOR AA and 0.06 g of LARC-CPI was included in the 100 mL coating mixture. For a 50/50 sample with 1 wt %. solids, 0.66 g of TYZOR AA and 0.5 g of LARC-CPI was included in the 100 mL coating mixture. Samples of coated vials were prepared having weight ratios of TYZOR AA to LARC-CP1 polyimide of 0/100, 10/90, 20/80, 30/70, 50/50, 60/40, 70/30, 80/20, 90/10, 95/5, 97/3, 98/2, 99/1, 99.5/0.5, and 100/0. A $TiO_2$ weight fraction in the coating was determined based on the weight of the TYZOR AA and LARC-CP1 polyimide in the coating mixture and accounting for portions of the titanium diisopropoxide bis acetylacetonate in TYZOR AA which decompose and are expelled during curing (the portion of TYZOR AA which does not contribute to the remaining $TiO_2$ in the coating). For example, full conversion of the titanium diisopropoxide bis acetylacetonate was assumed to be converted to $TiO_2$ (a 1:1 molar ratio between titanium diisopropoxide bis acetylacetonate precursor reactant and $TiO_2$ product). A $TiO_2$ volume fraction for each sample was calculated from the weight fraction using the density of amorphous titania and LARC-CP1 polyimide, which are 3.75 g/cm 3 and 1.54 g/cm$^3$, respectively. For example, the 90/10 sample had a coating containing 66.4 wt. % $TiO_2$ and 44.8 vol. % $TiO_2$. The $TiO_2$ weight fraction and $TiO_2$ volume fraction of each sample prepared in Example 1 is shown in Table 1.

Each of the samples produced according to Example 1 was tested for COF by a process consistent with the methods described in the present disclosure utilizing the testing jig of FIG. 3 with a load of 30 N. COF testing was conducted on samples as cured, following a heat treatment of 320° C. for 5 hours, and following a heat treatment of 335° C. for 16 hours. Throughout the examples, a heat treatment of 320° C. for 5 hours or 335° C. for 16 hours is representative of an embodiment of depyrogenation by heating. Table 1 shows the mean COF and maximum COF for each sample coated vial of Example 1 after curing or following described depyrogenation conditions. It should be understood that depyrogenated vials also underwent curing prior to depyrogenation. Also, in Table 1, the depyrogenation condition marked "none" corresponds to a coated vial as cured. Additionally, following the COF testing, samples were visually examined to determine if the glass had been adequately protected. The column of Table 1 marked "Glass Protection" refers to whether there was visible glass checking, visible wear marks, or both. Throughout the examples, a "no"

represents visible glass checking, wear marks, or both, and a "yes" represents no visible glass checking and no visible wear marks.

Figure 6A:
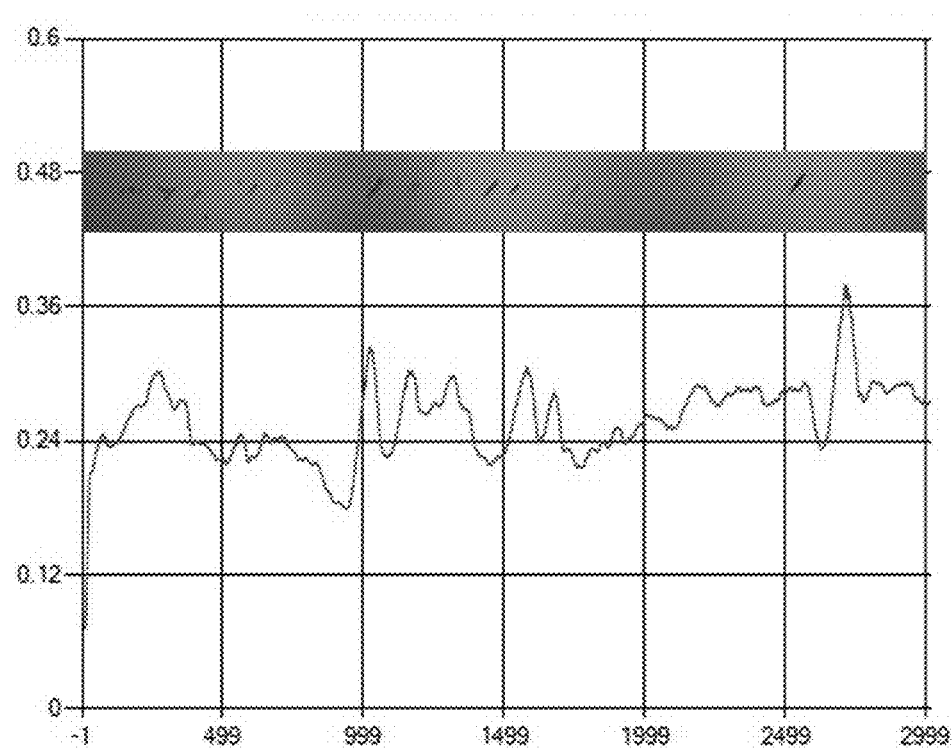
FIG. 6A depicts COF data for the samples of Example 1, according to one or more embodiments shown and described herein.
Figure 6B:
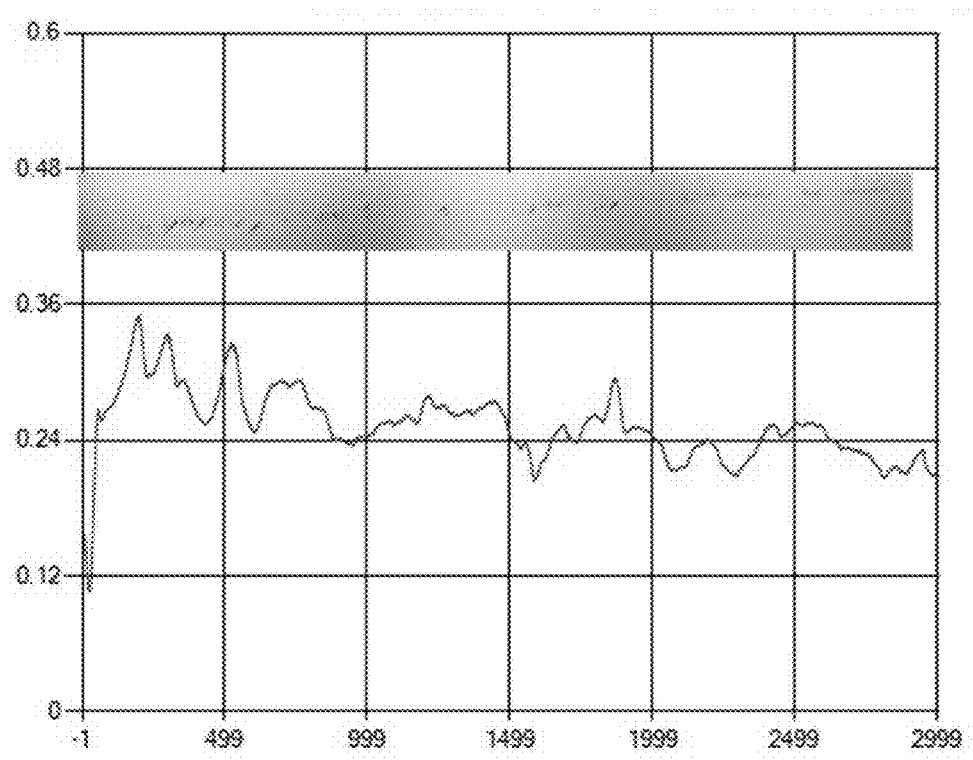
FIG. 6B depicts COF data for the samples of Example 1, according to one or more embodiments shown and described herein.
Figure 6C:
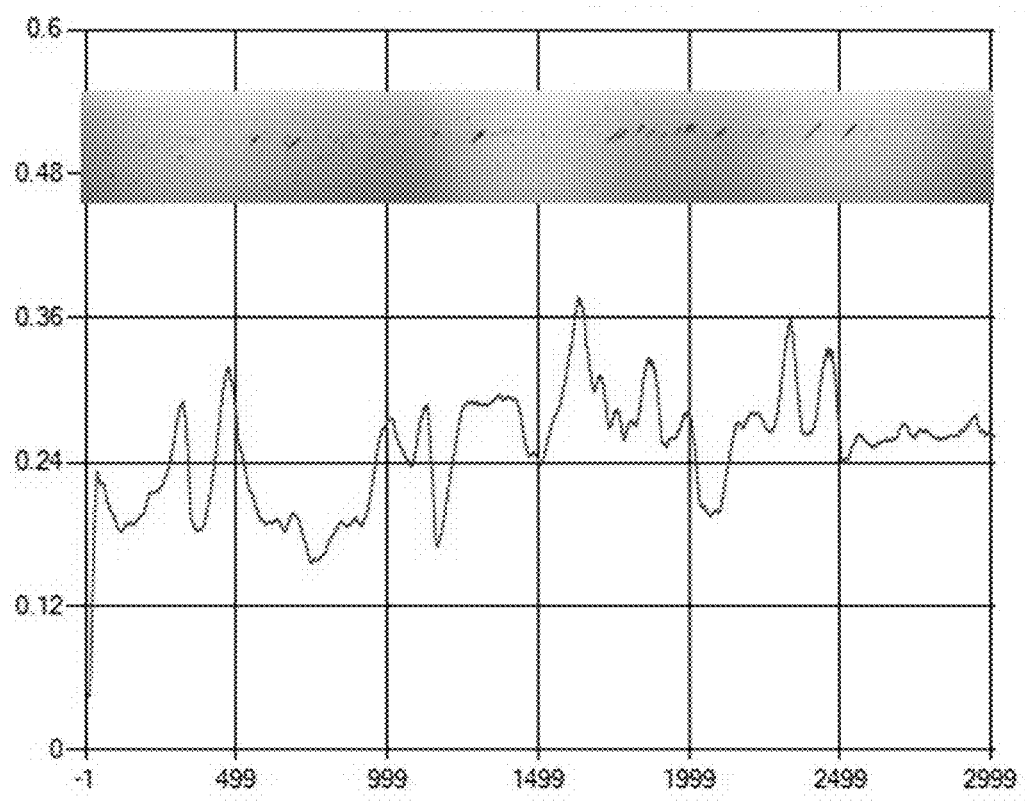
FIG. 6C depicts COF data for the samples of Example 1, according to one or more embodiments shown and described herein.
Figure 6D:
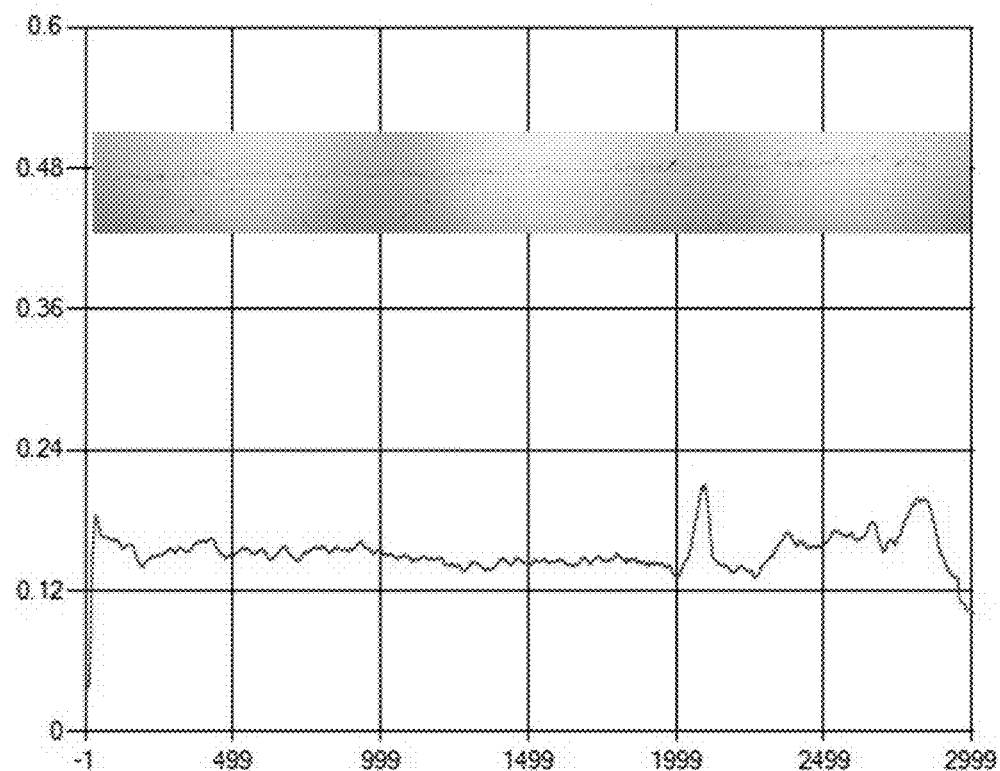
FIG. 6D depicts COF data for the samples of Example 1, according to one or more embodiments shown and described herein.
Figure 6E:
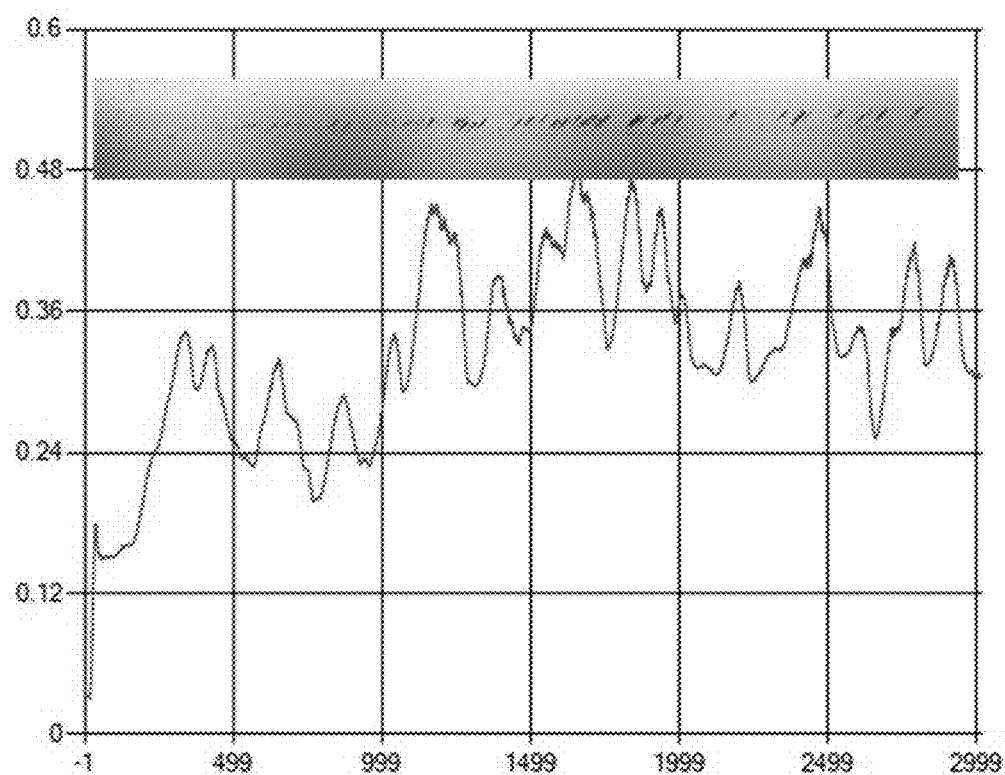
FIG. 6E depicts COF data for the samples of Example 1, according to one or more embodiments shown and described herein.
Figure 6F:
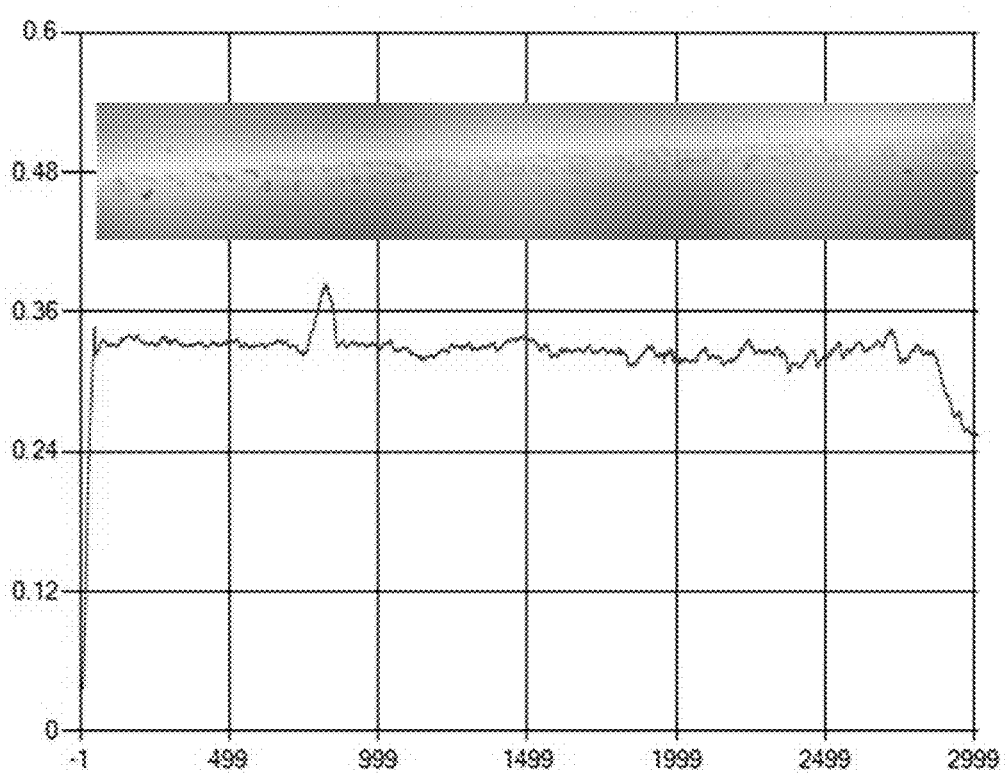
FIG. 6F depicts COF data for the samples of Example 1, according to one or more embodiments shown and described herein.
Figure 6G:
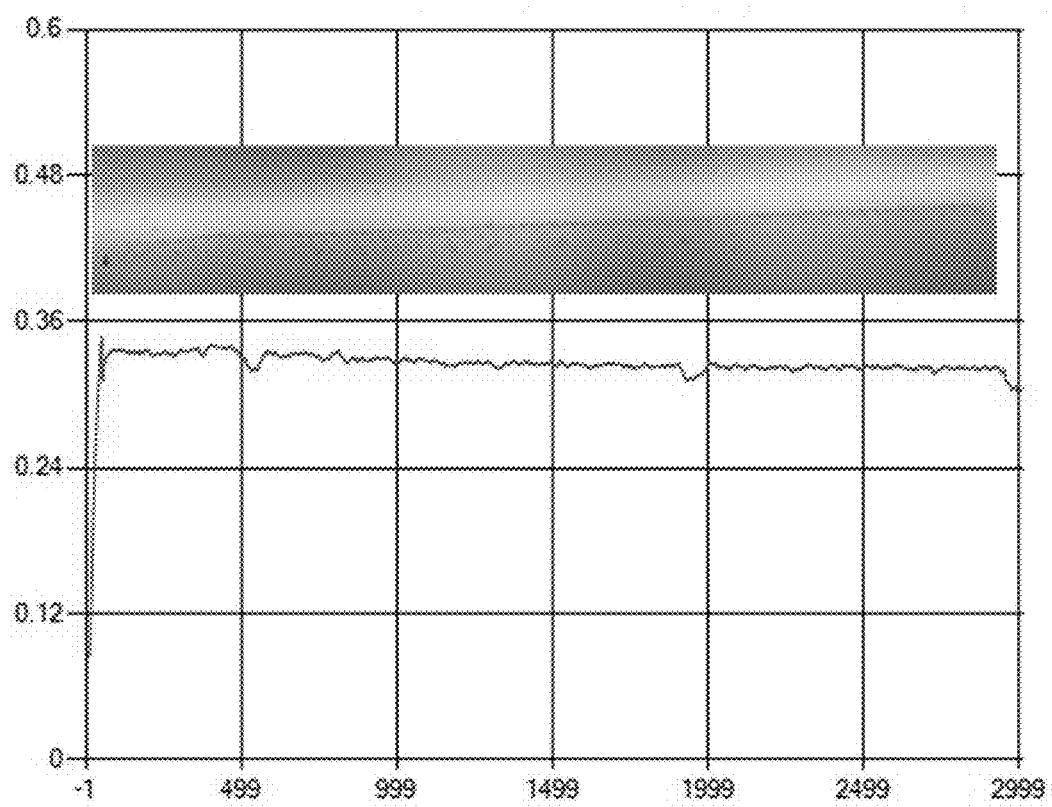
FIG. 6G depicts COF data for the samples of Example 1, according to one or more embodiments shown and described herein.
Figure 6H:
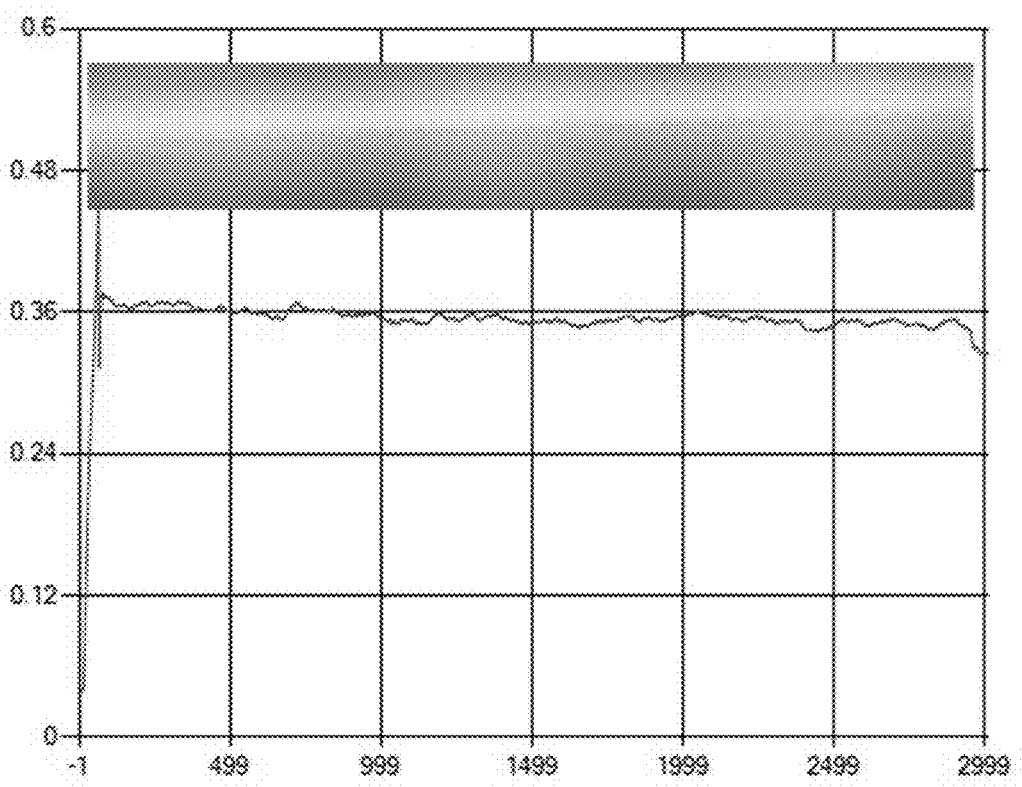
FIG. 6H depicts COF data for the samples of Example 1, according to one or more embodiments shown and described herein.
Figure 6I:
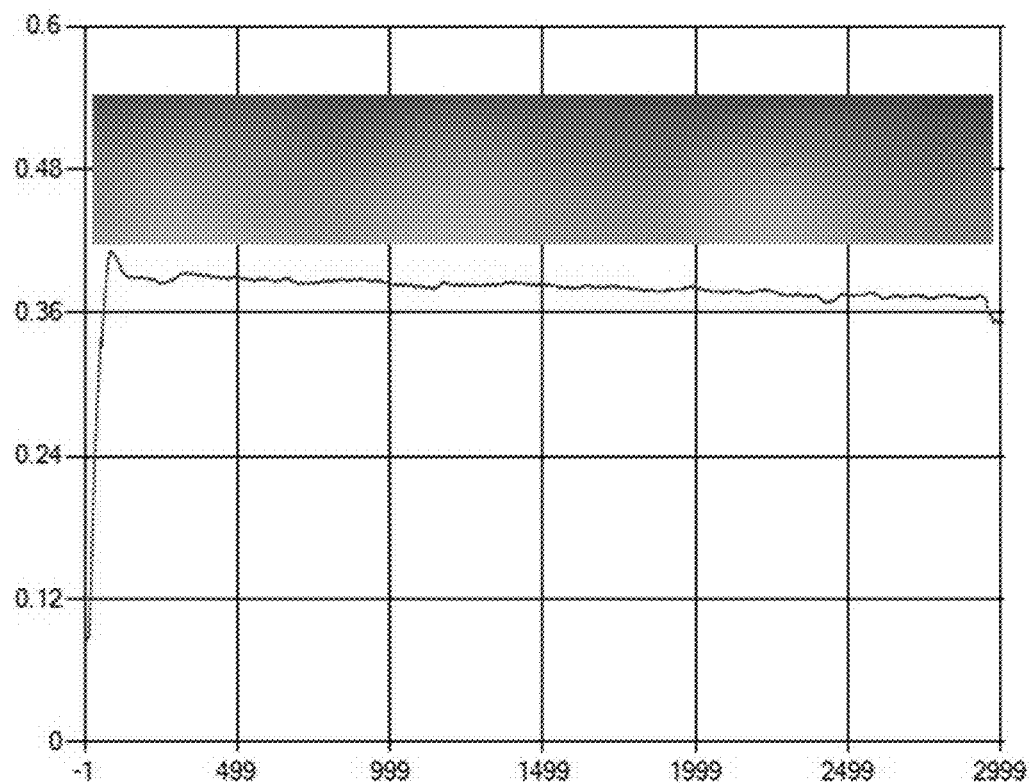
FIG. 6I depicts COF data for the samples of Example 1, according to one or more embodiments shown and described herein.
Figure 6J:
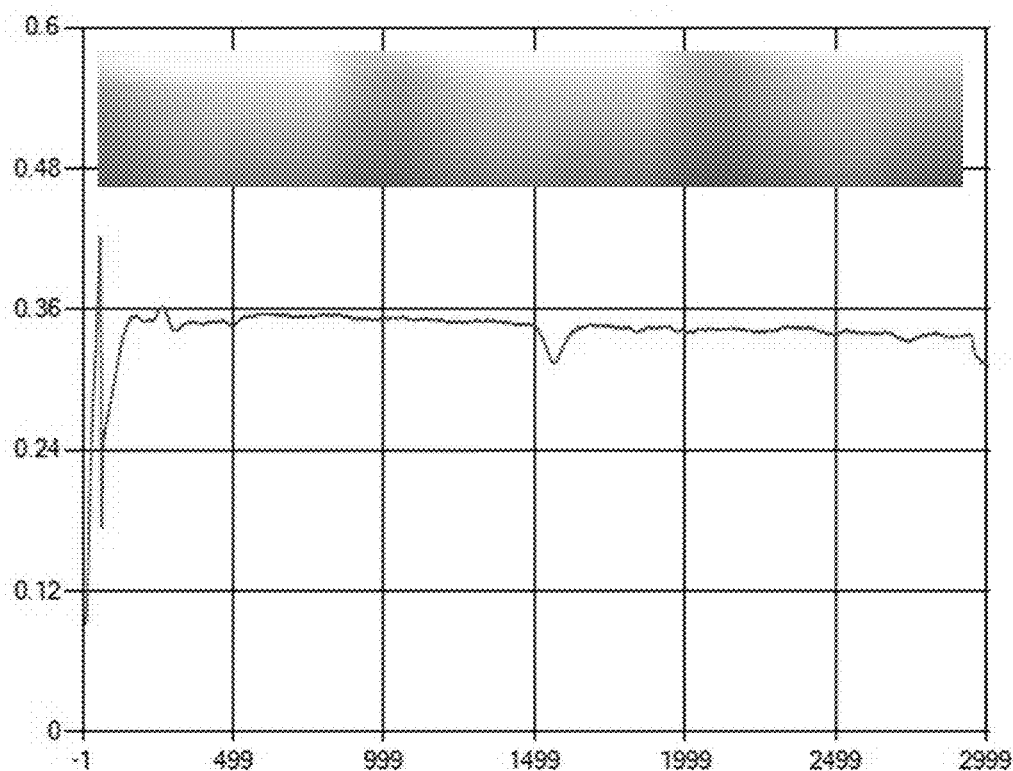
FIG. 6J depicts COF data for the samples of Example 1, according to one or more embodiments shown and described herein.
Figure 6K:
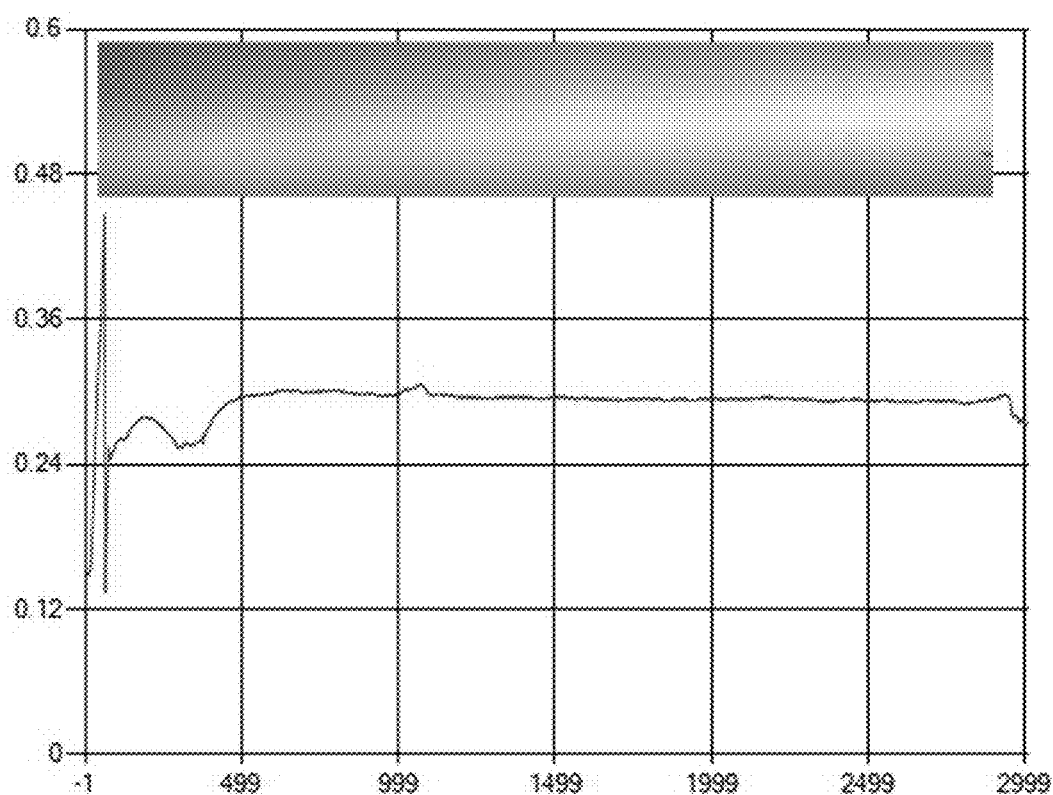
FIG. 6K depicts COF data for the samples of Example 1, according to one or more embodiments shown and described herein.
Figure 6L:
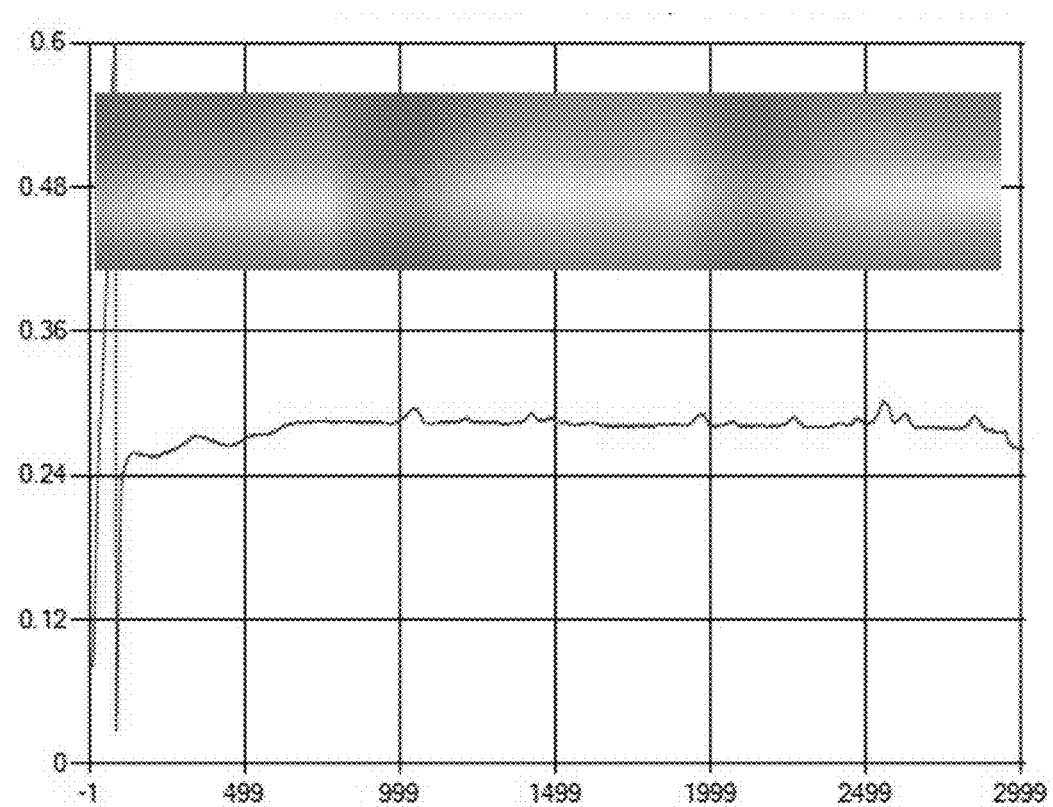
FIG. 6L depicts COF data for the samples of Example 1, according to one or more embodiments shown and described herein.
Figure 6M:
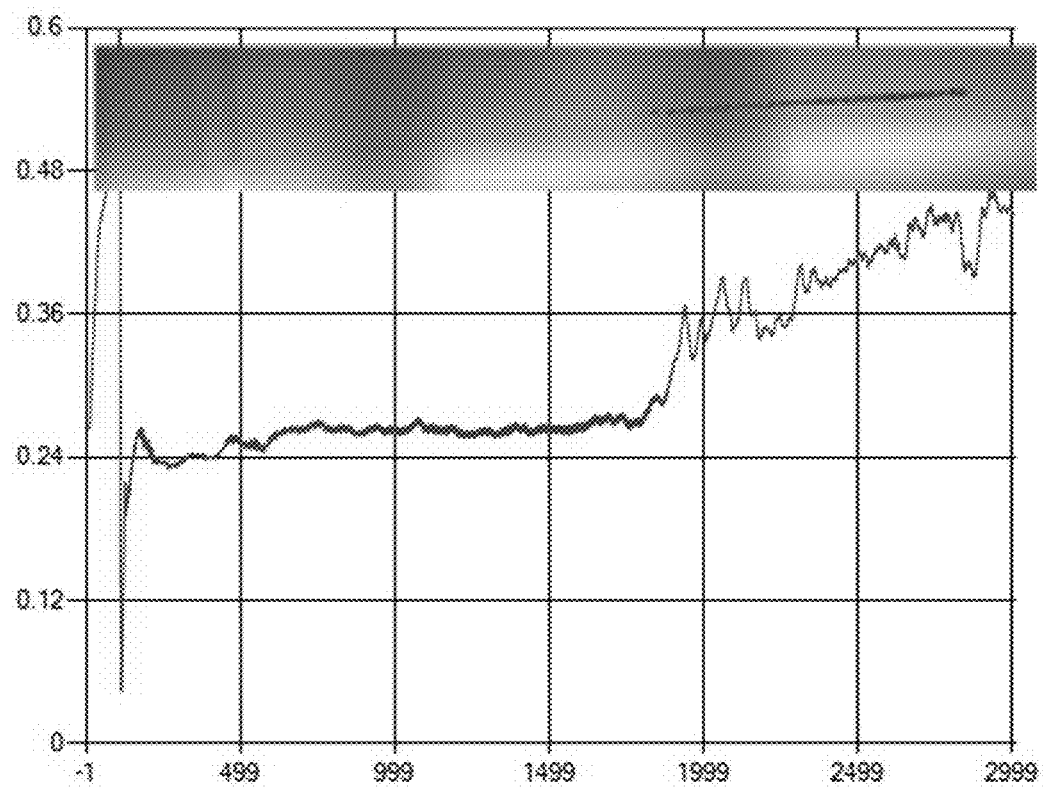
FIG. 6M depicts COF data for the samples of Example 1, according to one or more embodiments shown and described herein.
Figure 6N:
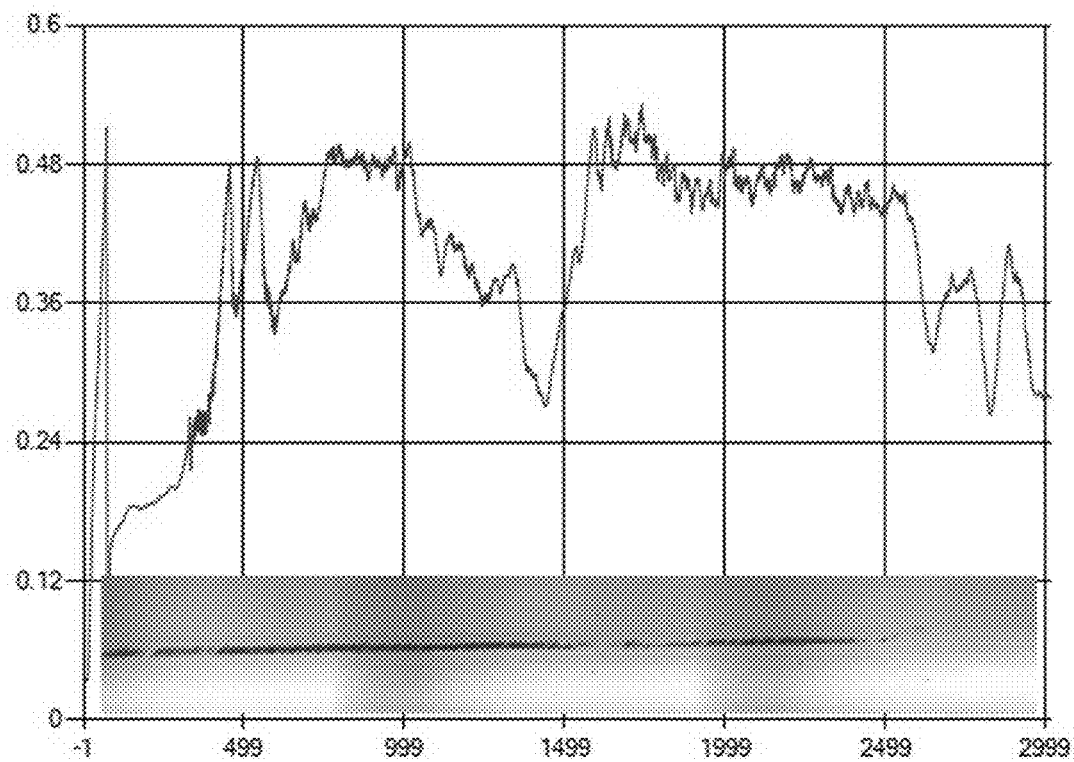
FIG. 6N depicts COF data for the samples of Example 1, according to one or more embodiments shown and described herein.
Figure 7A:
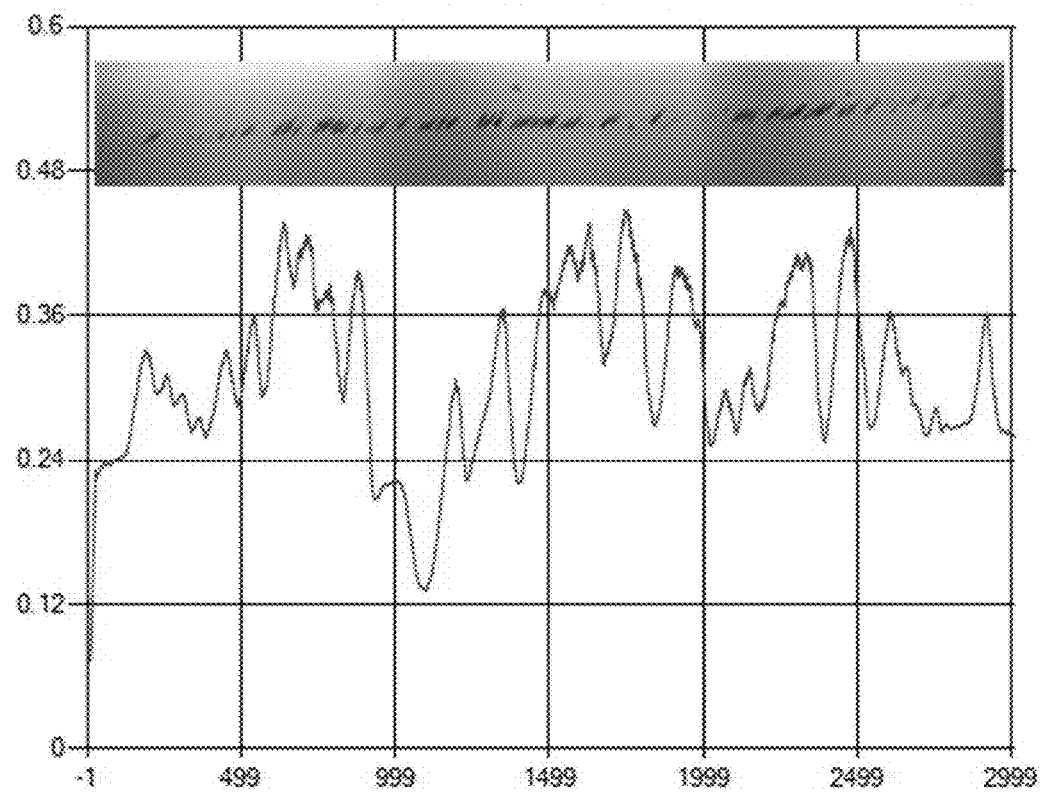
FIG. 7A depicts COF data for the samples of Example 4, according to one or more embodiments shown and described herein.
Figure 7B:
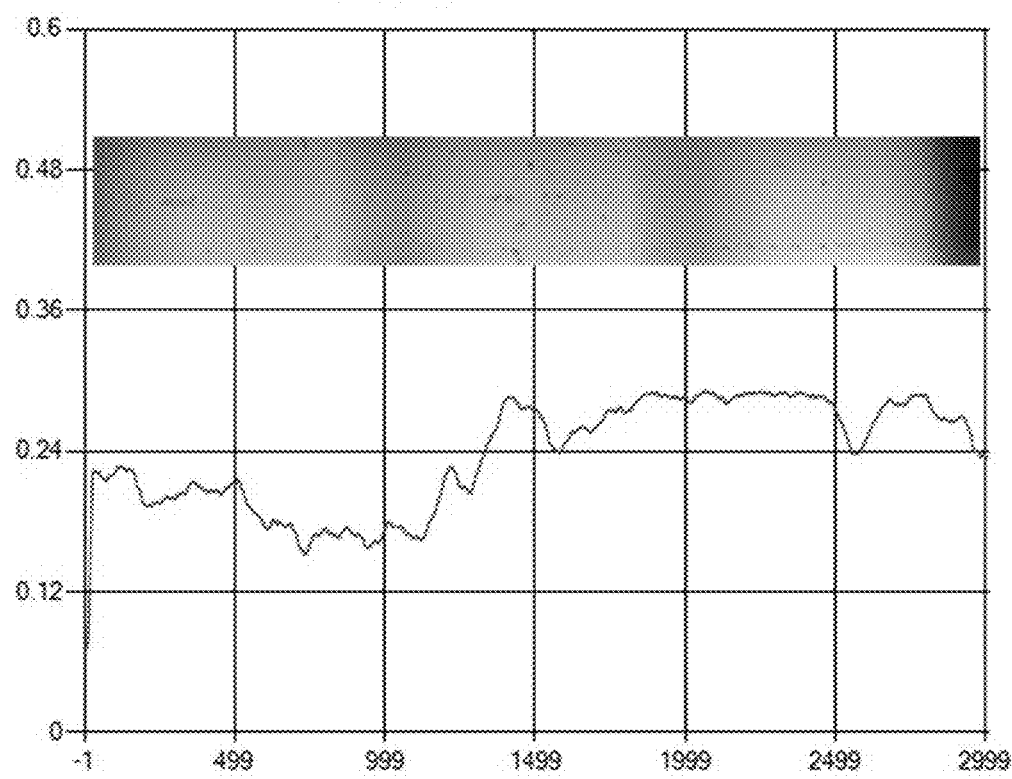
FIG. 7B depicts COF data for the samples of Example 4, according to one or more embodiments shown and described herein.
Figure 7C:
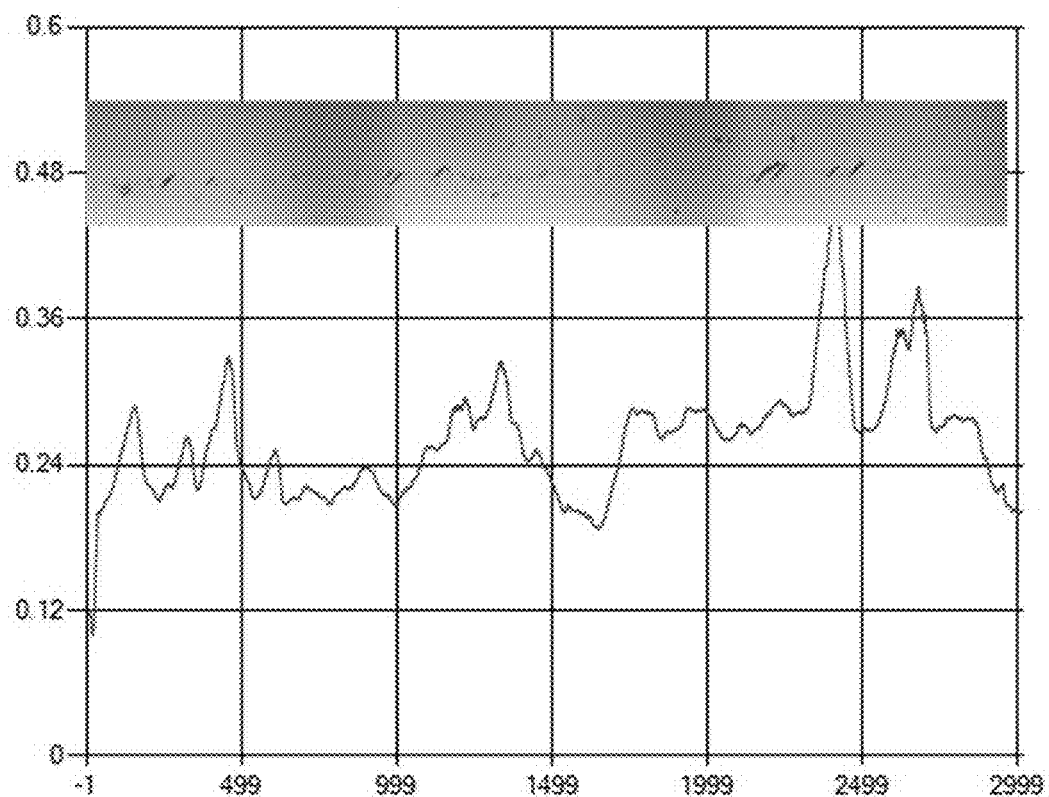
FIG. 7C depicts COF data for the samples of Example 4, according to one or more embodiments shown and described herein.
Figure 7D:
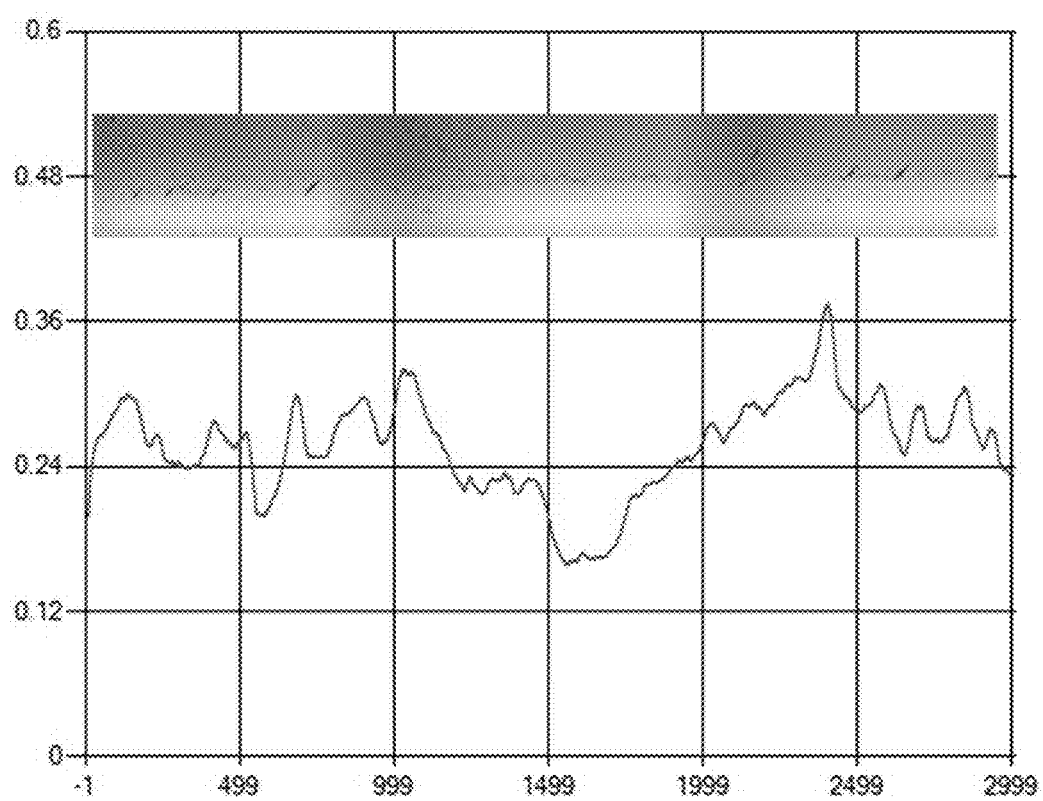
FIG. 7D depicts COF data for the samples of Example 4, according to one or more embodiments shown and described herein.
Figure 7E:
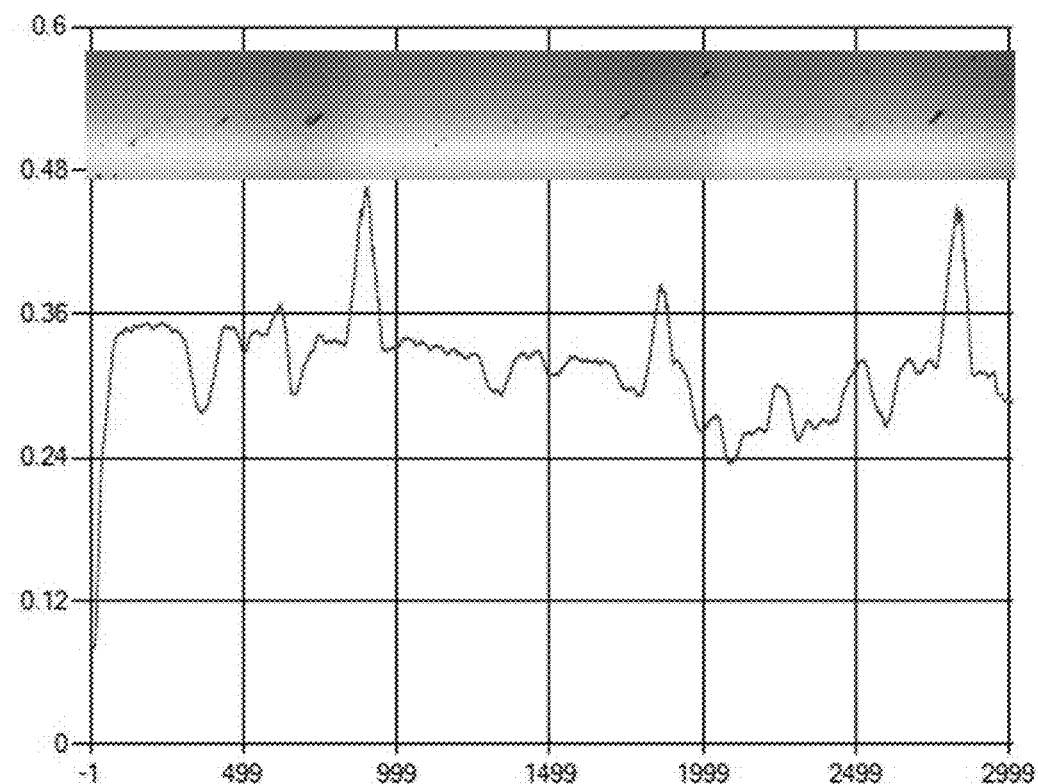
FIG. 7E depicts COF data for the samples of Example 4, according to one or more embodiments shown and described herein.
Figure 7F:
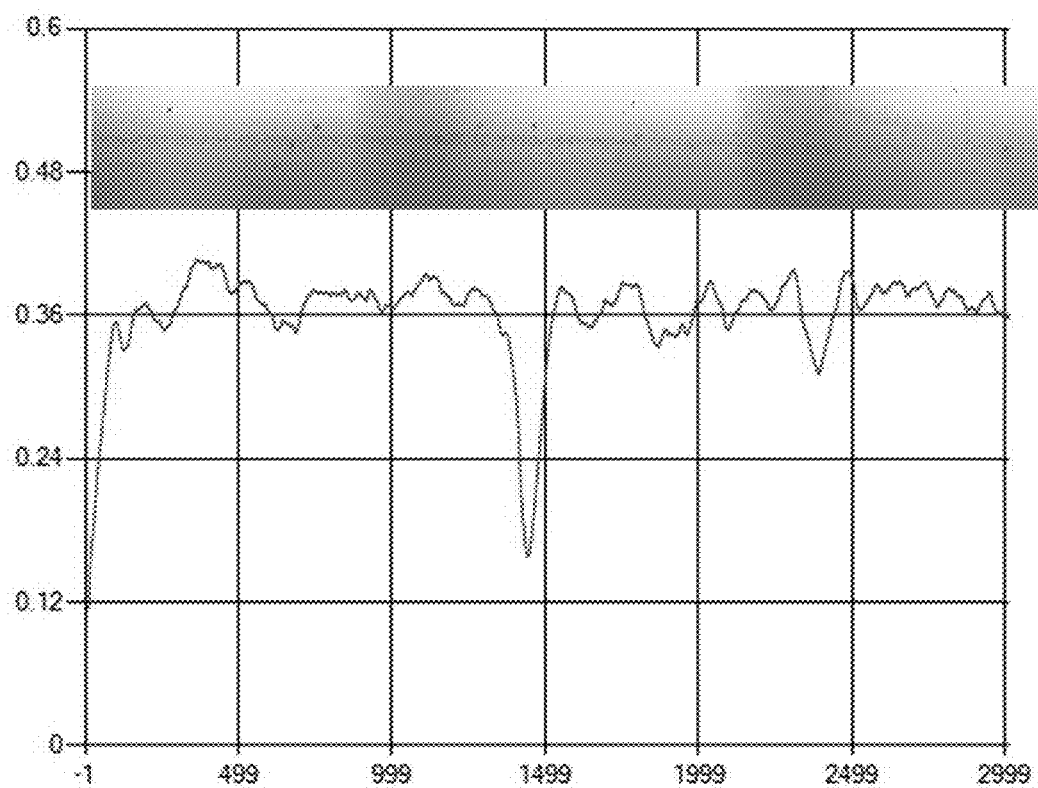
FIG. 7F depicts COF data for the samples of Example 4, according to one or more embodiments shown and described herein.
Figure 7G:
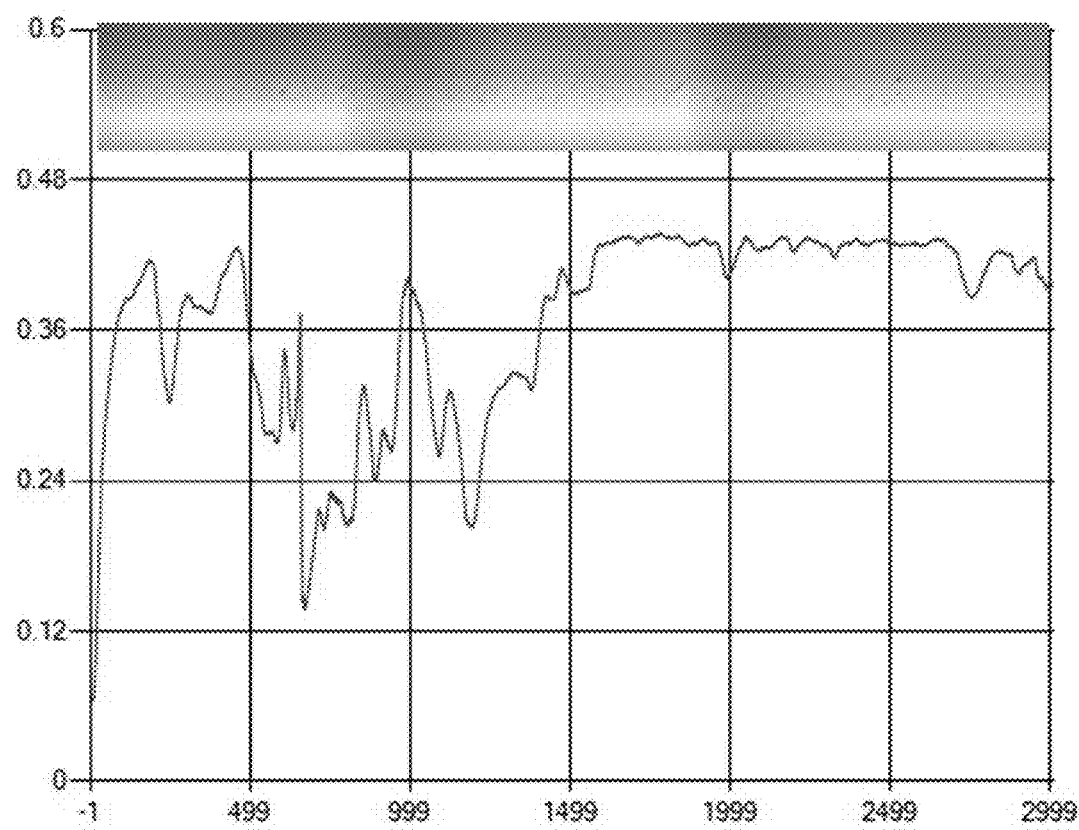
FIG. 7G depicts COF data for the samples of Example 4, according to one or more embodiments shown and described herein.
Figure 7H:
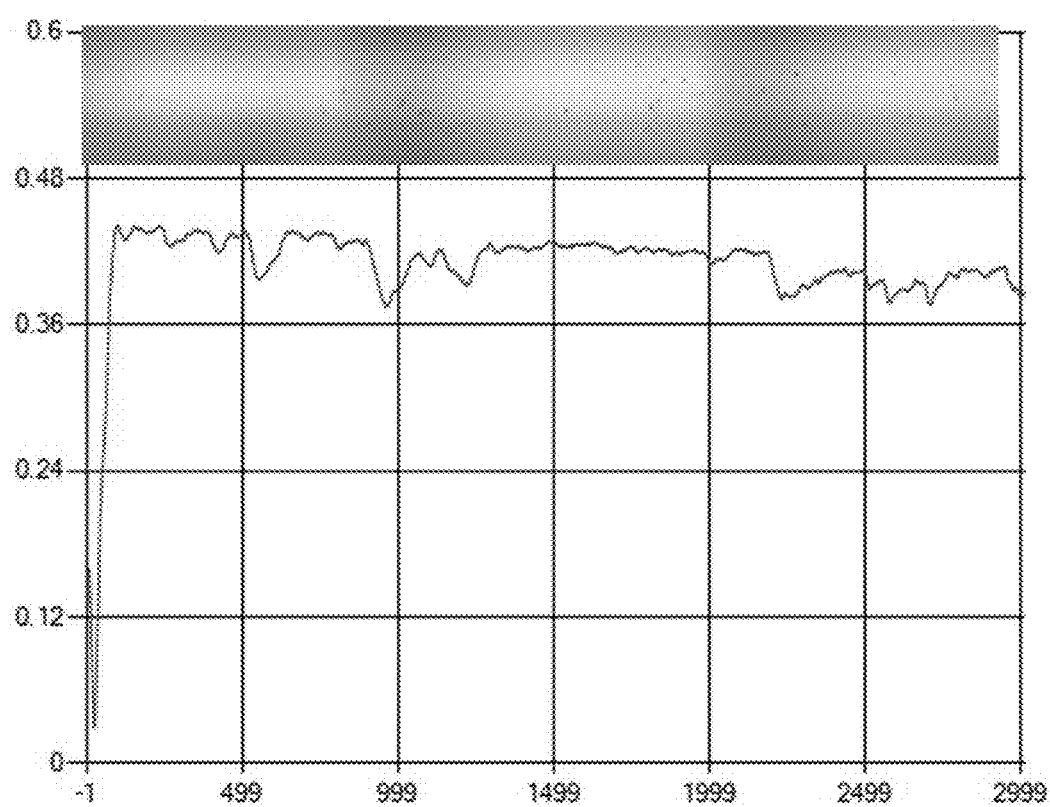
FIG. 7H depicts COF data for the samples of Example 4, according to one or more embodiments shown and described herein.
Figure 7I:
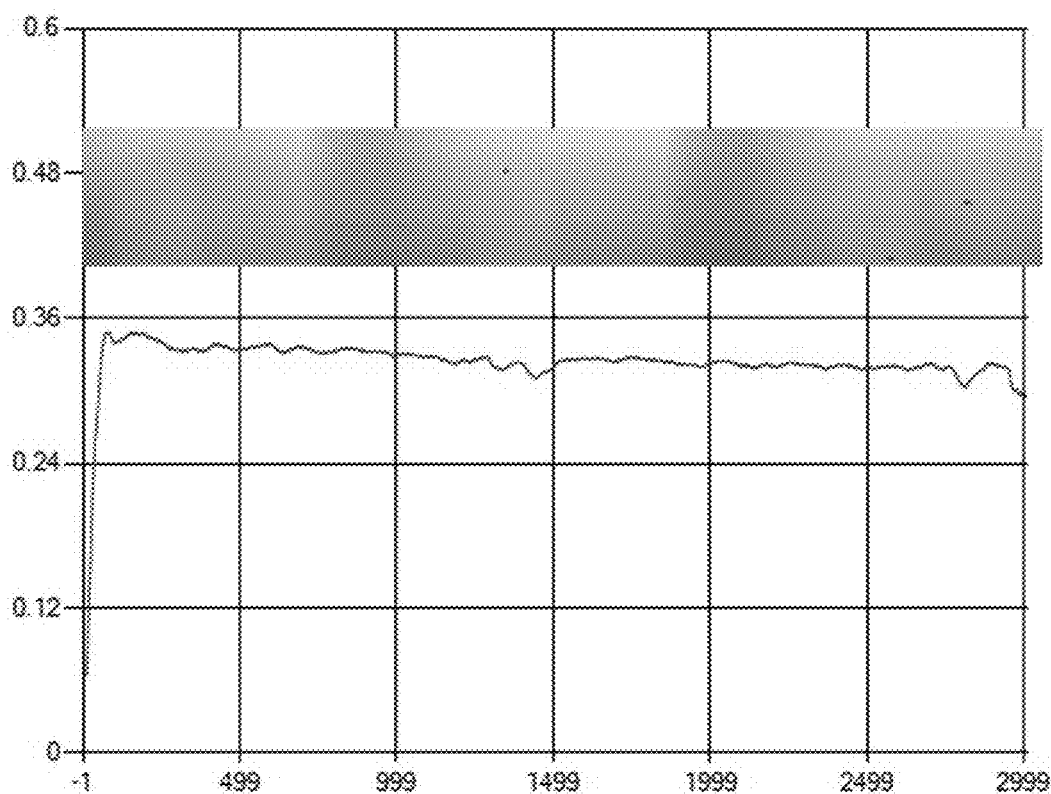
FIG. 7I depicts COF data for the samples of Example 4, according to one or more embodiments shown and described herein.
Figure 7J:
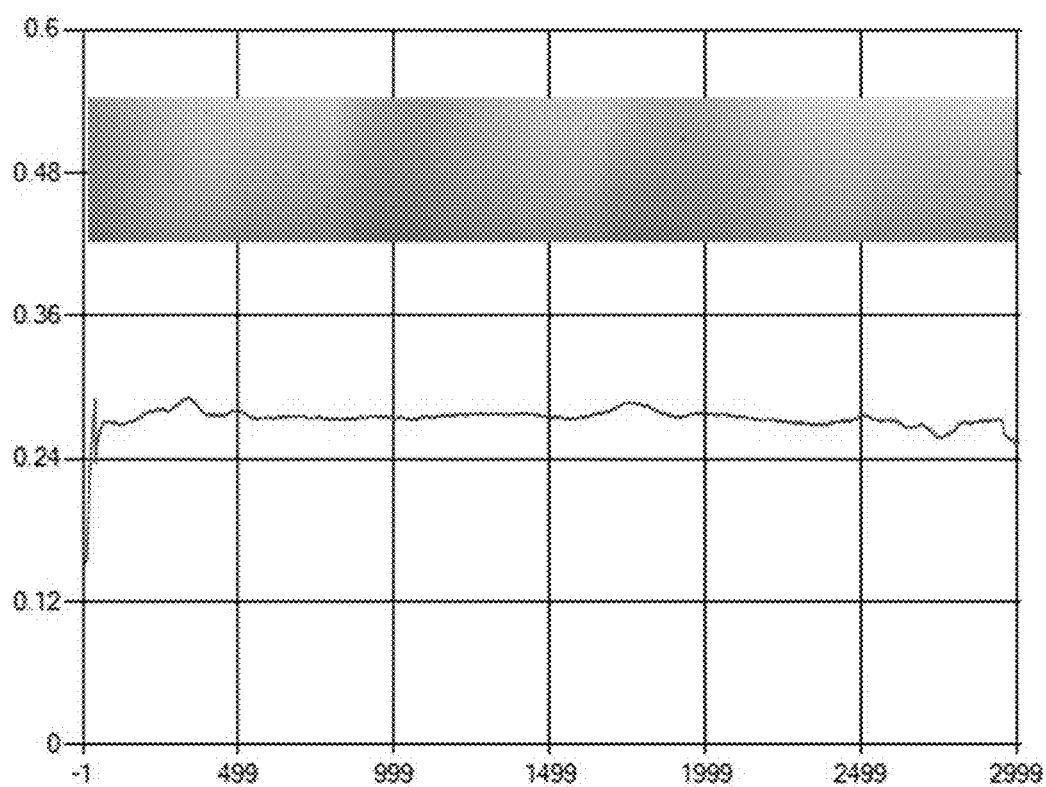
FIG. 7J depicts COF data for the samples of Example 4, according to one or more embodiments shown and described herein.
Figure 7K:
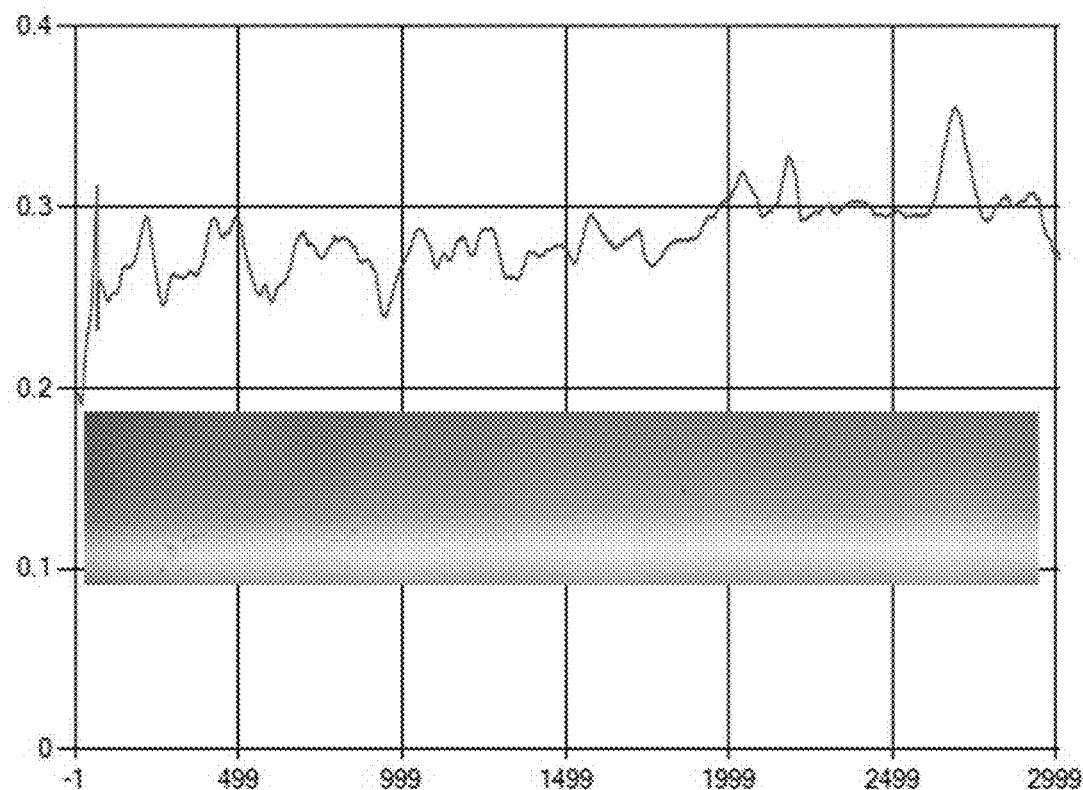
FIG. 7K depicts COF data for the samples of Example 4, according to one or more embodiments shown and described herein.
Figure 7L:
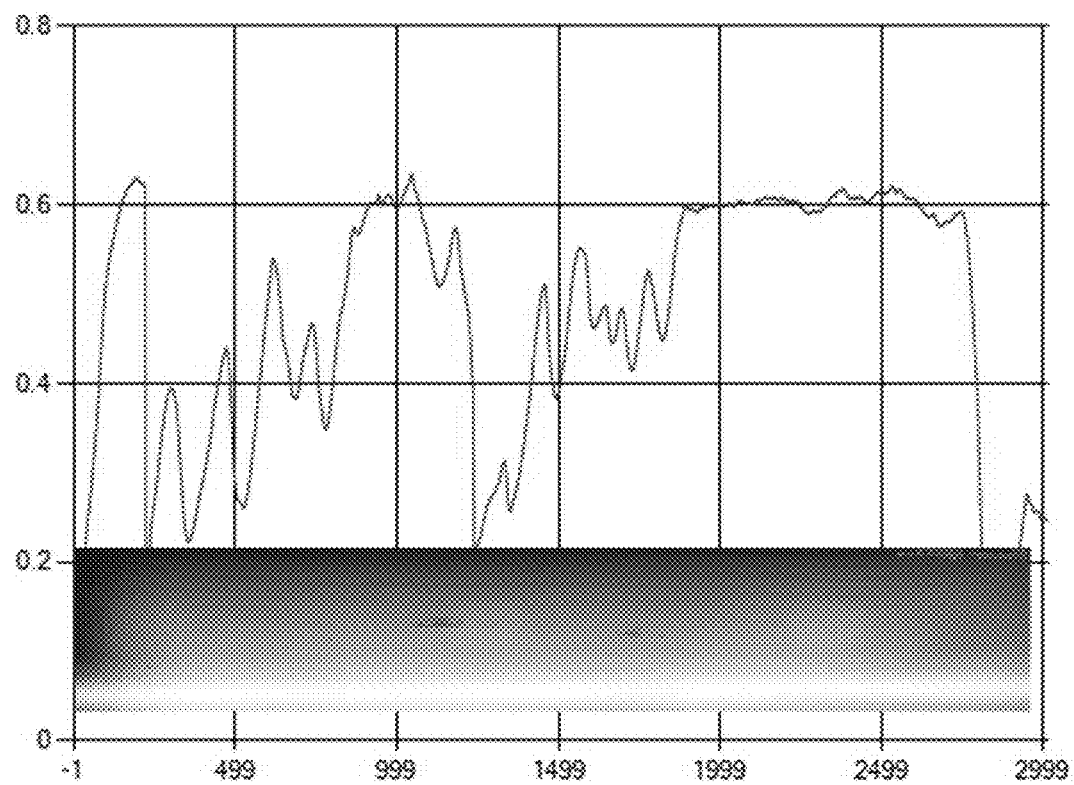
FIG. 7L depicts COF data for the samples of Example 4, according to one or more embodiments shown and described herein.

Additionally, COF data for various samples of Example 1 is shown in FIGS. 6A-6N. Each of FIGS. 6A-6N depicts the coefficient of friction as measured throughout testing, and additionally shows an image of the abraded glass vials following the COF testing. Specifically, each of FIGS. 6A-6N (as well as all other similar plots depicting coefficient of friction testing, i.e., FIGS. 7A-7L, 11, 12, 14, 15, and 17) depict coefficient of friction on the y-axis and the points of measurement over a 20 mm drag length on the x-axis (i.e., the x-axis therefore is a measure of length). As can be seen, glass checking and visible damage sometimes results from increased COF. Table 2 lists which samples of Example 1 correspond to FIGS. 6A-6N. FIGS. 6A-6N show COF data for non-depyrogenated COF testing (following curing), as described below.

TABLE 2

| FIG. Number | Weight Ratio of TYZOR AA to LARC-CP1 |
|---|---|
| 6A | 0/100 |
| 6B | 10/90 |
| 6C | 20/80 |
| 6D | 30/70 |
| 6E | 50/50 |
| 6F | 60/40 |
| 6G | 70/30 |
| 6H | 80/20 |
| 6I | 90/10 |
| 6J | 95/5 |
| 6K | 97/3 |
| 6L | 98/2 |
| 6M | 99/1 |
| 6N | 99.5/0.5 |

TABLE 1

| Weight Ratio of TYZOR AA to LARC-CP1 | TiO$_2$ wt. % | TiO$_2$ vol. % | wt. % of TYZOR AA and LARC-CP1 in coating mixture | Depyrogenation | COF (mean/max) | Glass Protection |
|---|---|---|---|---|---|---|
| 0/100 | 0 | 0 | 1 | none | 0.26/0.38 | no |
|  |  |  |  | 320° C. for 5 h | 0.25/0.42 | no |
|  |  |  |  | 335° C. for 16 h | 0.21/0.35 | no |
| 10/90 | 2.4 | 1 | 1 | none | 0.25/0.35 | no |
|  |  |  |  | 320° C. for 5 h | 0.28/0.43 | no |
|  |  |  |  | 335° C. for 16 h | 0.36/0.53 | no |
| 20/80 | 5.2 | 2.25 | 1 | none | 0.25/0.38 | no |
|  |  |  |  | 320° C. for 5 h | 0.36/0.56 | no |
|  |  |  |  | 335° C. for 16 h | 0.36/0.55 | no |
| 30/70 | 8.6 | 14.9 | 1 | none | 0.25/0.30 | no |
|  |  |  |  | 320° C. for 5 h | 0.26/0.50 | no |
|  |  |  |  | 335° C. for 16 h | 0.44/0.57 | no |
| 50/50 | 18 | 8.25 | 1 | none | 0.32/0.48 | no |
|  |  |  |  | 320° C. for 5 h | 0.26/0.37 | no |
|  |  |  |  | 335° C. for 16 h | 0.25/0.39 | no |
| 60/40 | 24.8 | 11.9 | 2 | none | 0.32/0.38 | no |
|  |  |  |  | 320° C. for 5 h | 0.33/0.34 | yes |
|  |  |  |  | 335° C. for 16 h | 0.35/0.37 | no |
| 70/30 | 33.85 | 17.35 | 2 | none | 0.32/0.35 | yes |
|  |  |  |  | 320° C. for 5 h | 0.33/0.34 | yes |
|  |  |  |  | 335° C. for 16 h | 0.37/0.40 | yes |
| 80/20 | 46.7 | 26.5 | 2 | none | 0.35/0.36 | yes |
|  |  |  |  | 320° C. for 5 h | 0.37/0.38 | yes |
|  |  |  |  | 335° C. for 16 h | 0.40/0.42 | yes |
| 90/10 | 66.4 | 44.8 | 2 | none | 0.37/0.39 | yes |
|  |  |  |  | 320° C. for 5 h | 0.37/0.41 | yes |
|  |  |  |  | 335° C. for 16 h | 0.38/0.47 | yes |
| 95/5 | 80.6 | 63.1 | 3 | none | 0.34/0.42 | yes |
|  |  |  |  | 320° C. for 5 h | 0.32/0.33 | yes |
|  |  |  |  | 335° C. for 16 h | 0.30/0.32 | yes |
| 97/3 | 87.6 | 74.4 | 3 | none | 0.29/0.31 | yes |
|  |  |  |  | 320° C. for 5 h | 0.29/0.30 | yes |
|  |  |  |  | 335° C. for 16 h | 0.27/0.28 | yes |
| 98/2 | 91.5 | 81.5 | 3 | none | 0.28/0.30 | yes |
|  |  |  |  | 320° C. for 5 h | 0.28/0.30 | yes |
|  |  |  |  | 335° C. for 16 h | 0.20/0.30 | yes |
| 99/1 | 95.6 | 89.7 | 3 | none | 0.31/0.32 | no |
|  |  |  |  | 320° C. for 5 h | 0.49/1.1 | no |
|  |  |  |  | 335° C. for 16 h | 0.20/0.35 | no |
| 99.5/0.5 | 97.75 | 94.7 | 3 | none | 0.39/0.49 | no |
|  |  |  |  | 320° C. for 5 h | 0.28/0.38 | no |
|  |  |  |  | 335° C. for 16 h | 0.21/0.35 | no |
| 100/0 | 100 | 100 | 3 | none | >>1 | no |
|  |  |  |  | 320° C. for 5 h | >>1 | no |
|  |  |  |  | 335° C. for 16 h | >>1 | no |

As can be seen from the collected data, samples having a weight ratio of TYZOR AA to LARC-CP1 of 0/100, 10/90, 20/80, 30/70, 50/50, 99/1, and 99.5/0.5 did not adequately protect the glass. Additionally, the 100/0 (pure $TiO_2$), had a COF of much greater than 1.

Figure 8:
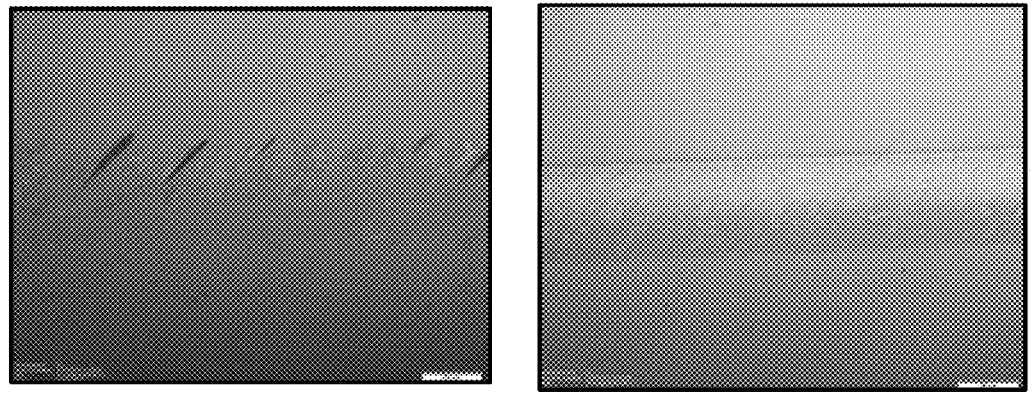
FIG. 8 depicts images of abraded glass surfaces of samples of Example 1 following COF testing, according to one or more embodiments shown and described herein.
Figure 10:
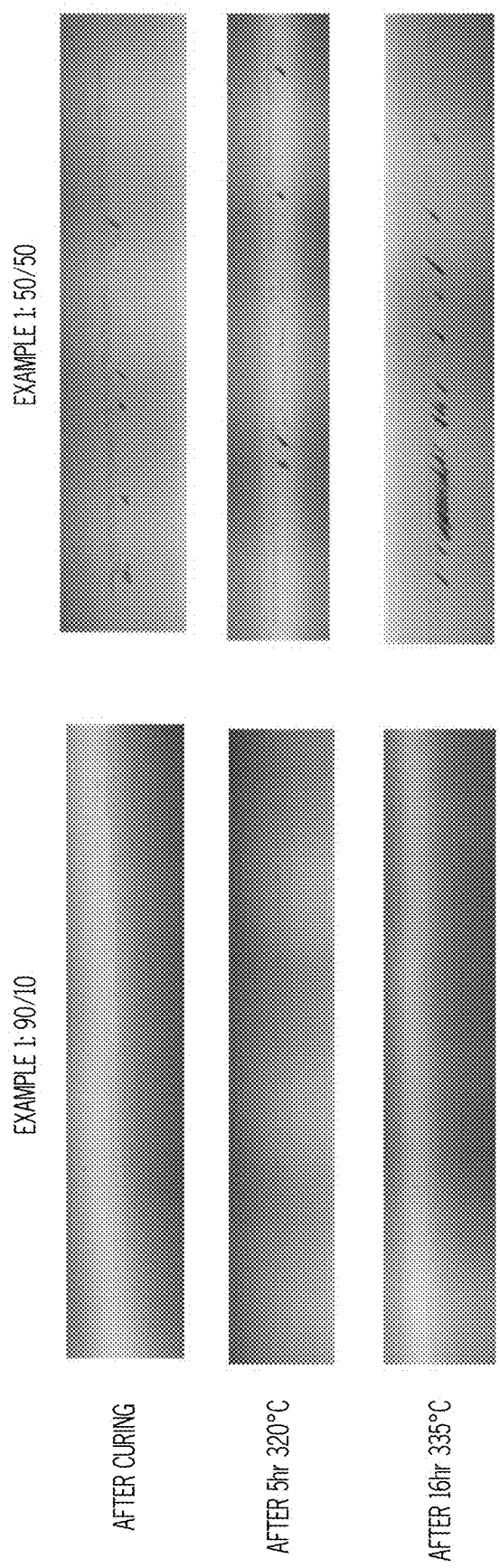
FIG. 10 depicts images of abraded glass surfaces of samples of Example 1 following exposure to depyrogenation conditions and COF testing, according to one or more embodiments shown and described herein.
Figure 11:
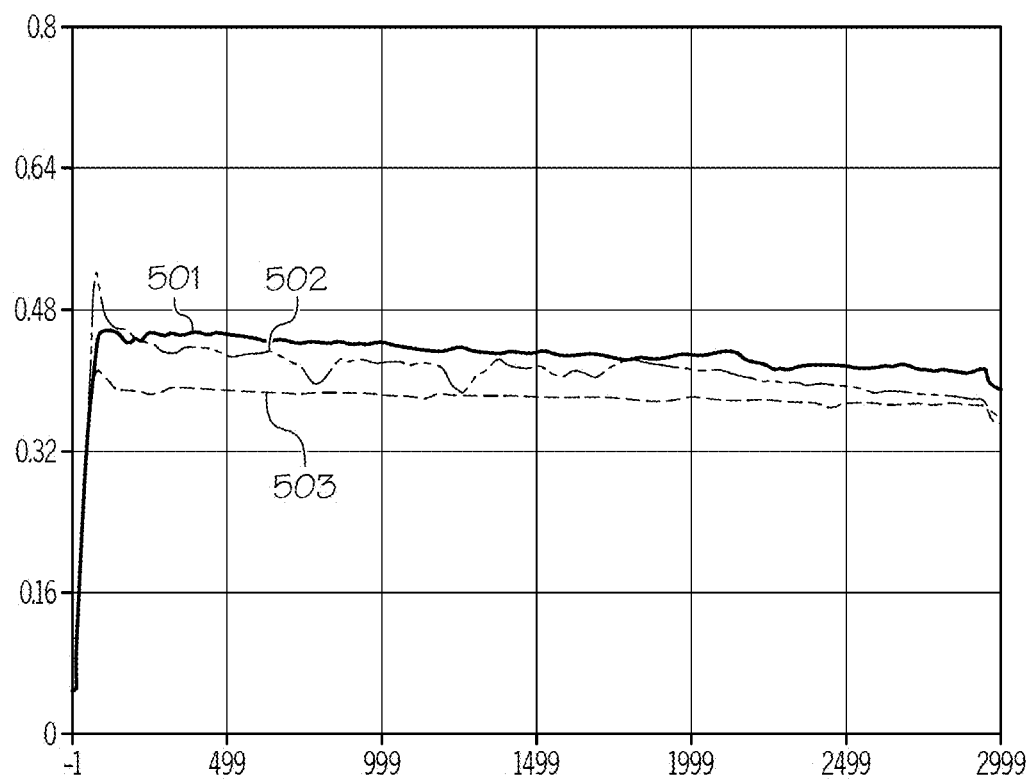
FIG. 11 depicts COF data for samples of Example 1 following exposure to depyrogenation conditions, according to one or more embodiments shown and described herein.

The 90/10 sample exhibited a low coefficient of friction (COF <0.50) in vial-to-vial contact tests and good glass protection, whatever the depyrogenation conditions applied (5 h at 320° C. or 16 h at 335° C.). The right-side image of FIG. 8 shows the 90/10 abraded coated vial following COF testing in an as-cured state. The left-side image of FIG. 10 shows the 90/10 abraded coated vial as cured, after heating to 320° C. for 5 h, and after heating to 335° C. for 16 h, respectively. Additionally, FIG. 11 shows COF data for the 90/10 sample as cured (503), after heating to 320° C. for 5 h (501), and after heating to 335° C. for 16 h (502). Additionally, the 90/10 coating was applied on silicon wafers, and exhibited a refractive index of 1.73, as determined by ellipsometry. This refractive index was in good accordance with the hypothesis of $TiO_2$ formation in the coating.

After curing, the vials coated with 90/10 ratio had no visible color or haze (no light scattering). FIG. 13 shows International Committee on Illumination (CIE) X and Y Chromaticity coordinates for an uncoated vial (510), a vial coated with 90/10 coating and autoclaved (513), a vial coated with 90/10 and exposed to 300° C. for 12 h (515), a vial coated with 90/10 and exposed to 335° C. for 16 h (512), and a vial coated with 90/10 and exposed to 320° C. for 5 h (514). The McAdams ellipse shows that even after depyrogenation conditions, the color difference relative to an uncoated vial is negligible or completely undetectable to the human eye.

Additionally, the 98/2 sample exhibited COF of about 0.3 or less, as described below. This illustrates that a very small amount of polyimide polymer present in the metal oxide/polyimide mixed material confers a low coefficient of friction and efficient glass protection.

Figure 12:
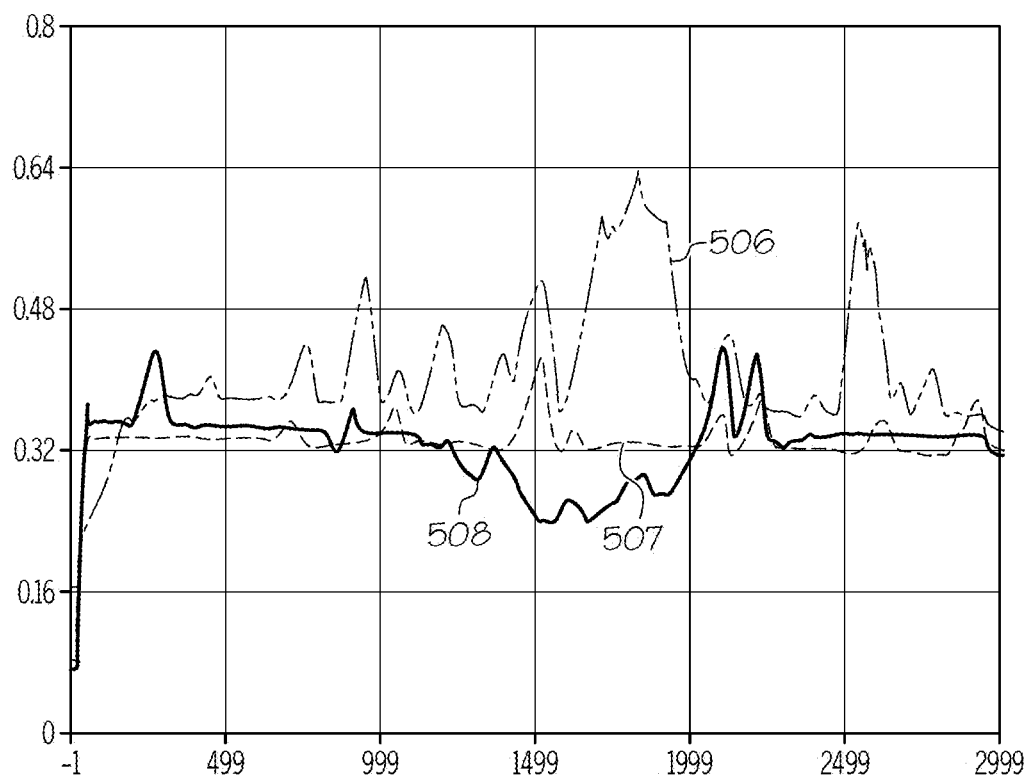
FIG. 12 depicts COF data for additional samples of Example 1 following exposure to depyrogenation conditions, according to one or more embodiments shown and described herein.

The 50/50 samples showed numerous checks even in the as-cured state. This comparative example illustrates that the glass surface is not well protected when too low of a metal oxide fraction is used. The left-side image of FIG. 8 shows the 50/50 abraded coated vial following COF testing in an as-cured state. Additionally, FIG. 12 shows COF data for the 50/50 sample as cured (507), after heating to 320° C. for 5 h (508), and after heating to 335° C. for 16 h (506).

Figure 4:
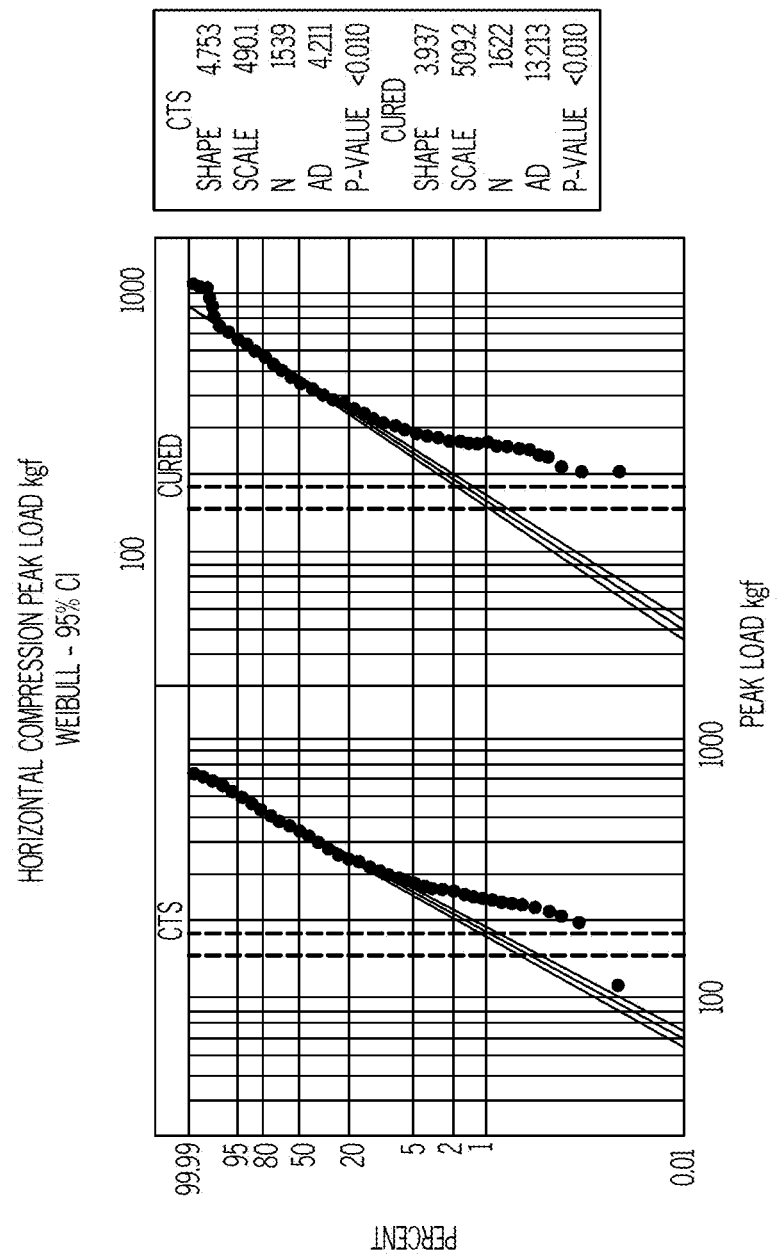
FIG. 4 depicts data related to horizontal compression strength for coated articles, according to one or more embodiments shown and described herein.

Additionally, FIG. 4 depicts results for horizontal compression strength of the coated vials prepared as described in Example 1. Specifically, FIG. 4 shows plots displaying peak load (x-axis) and percent failure for cured (right side, marked "Cured") and depyrogenated (left side, marked "CTS") samples. The samples shown in FIG. 4 had a 90/10 ratio of TYZOR AA to LARC-CP1 (as a 2 wt. % solution in n-propyl acetate. The cure condition was 360° C. for 15 minutes, and the depyrogenation condition was 320° C. for 5 hours. The cured (and not depyrogenated) samples in FIG. 4 are unscratched, while the depyrogenated samples were scratched as described herein at 30 N load. As is shown in FIG. 4, little or no change in horizontal compression strength was detected in the scratched and depyrogenated samples relative to unscratched, non-depyrogenated samples, which is evidence of good glass protection through a thermal treatment and abrasion, as may be similar to conditions in a pharmaceutical filling line.

Example 2

Glass vials were coated on their exterior surface with a coating mixture comprising Zirconium(IV) dibutoxide(bis-2,4-pentanedionate) metal oxide precursor and 6FDA-4-BDAF polyimide to form a solid coating comprising $ZrO_2$ and 6FDA-4-BDAF polyimide. The weight ratio of Zirconium(IV) dibutoxide(bis-2,4-pentanedionate) to 6FDA-4-BDAF polyimide was varied in different samples.

First, glass vials were formed from the glass composition of "Composition E" in Table 1 of U.S. patent application Ser. No. 13/660,394 entitled "Glass Compositions with Improved Chemical and Mechanical Durability." The glass vials were subsequently ion-exchange strengthened prior to application of a coating, as is described in U.S. patent application Ser. No. 13/660,394. The vials had an outer diameter of about 16.00 mm.

To prepare the coating mixture, portions of Zirconium (IV) dibutoxide(bis-2,4-pentanedionate) solution (25 wt. % solution in butanol/toluene mixture, commercially available from SIGMA ALDRICH as ref. 771600) and LARC-CP1 (6FDA-4-BDAF polyimide commercially available from NEXOLVE as ref. LARC-CP1) were weighed and a solution was formed by the addition of propylene glycol methyl ether acetate up to 100 mL (commercially available as DOWANOL™ PMA solvent from SIGMA ALDRICH as ref. 484431). The container was closed and put under agitation until complete dissolution of LARC-CP1 polyimide.

The vials to be coated were washed with de-ionized water, blown dry with nitrogen, and finally cleaned by exposure to oxygen plasma for 15 seconds prior to coating. Then, the vials were dip-coated with the solution of Zirconium(IV) dibutoxide(bis-2,4-pentanedionate) and LARC-CP1 polyimide mixture described above. The withdrawing speed was fixed at 10 cm/min to attain a dry coating thickness of from about 30 nm to 40 nm. Thereafter, the coated vials were cured by placing them into a preheated furnace at 360° C. for 15 minutes.

The amount of Zirconium(IV) dibutoxide(bis-2,4-pentanedionate) solution and LARC-CP1 polyimide included in the coating mixture was varied, where the weight percent of the solids (the Zirconium(IV) dibutoxide(bis-2,4-pentanedionate) and LARC-CP1 polyimide) in the coating mixture was 1 wt. % or 2 wt. %, where samples with lower ratios of Zirconium(IV) dibutoxide(bis-2,4-pentanedionate) to LARC-CP1 had 1 wt. % coating mixtures and greater ratios had 2 wt. % coating mixtures. For example, to form a 50/50 weight ratio of Zirconium(IV) dibutoxide(bis-2,4-pentanedionate) to LARC-CP1 polyimide with 2 wt. % solids, 4 g of the (IV) dibutoxide(bis-2,4-pentanedionate) solution (25 wt. %) and 1 g of LARC-CP1 polyimide were combined, and then propylene glycol methyl ether acetate was added to make the solution 100 mL. Therefore, the total weight addition of solids (non-solvents) was 2.0 g. For a 70/30 sample, 5.6 g of Zirconium(IV) dibutoxide(bis-2,4-pentanedionate) solution and 0.6 g of LARC-CPI was included in the 100 mL coating mixture. Samples of coated vials were prepared having weight ratios of Zirconium(IV) dibutoxide(bis-2,4-pentanedionate) to LARC-CP1 polyimide of 0/100, 30/70, 40/60, 50/50, 60/40, 70/30, 80/20, 90/10, and 100/0. A $ZrO_2$ weight fraction in the coating was determined based on the weight of the Zirconium(IV) dibutoxide(bis-2,4-pentanedionate) and LARC-CP1 polyimide in the coating mixture and accounting for portions of the Zirconium(IV) dibutoxide(bis-2,4-pentanedionate) which decompose and are expelled during curing (the portion of Zirconium(IV) dibutoxide(bis-2,4-pentanedionate) which does not contribute to the remaining $ZrO_2$ in the coating). For example, the reaction was assumed to proceed with a 1:1 molar ratio of Zirconium(IV) dibutoxide(bis-2,4-pentanedionate) reactant to $ZrO_2$ product. A $ZrO_2$ volume fraction for each sample was calculated from the weight fraction using the density of amorphous $ZrO_2$ and LARC-CP1 polyimide, which are 4.85 g/cm$^3$ and 1.54 g/cm$^3$, respectively. For example, the 50/50 sample had a coating containing 22 wt. % $ZrO_2$ and 8.2 vol. % $ZrO_2$. The $ZrO_2$ weight fraction and $ZrO_2$ volume fraction of each sample prepared in Example 2 is shown in Table 3.

Figure 16:
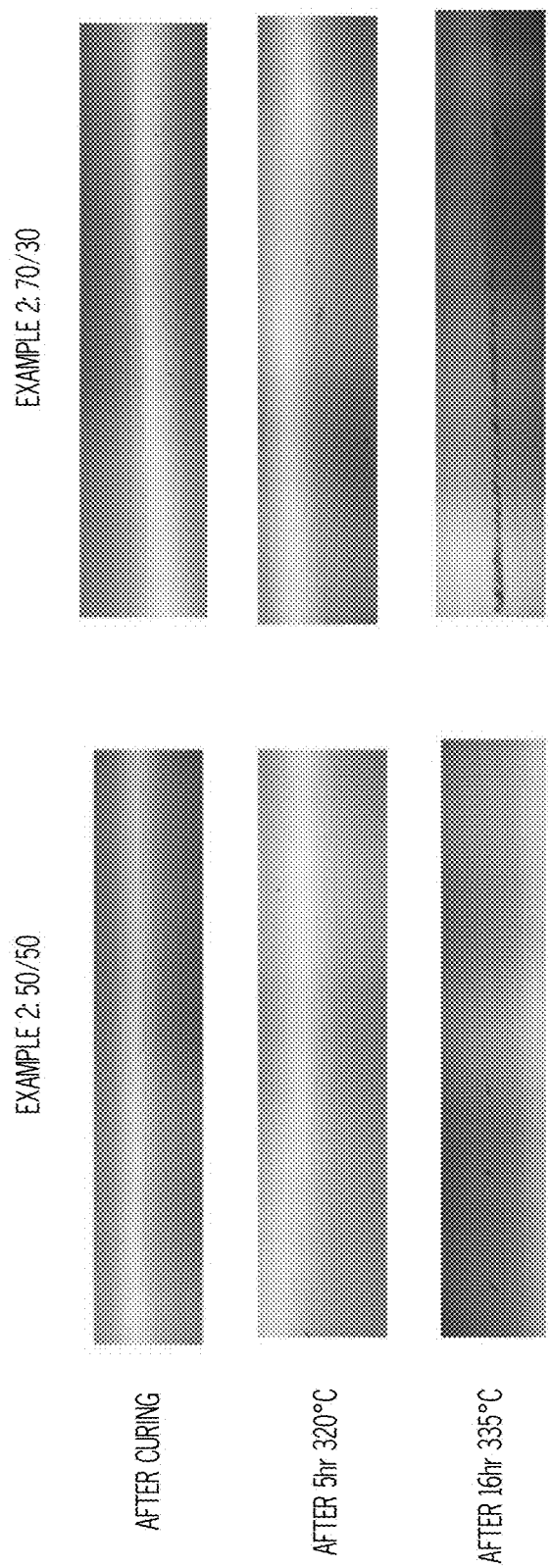
FIG. 16 depicts images of abraded glass surfaces of samples of Example 2 following exposure to depyrogenation conditions and COF testing, according to one or more embodiments shown and described herein.

Each of the samples produced according to Example 2 was tested for COF by a process consistent with the methods described in the present disclosure utilizing the testing jig of FIG. 3 with a load of 30 N. COF testing was conducted on samples as cured, following a heat treatment of 320° C. for 5 hours, and following a heat treatment of 335° C. for 16 hours. Table 3 shows the mean COF and maximum COF for each sample coated vial of Example 2 after curing or following described depyrogenation conditions. It should be understood that depyrogenated vials also underwent curing prior to depyrogenation. Also, in Table 3, the depyrogenation condition marked "none" corresponds to a coated vial as cured. Additionally, following the COF testing, samples were visually examined to determine if the glass had been adequately protected. The column of Table 3 marked "Glass Protection" refers to whether there was visible glass checking, visible wear marks, or both.

left-side image of FIG. 16 shows the 50/50 abraded coated vial as cured, after heating to 320° C. for 5 h, and after heating to 335° C. for 16 h.

Figure 15:
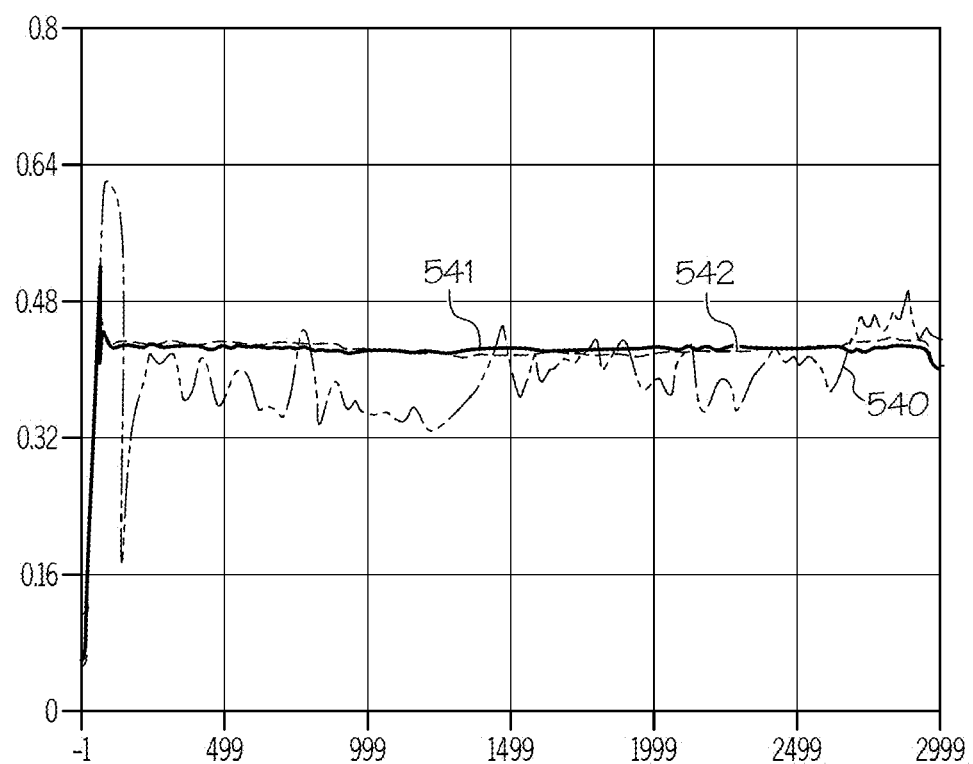
FIG. 15 depicts COF data for samples of Example 2 following exposure to depyrogenation conditions, according to one or more embodiments shown and described herein.

The vials coated with such 70/30 coating had visible scratching after COF testing after exposure to 335° C. for 16 hrs. FIG. 15 shows COF data for the 50/50 sample as cured (542), after heating to 320° C. for 5 h (541), and after heating to 335° C. for 16 h (540). The right-side image of FIG. 16 shows the 70/30 abraded coated vial as cured, after heating to 320° C. for 5 h, and after heating to 335° C. for 16 h.

Example 3

Glass vials were coated on their exterior surface with a coating mixture comprising Titanium(IV) butoxide polymer and 6FDA-4-BDAF polyimide to form a solid coating comprising $TiO_2$ and 6FDA-4-BDAF polyimide. The weight ratio of Titanium(IV) butoxide polymer to 6FDA-4-BDAF polyimide was 90/10. The coating contained 67.5 wt. % and 46.3 vol % of $TiO_2$.

First, glass vials were formed from the glass composition of "Composition E" in Table 1 of U.S. patent application Ser. No. 13/660,394 entitled "Glass Compositions with Improved Chemical and Mechanical Durability." The glass

TABLE 3

| Weight Ratio of $ZrO_2$ Precursor to LARC-CP1 | $ZrO_2$ wt. % | $ZrO_2$ vol. % | wt. % of $ZrO_2$ Precursor and LARC-CP1 in coating mixture | Depyrogenation | COF (mean/max) | Glass Protection |
|---|---|---|---|---|---|---|
| 0/100 | 0 | 0 | 1 | none | 0.47/0.57 | no |
|  |  |  |  | 320° C. for 5 h | 0.45/0.57 | no |
|  |  |  |  | 335° C. for 16 h | 0.43/0.56 | no |
| 10/90 | 3 | 1 | 1 | none | 0.31/0.39 | no |
|  |  |  |  | 320° C. for 5 h | 0.32/0.49 | no |
|  |  |  |  | 335° C. for 16 h | 0.33/0.39 | no |
| 20/80 | 6.6 | 2.2 | 1 | none | 0.30/0.42 | no |
|  |  |  |  | 320° C. for 5 h | 0.35/0.44 | no |
|  |  |  |  | 335° C. for 16 h | 0.37/0.46 | no |
| 30/70 | 10.8 | 3.7 | 1 | none | 0.30/0.32 | no |
|  |  |  |  | 320° C. for 5 h | 0.38/0.58 | no |
|  |  |  |  | 335° C. for 16 h | 0.38/0.48 | no |
| 40/60 | 15.5 | 5.6 | 1 | none | 0.35/0.42 | no |
|  |  |  |  | 320° C. for 5 h | 0.36/0.46 | no |
|  |  |  |  | 335° C. for 16 h | 0.40/0.51 | no |
| 50/50 | 22 | 8.2 | 2 | none | 0.40/0.43 | yes |
|  |  |  |  | 320° C. for 5 h | 0.43/0.49 | yes |
|  |  |  |  | 335° C. for 16 h | 0.45/0.48 | yes |
| 60/40 | 29.8 | 11.8 | 2 | none | 0.42/0.43 | yes |
|  |  |  |  | 320° C. for 5 h | 0.42/0.47 | yes |
|  |  |  |  | 335° C. for 16 h | 0.47/0.49 | yes |
| 70/30 | 39.8 | 17.3 | 2 | none | 0.44/0.47 | yes |
|  |  |  |  | 320° C. for 5 h | 0.46/0.47 | yes |
|  |  |  |  | 335° C. for 16 h | 0.35/0.37 | no |
| 80/20 | 53 | 26.4 | 2 | none | 0.39/0.41 | yes |
|  |  |  |  | 320° C. for 5 h | 0.39/0.40 | yes |
|  |  |  |  | 335° C. for 16 h | 0.34/0.37 | no |
| 90/10 | 71.8 | 44.7 | 2 | none | 0.35/0.36 | yes |
|  |  |  |  | 320° C. for 5 h | 0.34/0.35 | yes |
|  |  |  |  | 335° C. for 16 h | 0.34/0.38 | no |
| 100/0 | 100 | 100 | 2 | none | >>1 | no |
|  |  |  |  | 320° C. for 5 h | >>1 | no |
|  |  |  |  | 335° C. for 16 h | >>1 | no |

Figure 14:
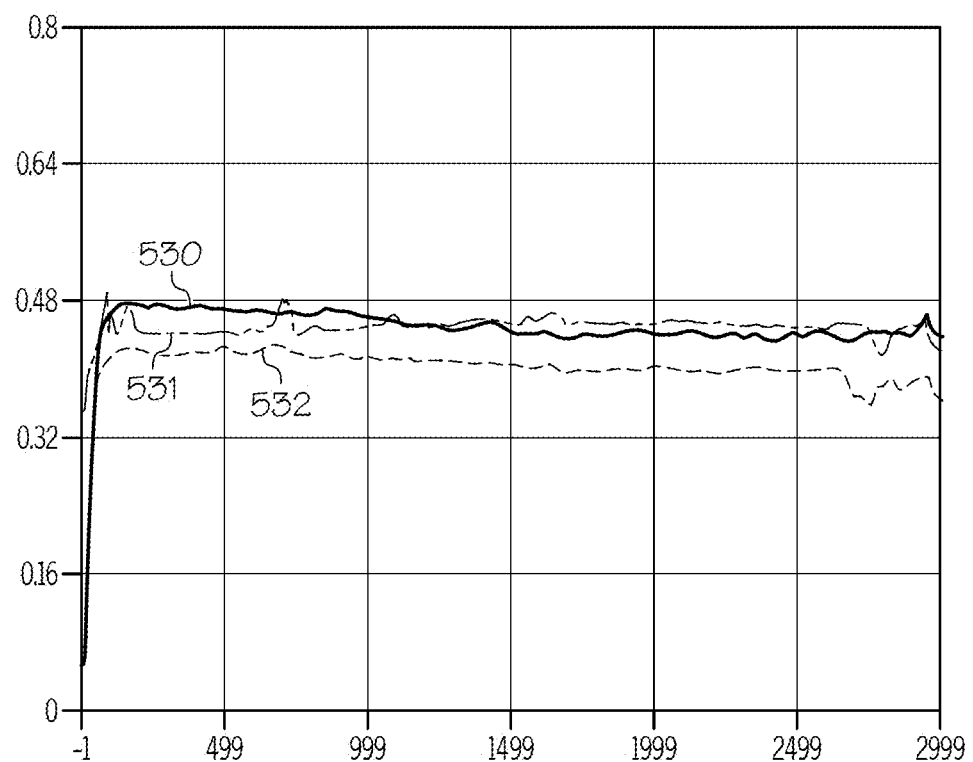
FIG. 14 depicts COF data for samples of Example 2 following exposure to depyrogenation conditions, according to one or more embodiments shown and described herein.

The vials coated with 50/50 coating mix had no visible color or haze. The coating exhibited a low coefficient of friction (COF <0.50) and good glass protection, whatever depyrogenation condition applied. FIG. 14 shows COF data for the 50/50 sample as cured (532), after heating to 320° C. for 5 h (530), and after heating to 335° C. for 16 h (531). The vials were subsequently ion-exchange strengthened prior to application of a coating, as is described in U.S. patent application Ser. No. 13/660,394. The vials had an outer diameter of about 16.00 mm.

To prepare the coating mixture, 1.8 g of Titanium(IV) butoxide polymer (100 wt. %, commercially available from SIGMA ALDRICH as ref. 510718) and 0.2 g of LARC-CP1 (6FDA-4-BDAF polyimide commercially available from NEXOLVE as ref. LARC-CP1) were weighed in a plastic container and a coating mixture was formed by the addition of propylene glycol methyl ether acetate up to 100 mL (commercially available as DOWANOL™ PMA solvent from SIGMA ALDRICH as ref. 484431). The container was closed and put under agitation until complete dissolution of LARC-CP1 polyimide.

The vials to be coated were washed with de-ionized water, blown dry with nitrogen, and finally cleaned by exposure to oxygen plasma for 15 seconds prior to coating. Then, the vials were dip-coated with the solution of Titanium(IV) butoxide polymer and LARC-CP1 polyimide mixture described above. The withdrawing speed was fixed at 60 cm/min to attain a dry coating thickness of from about 30 nm to 40 nm. Thereafter, the coated vials were cured by placing them into a preheated furnace at 360° C. for 15 minutes.

The coated vial of Example 3 was tested for COF by a process consistent with the methods described in the present disclosure utilizing the testing jig of FIG. 3 with a load of 30 N. COF testing was conducted on samples as cured, following a heat treatment of 320° C. for 5 hours, and following a heat treatment of 335° C. for 16 hours.

The coated vial of Example 3 had a mean/maximum COF of 0.27/0.28 after curing at 360° C. for 15 min, 0.28/0.29 after depyrogenation at 320° C. for 5 h, and 0.25/0.26 after depyrogenation at 335° C. for 16 h. This example illustrates that polymeric titanate can be used to practice the methods described herein.

Example 4

Glass vials were coated on their exterior surface with a coating mixture comprising aluminum di(isopropoxide)acetoacetate ester chelate and 6FDA-4-BDAF polyimide to form a solid coating comprising $Al_2O_3$ and polyimide. The weight ratio of titanium aluminum di(isopropoxide)acetoacetate ester chelate to 6FDA-4-BDAF polyimide was varied in different samples. This example illustrates that tetracoordinate aluminate may be utilized in the methods described herein.

First, glass vials were formed from the glass composition of "Composition E" in Table 1 of U.S. patent application Ser. No. 13/660,394 entitled "Glass Compositions with Improved Chemical and Mechanical Durability." The glass vials were subsequently ion-exchange strengthened prior to application of a coating, as is described in U.S. patent application Ser. No. 13/660,394. The vials had an outer diameter of about 16.00 mm.

To prepare the coating mixture, portions of aluminum di(isopropoxide)acetoacetate ester chelate (commercially available from ALFA AESAR as ref. 89350) and LARC-CP1 (6FDA-4-BDAF polyimide commercially available from NEXOLVE as ref. LARC-CP1) were weighed in a plastic container and a solution was formed by the addition of propylene glycol methyl ether acetate up to 100 mL (commercially available as DOWANOL™ PMA solvent from SIGMA ALDRICH as ref. 484431). The container was closed and put under agitation until complete dissolution of 6FDA-4-BDAF polyimide.

The vials to be coated were washed with de-ionized water, blown dry with nitrogen, and finally cleaned by exposure to oxygen plasma for 15 seconds prior to coating. Then, the vials were dip-coated with the solution of Aluminum di(isopropoxide)acetoacetate ester chelate and LARC-CP1 polyimide mixture described above. The withdrawing speed was fixed at 60 cm/min to attain a dry coating thickness of from about 30 nm to 40 nm. Thereafter, the coated vials were cured by placing them into a preheated furnace at 360° C. for 15 minutes.

The ratio of Aluminum di(isopropoxide)acetoacetate ester chelate and LARC-CP1 polyimide included in the coating mixture was varied for samples. The weight percent of the solids (the Aluminum di(isopropoxide)acetoacetate ester chelate and LARC-CP1 polyimide) in the coating mixture was 1 wt. %, 3 wt. %, 4 wt. %, or 5 wt. %, where samples with lower ratios of Aluminum di(isopropoxide)acetoacetate ester chelate to LARC-CP1 had 1 wt. % coating mixtures and greater ratios of Aluminum di(isopropoxide)acetoacetate ester chelate to LARC-CP1 higher wt. % coating mixtures. For example, to form a 95/5 weight ratio of Aluminum di(isopropoxide)acetoacetate ester chelate to LARC-CP1 polyimide with a 3 wt. % coating mixture, 2.85 g of Aluminum di(isopropoxide)acetoacetate ester chelate and 0.15 g of LARC-CP1 polyimide were combined, and then propylene glycol methyl ether acetate was added to make the solution 100 mL. Samples of coated vials were prepared having weight ratios of Aluminum di(isopropoxide)acetoacetate ester chelate to LARC-CP1 polyimide of 0/100, 20/80, 30/70, 50/50, 60/40, 70/30, 80/20, 90/10, 95/5, 97/3, 98/2, 99/1, 99.5/0.5, and 100/0. A $Al_2O_3$ weight fraction in the coating was determined based on the weight of the Aluminum di(isopropoxide)acetoacetate ester chelate and LARC-CP1 polyimide in the coating mixture and accounting for portions of the Aluminum di(isopropoxide) acetoacetate ester chelate which decompose and are expelled during curing (the portion of Aluminum di(isopropoxide) acetoacetate ester chelate which does not contribute to the remaining $Al_2O_3$ in the coating). For example, a 2:1 molar ratio of Aluminum di(isopropoxide)acetoacetate ester chelate reactant to $Al_2O_3$ product was assumed. An $Al_2O_3$ volume fraction for each sample was calculated from the weight fraction using the density of amorphous alumina and LARC-CP1 polyimide.

Each of the samples produced according to Example 4 was tested for COF by a process consistent with the methods described in the present disclosure utilizing the testing jig of FIG. 3 with a load of 30 N. COF testing was conducted on samples as cured, following a heat treatment of 320° C. for 5 hours, and following a heat treatment of 335° C. for 16 hours. Table 4 shows the mean COF and maximum COF for each sample coated vial of Example 4 after curing or following described depyrogenation conditions. It should be understood that depyrogenated vials also underwent curing prior to depyrogenation. Also, in Table 4, the depyrogenation condition marked "none" corresponds to a coated vial as cured. Additionally, following the COF testing, samples were visually examined to determine if the glass had been adequately protected. The column of Table 4 marked "Glass Protection" refers to whether there was visible glass checking, visible wear marks, or both.

Additionally, COF data for various samples of Example 4 is shown in FIGS. 7A-7L. Each of FIGS. 7A-7L depicts the coefficient of friction as measured throughout testing, and additionally shows an image of the abraded glass vials following the COF testing. As can be seen, glass checking and visible damage sometimes results from increased COF. Table 5 lists which samples of Example 4 correspond to FIGS. 7A-7L. FIGS. 7A-7L show COF data for non-depyrogenated COF testing (following curing).

TABLE 4

| Weight Ratio of Al$_2$O$_3$ precursor to LARC-CP1 | Al$_2$O$_3$ wt. % | Al$_2$O$_3$ vol. % | wt. % of Al$_2$O$_3$ precursor and LARC-CP1 in solution | Depyrogenation | COF (mean/max) | Glass Protection |
|---|---|---|---|---|---|---|
| 0/100 | 0 | 0 | 1 | none | 0.31/0.45 | no |
|  |  |  |  | 320° C. for 5 h | 0.14/0.24 | no |
|  |  |  |  | 335° C. for 16 h | 0.20/0.44 | no |
| 10/90 | 4 | 1.6 | 1 | none | 0.24/0.29 | no |
|  |  |  |  | 320° C. for 5 h | 0.26/0.45 | no |
|  |  |  |  | 335° C. for 16 h | 0.23/0.45 | no |
| 20/80 | 8.5 | 3.5 | 1 | none | 0.28/0.46 | no |
|  |  |  |  | 320° C. for 5 h | 0.24/0.36 | no |
|  |  |  |  | 335° C. for 16 h | 0.20/0.30 | no |
| 30/70 | 13.7 | 5.9 | 1 | none | 0.26/0.37 | no |
|  |  |  |  | 320° C. for 5 h | 0.34/0.51 | no |
|  |  |  |  | 335° C. for 16 h | 0.32/0.45 | no |
| 50/50 | 27.1 | 12.8 | 1 | none | 0.32/0.46 | no |
|  |  |  |  | 320° C. for 5 h | 0.35/0.45 | no |
|  |  |  |  | 335° C. for 16 h | 0.25/0.38 | no |
| 60/40 | 35.8 | 18 | 3 | none | 0.36/0.40 | yes |
|  |  |  |  | 320° C. for 5 h | 0.28/0.42 | yes |
|  |  |  |  | 335° C. for 16 h | 0.38/0.45 | yes |
| 70/30 | 46.4 | 25.5 | 3 | none | 0.37/0.44 | yes |
|  |  |  |  | 320° C. for 5 h | 0.42/0.44 | yes |
|  |  |  |  | 335° C. for 16 h | 0.34/0.43 | yes |
| 80/20 | 59.8 | 37 | 3 | none | 0.41/0.44 | yes |
|  |  |  |  | 320° C. for 5 h | 0.39/0.44 | yes |
|  |  |  |  | 335° C. for 16 h | 0.40/0.43 | yes |
| 90/10 | 77 | 56.9 | 3 | none | 0.32/0.35 | yes |
|  |  |  |  | 320° C. for 5 h | 0.31/0.33 | yes |
|  |  |  |  | 335° C. for 16 h | 0.32/0.34 | yes |
| 95/5 | 87.6 | 73.6 | 3 | none | 0.27/0.29 | yes |
|  |  |  |  | 320° C. for 5 h | 0.29/0.30 | yes |
|  |  |  |  | 335° C. for 16 h | 0.25/0.31 | yes |
| 98/2 | 94.8 | 87.8 | 4 | none | 0.29/0.30 | yes |
|  |  |  |  | 320° C. for 5 h | 0.28/0.30 | yes |
|  |  |  |  | 335° C. for 16 h | 0.29/0.30 | yes |
| 99/1 | 97.3 | 93.6 | 5 | none | 0.47/0.54 | no |
|  |  |  |  | 320° C. for 5 h | >>1 | no |
|  |  |  |  | 335° C. for 16 h | >>1 | no |
| 100/0 | 100 | 100 | 5 | none | >>1 | no |
|  |  |  |  | 320° C. for 5 h | >>1 | no |
|  |  |  |  | 335° C. for 16 h | >>1 | no |

TABLE 5

| FIG. Number | Weight Ratio of Al$_2$O$_3$ Precursor to LARC-CP1 |
|---|---|
| 7A | 0/100 |
| 7B | 10/90 |
| 7C | 20/80 |
| 7D | 30/70 |
| 7E | 50/50 |
| 7F | 60/40 |
| 7G | 70/30 |
| 7H | 80/20 |
| 7I | 90/10 |
| 7J | 95/5 |
| 7K | 98/2 |
| 7L | 99/1 |

As can be seen from the collected data, samples having a weight ratio of Aluminum di(isopropoxide) to LARC-CP1 of 0/100, 30/70, 50/50, 99/1, 99.5/0.5, and 100/0 did not adequately protect the glass. Additionally, the 99/1 and 100/0 (pure Al$_2$O$_3$), had a COF of much greater than 1 after depyrogenation.

Figure 9:
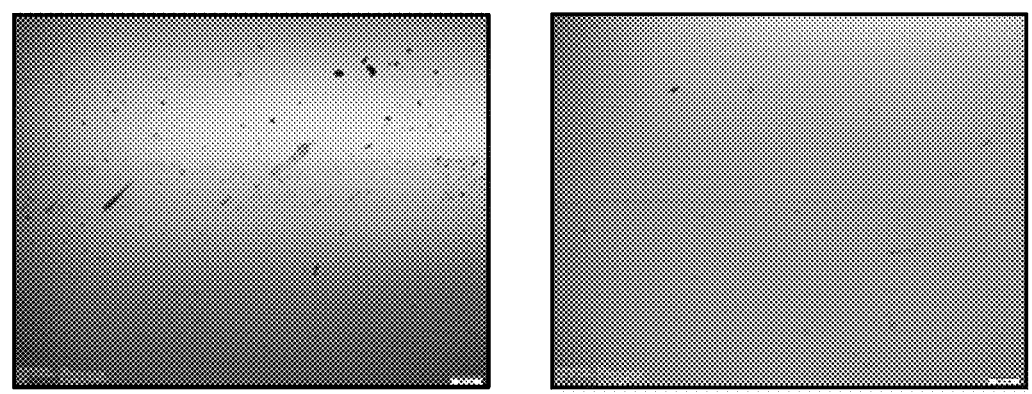
FIG. 9 depicts images of abraded glass surfaces of samples of Example 4 following COF testing, according to one or more embodiments shown and described herein.
Figure 17:
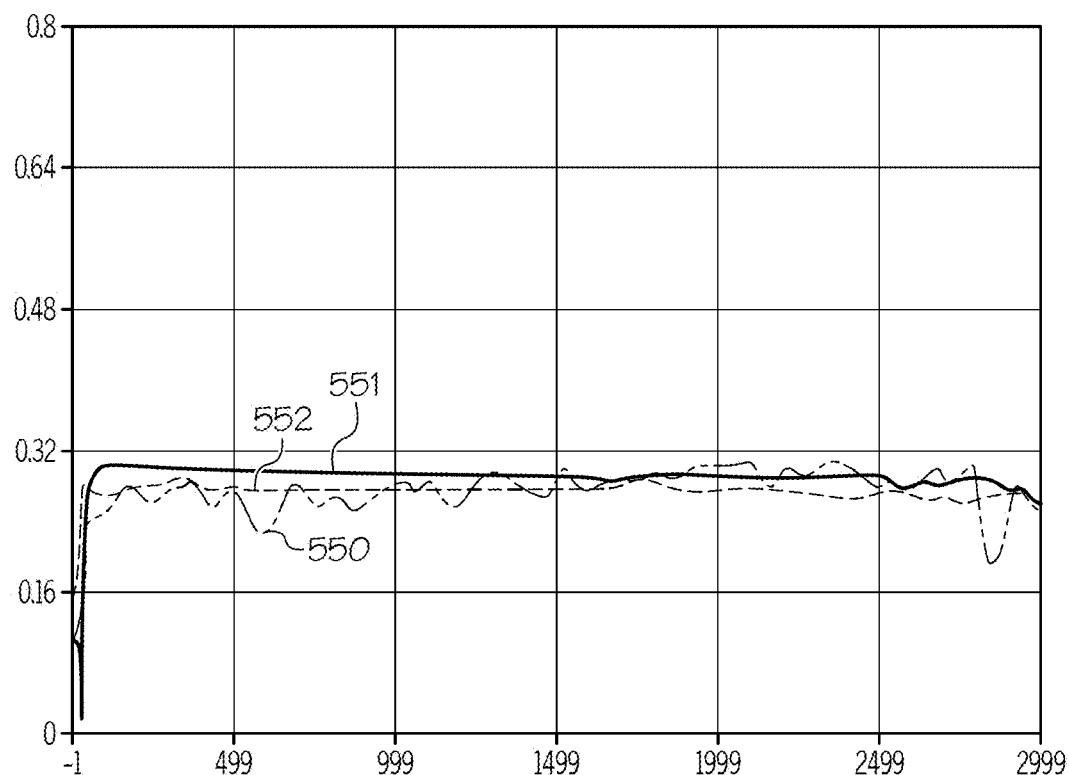
FIG. 17 depicts COF data for samples of Example 4 following exposure to depyrogenation conditions, according to one or more embodiments shown and described herein.
Figure 18:
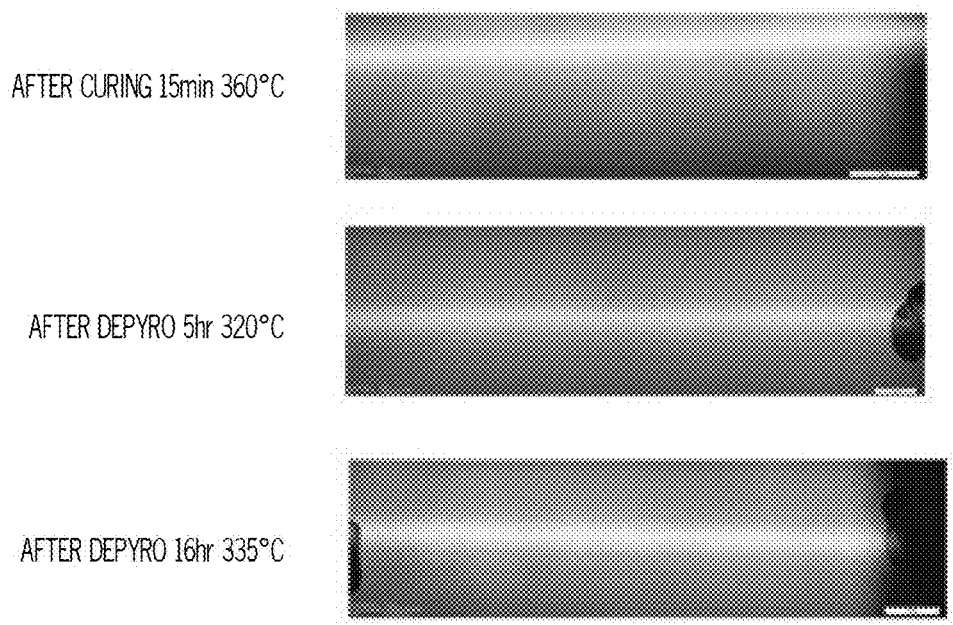
FIG. 18 depicts images of abraded glass surfaces of samples of Example 4 following exposure to depyrogenation conditions and COF testing, according to one or more embodiments shown and described herein.

The 95/5 sample exhibited a low coefficient of friction (COF <0.50) in vial-to-vial contact tests and good glass protection, whatever the depyrogenation conditions applied (5 h at 320° C. or 16 h at 335° C.). The right-side image of FIG. 9 shows the 95/5 abraded coated vial following COF testing in an as-cured state. The images of FIG. 18 shows the 95/5 abraded coated vial as cured, after heating to 320° C. for 5 h, and after heating to 335° C. for 16 h. Additionally, FIG. 17 shows COF data for the 95/5 sample as cured (552), after heating to 320° C. for 5 h (551), and after heating to 335° C. for 16 h (550).

Comparative Example 1

Glass vials were coated on their exterior surface with a coating mixture comprising Aluminum-tri-sec-butoxide and 6FDA-4-BDAF polyimide to form a solid coating comprising Al$_2$O$_3$ and polyimide. The weight ratio of Aluminum-tri-sec-butoxide to 6FDA-4-BDAF polyimide was 90/10. The coating contained 78.8 wt. % and 59.5 vol % of Al$_2$O$_3$.

First, glass vials were formed from the glass composition of "Composition E" in Table 1 of U.S. patent application Ser. No. 13/660,394 entitled "Glass Compositions with Improved Chemical and Mechanical Durability." The glass vials were subsequently ion-exchange strengthened prior to application of a coating, as is described in U.S. patent application Ser. No. 13/660,394. The vials had an outer diameter of about 16.00.

To prepare the coating mixture, 1.8 g of Aluminum-tri-sec-butoxide (97 wt. %, commercially available from SIGMA ALDRICH as ref 201073) and 0.2 g of LARC-CP1

(6FDA-4-BDAF polyimide commercially available from NEXOLVE as ref. LARC-CP1) were weighed in a plastic container and a coating mixture was formed by the addition of propylene glycol methyl ether acetate up to 100 mL (commercially available as DOWANOL™ PMA solvent from SIGMA ALDRICH as ref. 484431). The container was closed and put under agitation until complete dissolution of LARC-CP1 polyimide.

The vials to be coated were washed with de-ionized water, blown dry with nitrogen, and finally cleaned by exposure to oxygen plasma for 15 seconds prior to coating. Then, the vials were dip-coated with the solution of Aluminum-tri-sec-butoxide and LARC-CP1 polyimide mixture described above. The withdrawing speed was fixed at 60 cm/min to attain a dry coating thickness of from about 30 nm to 40 nm. Thereafter, the coated vials were cured by placing them into a preheated furnace at 360° C. for 15 minutes.

The coated vials of Comparative Example 1 were tested for COF by a process consistent with the methods described in the present disclosure utilizing the testing jig of FIG. 3 with a load of 30 N. COF testing was conducted on samples as cured, following a heat treatment of 320° C. for 5 hours, and following a heat treatment of 335° C. for 16 hours. The coated vial of Comparative Example 1 had a mean/maximum COF of 0.41/0.45 after curing at 360° C. for 15 min, 0.49/0.54 after depyrogenation at 320° C. for 5 h, and 0.51/0.65 after depyrogenation at 335° C. for 16 h. However, even if the coating exhibited a relatively low coefficient of friction (COF <0.50) in vial-to-vial contact tests after the curing step (as-cured), it shows poor glass protection against scratch and some checks were detected in the glass substrate. More damages were observed after depyrogenation 5 h at 320° C. and 16 h at 335° C.

Comparative Example 2

Glass vials were coated on their exterior surface with a coating mixture comprising tetraethyl orthosilicate (TEOS) and 6FDA-4-BDAF polyimide to form a solid coating comprising $SiO_2$ and polyimide. The weight ratio of TEOS to 6FDA-4-BDAF polyimide was 50/50. The coating contained 22.38 wt % and 14.35 vol. % of $SiO_2$.

First, glass vials were formed from the glass composition of "Composition E" in Table 1 of U.S. patent application Ser. No. 13/660,394 entitled "Glass Compositions with Improved Chemical and Mechanical Durability." The glass vials were subsequently ion-exchange strengthened prior to application of a coating, as is described in U.S. patent application Ser. No. 13/660,394. The vials had an outer diameter of about 16.00 mm.

To prepare the coating mixture, 0.5 g of TEOS (100 wt. %, commercially available from SIGMA ALDRICH as ref 333859) and 0.5 g of LARC-CP1 (6FDA-4-BDAF polyimide commercially available from NEXOLVE as ref. LARC-CP1) were weighed in a plastic container and a coating mixture was formed by the addition of propylene glycol methyl ether acetate up to 100 mL (commercially available as DOWANOL™ PMA solvent from SIGMA ALDRICH as ref. 484431). The container was closed and put under agitation until complete dissolution of LARC-CP1 polyimide.

The vials to be coated were washed with de-ionized water, blown dry with nitrogen, and finally cleaned by exposure to oxygen plasma for 15 seconds prior to coating. Then, the vials were dip-coated with the solution of TEOS and LARC-CP1 polyimide mixture described above. The withdrawing speed was fixed at 10 cm/min to attain a dry coating thickness of from about 30 nm to 40 nm. Thereafter, the coated vials were cured by placing them into a preheated furnace at 360° C. for 15 minutes.

The coated vial of Comparative Example 2 was tested for COF by a process consistent with the methods described in the present disclosure utilizing the testing jig of FIG. 3 with a load of 30 N. COF testing was conducted on samples as cured, following a heat treatment of 320° C. for 5 hours, and following a heat treatment of 335° C. for 16 hours. The coated vial of Comparative Example 2 had a mean/maximum COF of 0.30/0.43 after curing at 360° C. for 15 min, greater than 1 after depyrogenation at 320° C. for 5 h, and greater than 1 after depyrogenation at 335° C. for 16 h. Many checks in the glass were detected following COF testing after curing as well as depyrogentation conditions.

Comparative Example 3

Glass vials as described in the previous examples (cleaned and prepared in the ways described above) were coated with a 23.5 wt % aminopropylsilsesquioxane aqueous solution (commercially available as ref. AB127715 from ABCR) diluted with methanol to obtain a 2 wt/v % silsesquioxane solution. The vials were dip coated with the silsesquioxane solution with a withdrawing speed of 80 cm/min and dried at 150° C. for 8 minutes. A second coating of PMDA-ODA (commercially available as Kapton polyimide from Sigma Aldrich) was applied over the silsesquioxane coating as described in U.S. Pub. 2013/0171456 to Fadeev et al. Specifically, polyamic acid was converted into its polyamic acid salt by adding to 10 g PMDA-ODA polyamic acid solution (12.0 wt. %±0.5 wt. % [80% NMP/20% xylene] 1.16 g of triethylamine. After vigorous agitation, 28.84 g of methanol were added to form 3 wt. % solution. Following the silsesquioxane coating, the vials were coated with 0.5% PMDA-ODA polyamic acid salt in methanol by using a spray method. The coated vials were cured for 15 min at 360° C. and depyrogenated by exposure to heat for 5 h at 320° C. and 16 h at 335° C. Undepyrogenated (as-cured) and depyrogenated samples were scratched in vial-on-vial jig at N normal load. The vials exhibited a low coefficient of friction in vial-to-vial contact tests and good glass protection, but exhibited a yellow color. FIG. 13 shows CIE XYZ color coordinates for an uncoated vial (511), a vial coated with the coating of Comparative Example 3 as cured (518), a vial coated with the coating of Comparative Example 3 and exposed to 300° C. for 12 h (516), a vial coated with the coating of Comparative Example 3 and exposed to 335° C. for 16 h (517), and a vial coated with the coating of Comparative Example 3 and exposed to 320° C. for 5 h (519). The McAdams ellipse shows that even before depyrogenation conditions, the color difference relative to an uncoated vial is detectable by the human eye.

It should now be understood that the glass containers with low-frictive coatings described herein exhibit improved resistance to mechanical damage as a result of the application of the low frictive coating and, as such, the glass containers have enhanced mechanical durability. This property makes the glass containers well suited for use in various applications including, without limitation, pharmaceutical packaging materials.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A pharmaceutical package comprising:
a glass container comprising a first surface and a second surface opposite the first surface, wherein the first surface is an outer surface of the glass container; and
a coating positioned on and in direct contact with at least a portion of the first surface of the glass container, the coating comprising:
a fluorinated polyimide copolymer formed from a dianhydride monomer component and a diamine monomer component, wherein the dianhydride monomer component is 2,2-bis(3,4-dicarboxyphenyl) hexafluoropropane dianhydride (6FDA), and the diamine monomer component is selected from the group consisting of (i) 1,4-phenylenediamine (mPDA) and 1,3-phenylenediamine (pPDA); (ii) 4,4'-oxydianiline (ODA); (iii) 4,4'-(2,2,2-trifluoro(1-trifluoromethyl)ethylidene)bisbenzeneamine (4,4'-6F); (iv) 3,3'-(2,2,2-trifluoro(1-trifluoromethyl)ethylidene)bisbenzeneamine (3,3'-6F); (v) 2,3,5,6-tetramethylphenylene; and (vi) 2,2,-bis[4-(4-aminophenoxy)phenyl] hexafluoropropane (4BDAF); and
from 22 wt. % to 71.8 wt. % zirconia;
wherein:
the fluorinated polyimide copolymer and the zirconia are mixed in the coating;
the coating has a thickness of 100 nm or less;
the combination of the fluorinated polyimide copolymer and zirconia comprise at least 99.5 wt. % of the coating;
the portion of the first surface of the glass container with the coating has a coefficient of friction of less than or equal to about 0.5; and
the portion of the first surface of the glass container with the coating retains the coefficient of friction of less than or equal to about 0.5 following a heat treatment at a temperature of at least about 300° C. for about 30 minutes.

2. The pharmaceutical package of claim 1, wherein a light transmission through the pharmaceutical package is greater than or equal to about 55% of a light transmission through an uncoated glass container for each wavelength from about 400 nm to about 700 nm.

3. The pharmaceutical package of claim 2, wherein the pharmaceutical package retains the light transmission through the pharmaceutical package of greater than or equal to about 55% of the light transmission through the uncoated glass container for each wavelength from about 400 nm to about 700 nm following a heat treatment at a temperature of at least about 250° C. for 30 minutes.

4. The pharmaceutical package of claim 1, wherein the coating consists of the fluorinated polyimide copolymer and the zirconia.

5. The pharmaceutical package of claim 1, wherein the coating consists of the fluorinated polyimide copolymer and the zirconia, and the fluorinated polyimide copolymer is 2,2-bis(3,4-dicarboxyphenyl)hexafluoropropane dianhydride-co-2,2-bis[4-(4-aminophenoxy)phenyl] hexafluoropropane (6FDA-co-4BDAF).

* * * * *